(12) United States Patent
Liberty

(10) Patent No.: US 9,842,325 B2
(45) Date of Patent: Dec. 12, 2017

(54) MONETARY TRANSACTION SYSTEM

(71) Applicant: Mozido, Inc., Austin, TX (US)

(72) Inventor: Michael A. Liberty, Orlando, FL (US)

(73) Assignee: MOZIDO, INC., Austin, TX (US)

(*) Notice: Subject to any disclaimer, the term of this patent is extended or adjusted under 35 U.S.C. 154(b) by 0 days.

(21) Appl. No.: 15/201,152

(22) Filed: Jul. 1, 2016

(65) Prior Publication Data

US 2016/0314443 A1    Oct. 27, 2016

Related U.S. Application Data

(63) Continuation of application No. 14/213,543, filed on Mar. 14, 2014, now abandoned, which is a
(Continued)

(51) Int. Cl.
*G06Q 40/00* (2012.01)
*G06Q 20/00* (2012.01)
(Continued)

(52) U.S. Cl.
CPC ......... *G06Q 20/10* (2013.01); *G06Q 20/0855* (2013.01); *G06Q 20/322* (2013.01);
(Continued)

(58) Field of Classification Search
CPC ................................................. G06Q 20/0855
(Continued)

(56) References Cited

U.S. PATENT DOCUMENTS 5,717,374 A    2/1998  Smith
5,828,739 A   10/1998  Nakanishi
(Continued)

FOREIGN PATENT DOCUMENTS

| CA | 2666616 | 4/2008 |
|---|---|---|
| CN | 101606400 | 12/2009 |

(Continued)

OTHER PUBLICATIONS

Chen, Jiajun Jim et al, Short-Range Wireless Technologies with Mobile Payments Systems. Proceedings of the 6th International Conference on Electronic Commerce [Online] 2004, pp. 649-656.
(Continued)

*Primary Examiner* — Edward Chang
(74) *Attorney, Agent, or Firm* — Workman Nydegger

(57) ABSTRACT

Embodiments are directed to monetary transaction system for conducting monetary transactions between transaction system subscribers and other entities. In one scenario, the monetary transaction system includes a mobile device that runs a monetary transaction system application. The monetary transaction system also includes a subscriber that has a profile with the system. The subscriber indicates a transaction that is to be performed with the monetary transaction system. The system further includes a monetary transaction system processor that performs the transactions specified by the subscriber including communicating with a monetary transaction database to determine whether the transaction is permissible based on data indicated in the subscriber's profile. The monetary transaction system also includes at least one entity that is to be involved in the specified transaction, where the entity has a profile with the monetary transaction system. This entity may be a person, a retail store, an agent or other entity.

3 Claims, 46 Drawing Sheets

US 9,842,325 B2

Page 2

Related U.S. Application Data continuation of application No. 13/964,707, filed on Aug. 12, 2013, now abandoned, which is a continuation of application No. 13/484,199, filed on May 30, 2012, now Pat. No. 8,538,845.

(60) Provisional application No. 61/522,099, filed on Aug. 10, 2011, provisional application No. 61/493,064, filed on Jun. 3, 2011.

(51) Int. Cl.
| | |
|---|---|
| *G06Q 20/10* | (2012.01) |
| *G06Q 20/08* | (2012.01) |
| *G06Q 40/02* | (2012.01) |
| *G06Q 20/32* | (2012.01) |
| *G06Q 20/40* | (2012.01) |
| *G06Q 20/36* | (2012.01) |
| *H04L 29/06* | (2006.01) |

(52) U.S. Cl.
CPC ......... *G06Q 20/3255* (2013.01); *G06Q 20/36* (2013.01); *G06Q 20/405* (2013.01); *G06Q 40/02* (2013.01); *H04L 63/101* (2013.01)

(58) Field of Classification Search
USPC ...................................................... 705/40, 78
See application file for complete search history.

(56) References Cited

U.S. PATENT DOCUMENTS

| | | | |
|---|---|---|---|
| 5,991,749 A | 11/1999 | Morrill | |
| 6,021,397 A | 2/2000 | Jones et al. | |
| 6,175,823 B1 | 1/2001 | Van Dusen | |
| 6,185,545 B1 | 2/2001 | Resnick | |
| 6,250,557 B1 | 6/2001 | Forslund | |
| 6,415,156 B1 | 7/2002 | Stadelmann | |
| 6,622,015 B1 | 9/2003 | Himmel | |
| 6,697,839 B2 | 2/2004 | Sini | |
| 6,714,797 B1 | 3/2004 | Rautila | |
| 6,736,322 B2 | 5/2004 | Gobburu | |
| 6,819,219 B1 | 11/2004 | Bolle | |
| 6,840,448 B2 | 1/2005 | Fukushima | |
| 6,862,575 B1 | 3/2005 | Antilla et al. | |
| 6,873,974 B1 | 3/2005 | Schutzer | |
| 6,957,342 B2 | 10/2005 | Vatanen | |
| 7,016,532 B2 | 3/2006 | Boncyk | |
| 7,024,174 B2 * | 4/2006 | Nagy .................. | G06Q 20/04 455/408 |
| 7,054,430 B2 | 5/2006 | Lynam | |
| 7,069,001 B2 | 6/2006 | Rupp | |
| 7,089,208 B1 | 8/2006 | Levchin | |
| 7,099,850 B1 | 8/2006 | Mann | |
| 7,100,821 B2 | 9/2006 | Rasti | |
| 7,107,247 B2 | 9/2006 | Kinoshita | |
| 7,110,972 B1 | 9/2006 | Handa | |
| 7,221,939 B2 | 5/2007 | Ylitalo | |
| 7,240,836 B2 | 7/2007 | Vrotsos | |
| 7,248,855 B2 | 7/2007 | Joyce | |
| 7,255,264 B2 | 8/2007 | De Leon | |
| 7,275,685 B2 | 10/2007 | Gray | |
| 7,322,043 B2 | 1/2008 | Letsinger | |
| 7,325,132 B2 | 1/2008 | Takayama | |
| 7,334,720 B2 | 2/2008 | Hulst et al. | |
| 7,347,361 B2 | 3/2008 | Lovett | |
| 7,349,871 B2 | 3/2008 | Labrou | |
| 7,353,382 B2 | 4/2008 | Labrou | |
| 7,363,261 B2 | 4/2008 | Whitehead | |
| 7,403,652 B2 | 7/2008 | Boncyk | |
| 7,421,410 B1 | 9/2008 | Schechtman et al. | |
| 7,461,010 B2 | 12/2008 | Kwan | |
| 7,461,028 B2 | 12/2008 | Wronski | |
| 7,477,780 B2 | 1/2009 | Boncyk | |
| 7,494,055 B2 | 2/2009 | Fernandes | |
| 7,512,098 B2 | 3/2009 | Jiang | |
| 7,527,194 B2 | 5/2009 | Truitt | |
| 7,548,915 B2 | 6/2009 | Ramer | |
| 7,562,818 B1 | 7/2009 | Bierbaum | |
| 7,564,469 B2 | 7/2009 | Cohen | |
| 7,565,008 B2 | 7/2009 | Boncyk | |
| 7,606,560 B2 | 10/2009 | Labrou | |
| 7,657,489 B2 | 2/2010 | Stambaugh | |
| 7,677,973 B2 | 3/2010 | Van Luchene | |
| 7,680,324 B2 | 3/2010 | Boncyk | |
| 7,689,506 B2 | 3/2010 | Fei et al. | |
| 7,694,876 B2 | 4/2010 | Barnes et al. | |
| 7,699,218 B2 | 4/2010 | Garcia | |
| 7,708,194 B2 | 5/2010 | Vawter | |
| 7,729,963 B1 | 6/2010 | Lego | |
| 7,729,987 B1 | 6/2010 | Wakim | |
| 7,748,618 B2 | 7/2010 | Vawter | |
| 7,774,076 B2 | 8/2010 | Skowronek | |
| 7,774,231 B2 | 8/2010 | Pond | |
| 7,775,437 B2 | 8/2010 | Cohen | |
| 7,784,684 B2 | 8/2010 | Labrou | |
| 7,801,826 B2 | 9/2010 | Labrou | |
| 7,819,307 B2 | 10/2010 | Lyons | |
| 7,822,688 B2 | 10/2010 | Labrou | |
| 7,823,772 B2 | 11/2010 | Vawter | |
| 7,848,500 B2 | 12/2010 | Lynam | |
| 7,848,504 B2 | 12/2010 | Lynam | |
| 7,865,414 B2 | 1/2011 | Fung | |
| 7,865,431 B2 | 1/2011 | Takayama | |
| 7,877,605 B2 | 1/2011 | Labrou | |
| 7,881,529 B2 | 2/2011 | Boncyk | |
| 7,886,962 B2 | 2/2011 | Vawter | |
| 7,890,424 B1 | 2/2011 | Wakim | |
| 7,899,243 B2 | 3/2011 | Boncyk | |
| 7,899,252 B2 | 3/2011 | Boncyk | |
| 7,937,302 B1 | 5/2011 | Lego | |
| 7,937,305 B1 | 5/2011 | Lego | |
| 7,942,317 B2 | 5/2011 | Racz et al. | |
| 7,958,052 B2 | 6/2011 | Powell | |
| 7,967,196 B1 | 6/2011 | Bierbaum | |
| 7,979,026 B2 | 7/2011 | Hulvey | |
| 7,988,060 B2 | 8/2011 | Killian | |
| 8,016,185 B2 | 9/2011 | Modi | |
| 8,019,365 B2 | 9/2011 | Fisher | |
| 8,033,458 B2 | 10/2011 | Hulst et al. | |
| 8,041,338 B2 | 10/2011 | Chen | |
| 8,052,042 B2 | 11/2011 | Kolinski-Schultz | |
| 8,060,012 B2 | 11/2011 | Sklovsky | |
| 8,061,598 B2 | 11/2011 | Racz et al. | |
| 8,073,783 B2 | 12/2011 | Felsted | |
| 8,077,042 B2 | 12/2011 | Peeters | |
| 8,090,945 B2 | 1/2012 | Singhal | |
| 8,095,113 B2 | 1/2012 | Kean | |
| 8,116,734 B2 | 2/2012 | Vawter | |
| 8,116,773 B2 | 2/2012 | Chitrapu | |
| 8,118,221 B2 | 2/2012 | Racz et al. | |
| 8,121,945 B2 | 2/2012 | Rackley | |
| 8,130,242 B2 | 3/2012 | Cohen | |
| 8,145,568 B2 | 3/2012 | Rackley | |
| 8,160,959 B2 | 4/2012 | Rackley | |
| 8,170,485 B2 | 5/2012 | Hulvey | |
| 8,190,087 B2 | 5/2012 | Fisher | |
| 8,195,576 B1 | 6/2012 | Grigg | |
| 8,196,131 B1 | 6/2012 | von Behren | |
| 8,213,470 B2 | 7/2012 | Gu | |
| 8,218,873 B2 | 7/2012 | Boncyk | |
| 8,229,354 B2 | 7/2012 | Sklovsky | |
| 8,239,325 B2 | 8/2012 | Schwarz | |
| 8,275,312 B2 | 9/2012 | Fisher | |
| 8,290,433 B2 | 10/2012 | Fisher | |
| 8,332,272 B2 | 12/2012 | Fisher | |
| 8,333,319 B2 | 12/2012 | Roth | |
| 8,336,772 B2 | 12/2012 | Racz et al. | |
| 8,352,323 B2 | 1/2013 | Fisher | |
| 8,355,670 B2 | 1/2013 | White | |
| 8,359,265 B2 | 1/2013 | Van Rensburg | |
| 8,360,329 B2 | 1/2013 | Grigg | |
| 8,374,916 B2 | 2/2013 | White | |
| 8,380,177 B2 | 2/2013 | Laracey | |

(56) References Cited

U.S. PATENT DOCUMENTS

| | | |
|---|---|---|
| 8,396,793 B2 | 3/2013 | Hill |
| 8,487,771 B2 | 7/2013 | Hsieh et al. |
| 8,538,845 B2 | 9/2013 | Liberty |
| 8,577,803 B2 | 11/2013 | Chatterjee et al. |
| 8,612,325 B2 | 12/2013 | Stacy et al. |
| 8,632,000 B2 | 1/2014 | Laracey |
| 9,208,488 B2 | 12/2015 | Liberty |
| 2001/0011248 A1 | 8/2001 | Himmel |
| 2001/0037264 A1 | 11/2001 | Husemann |
| 2001/0042785 A1 | 11/2001 | Walker et al. |
| 2002/0042776 A1 | 4/2002 | Woo |
| 2002/0052754 A1 | 5/2002 | Joyce |
| 2002/0060246 A1 | 5/2002 | Gobburu |
| 2002/0065774 A1 | 5/2002 | Young |
| 2002/0069123 A1 | 6/2002 | Soderlind |
| 2002/0131404 A1 | 9/2002 | Mehta |
| 2002/0141586 A1 | 10/2002 | Margalit |
| 2002/0152177 A1 | 10/2002 | Wolf |
| 2002/0161708 A1 | 10/2002 | Offer |
| 2003/0001010 A1 | 1/2003 | Schmidt |
| 2003/0026404 A1 | 2/2003 | Joyce |
| 2003/0055735 A1 | 3/2003 | Cameron |
| 2003/0071115 A1 | 4/2003 | Horn |
| 2003/0154165 A1 | 8/2003 | Horn |
| 2003/0195842 A1 | 10/2003 | Reece |
| 2004/0117302 A1 | 6/2004 | Weichert et al. |
| 2004/0181531 A1 | 9/2004 | Becker |
| 2004/0205618 A1 | 10/2004 | Sini |
| 2004/0235450 A1 | 11/2004 | Rosenberg |
| 2004/0248554 A1 | 12/2004 | Khan |
| 2005/0070265 A1 | 3/2005 | Korpinen |
| 2005/0071512 A1 | 3/2005 | Kim et al. |
| 2005/0080697 A1 | 4/2005 | Foss |
| 2005/0199709 A1 | 9/2005 | Linior |
| 2005/0222961 A1 | 10/2005 | Staib |
| 2005/0283434 A1 | 12/2005 | Hahn-Carlson |
| 2006/0116892 A1 | 6/2006 | Grimes |
| 2006/0136901 A1 | 6/2006 | Nichols |
| 2006/0165060 A1 | 7/2006 | Dua |
| 2006/0179452 A1 | 8/2006 | Amodeo |
| 2006/0200427 A1 | 9/2006 | Morrison |
| 2006/0253335 A1 | 11/2006 | Keena et al. |
| 2006/0287004 A1 | 12/2006 | Fuqua |
| 2007/0006327 A1 | 1/2007 | Lal et al. |
| 2007/0033285 A1 | 2/2007 | Shiigi |
| 2007/0106564 A1 | 5/2007 | Matotek |
| 2007/0123305 A1 | 5/2007 | Chen |
| 2007/0125838 A1 | 6/2007 | Law |
| 2007/0125840 A1 | 6/2007 | Law |
| 2007/0162471 A1 | 7/2007 | Samuelsson |
| 2007/0179885 A1 | 8/2007 | Bird |
| 2007/0198432 A1 | 8/2007 | Pitroda |
| 2007/0203850 A1 | 8/2007 | Singh |
| 2007/0241189 A1 | 10/2007 | Slavin |
| 2007/0244811 A1 | 10/2007 | Tumminaro |
| 2007/0255620 A1 | 11/2007 | Tumminaro et al. |
| 2007/0255652 A1 | 11/2007 | Tumminaro et al. |
| 2007/0255653 A1 | 11/2007 | Tumminaro |
| 2007/0265984 A1 | 11/2007 | Santhana |
| 2008/0006685 A1 | 1/2008 | Rackley |
| 2008/0010191 A1 | 1/2008 | Rackley |
| 2008/0010196 A1 | 1/2008 | Rackley |
| 2008/0010204 A1 | 1/2008 | Rackley |
| 2008/0010215 A1 | 1/2008 | Rackley |
| 2008/0011825 A1 | 1/2008 | Giordano |
| 2008/0017704 A1 | 1/2008 | VanDeburg |
| 2008/0040265 A1 | 2/2008 | Rackley |
| 2008/0040285 A1 | 2/2008 | Wankmueller |
| 2008/0052192 A1 | 2/2008 | Fisher |
| 2008/0065490 A1 | 3/2008 | Novick et al. |
| 2008/0097851 A1 | 4/2008 | Bemmel |
| 2008/0126145 A1 | 5/2008 | Rackley |
| 2008/0126929 A1 | 5/2008 | Bykov |
| 2008/0143487 A1 | 6/2008 | Hulvey |
| 2008/0197190 A1 | 8/2008 | Fujita |
| 2008/0204358 A1 | 8/2008 | Sato |
| 2008/0208743 A1 | 8/2008 | Arthur |
| 2008/0208744 A1 | 8/2008 | Arthur |
| 2008/0208762 A1 | 8/2008 | Arthur |
| 2008/0210751 A1 | 9/2008 | Kim |
| 2008/0249927 A1 | 10/2008 | Rethorn |
| 2008/0249928 A1 | 10/2008 | Hill |
| 2008/0249930 A1 | 10/2008 | Hill |
| 2008/0249933 A1 | 10/2008 | Rethorn |
| 2008/0255947 A1 | 10/2008 | Friedman |
| 2008/0275779 A1 | 11/2008 | Lakshminarayanan |
| 2008/0281737 A1 | 11/2008 | Fajardo |
| 2009/0024526 A1 | 1/2009 | Erickson |
| 2009/0037326 A1 | 2/2009 | Chitti |
| 2009/0055322 A1 | 2/2009 | Bykov |
| 2009/0063312 A1 | 3/2009 | Hurst |
| 2009/0081989 A1 | 3/2009 | Wuhrer |
| 2009/0098854 A1 | 4/2009 | Park |
| 2009/0104888 A1 | 4/2009 | Cox |
| 2009/0106148 A1 | 4/2009 | Prada |
| 2009/0108015 A1 | 4/2009 | Kreamer |
| 2009/0119190 A1 | 5/2009 | Realini |
| 2009/0132362 A1 | 5/2009 | Fisher |
| 2009/0132392 A1 | 5/2009 | Davis |
| 2009/0138366 A1 | 5/2009 | Bemmel |
| 2009/0144161 A1 | 6/2009 | Fisher |
| 2009/0156190 A1 | 6/2009 | Fisher |
| 2009/0157546 A1 | 6/2009 | Garcia |
| 2009/0177578 A1 | 7/2009 | Garcia |
| 2009/0177581 A1 | 7/2009 | Garcia |
| 2009/0210308 A1 | 8/2009 | Toomer |
| 2009/0222353 A1 | 9/2009 | Guest |
| 2009/0222358 A1 | 9/2009 | Bednarek |
| 2009/0234751 A1 | 9/2009 | Chan et al. |
| 2009/0248537 A1 | 10/2009 | Sarkeshik |
| 2009/0254440 A1 | 10/2009 | Pharris |
| 2009/0254479 A1 | 10/2009 | Pharris |
| 2009/0265272 A1 | 10/2009 | Dill et al. |
| 2009/0281904 A1 | 11/2009 | Pharris |
| 2009/0288012 A1 | 11/2009 | Hertel |
| 2009/0299844 A1 | 12/2009 | Reilly |
| 2009/0307132 A1 | 12/2009 | Phillips |
| 2010/0010964 A1 | 1/2010 | Skowronek |
| 2010/0023449 A1 | 1/2010 | Skowronek |
| 2010/0030651 A1 | 2/2010 | Matotek et al. |
| 2010/0044430 A1 | 2/2010 | Song |
| 2010/0048226 A1 | 2/2010 | Owen |
| 2010/0049599 A1 | 2/2010 | Owen |
| 2010/0051685 A1 | 3/2010 | Royyuru |
| 2010/0057614 A1 | 3/2010 | Rainey |
| 2010/0057619 A1 | 3/2010 | Weller |
| 2010/0057624 A1 | 3/2010 | Hurt |
| 2010/0063895 A1 | 3/2010 | Dominguez |
| 2010/0088188 A1 | 4/2010 | Kumar |
| 2010/0125495 A1 | 5/2010 | Smith |
| 2010/0125510 A1 | 5/2010 | Smith |
| 2010/0146607 A1 | 6/2010 | Piepenbrink et al. |
| 2010/0151790 A1 | 6/2010 | Hoeksel et al. |
| 2010/0197326 A1 | 8/2010 | Ngo |
| 2010/0223110 A1 | 9/2010 | Slavin |
| 2010/0235283 A1 | 9/2010 | Gerson |
| 2010/0248710 A1 | 9/2010 | Sklovsky |
| 2010/0250356 A1 | 9/2010 | Gillenson |
| 2010/0250436 A1 | 9/2010 | Loevenguth |
| 2010/0260388 A1 | 10/2010 | Garrett |
| 2010/0333129 A1 | 12/2010 | Alhadeff et al. |
| 2011/0047016 A1 | 2/2011 | Cook |
| 2011/0057025 A1 | 3/2011 | Denzer |
| 2011/0087529 A1 | 4/2011 | Angell |
| 2011/0087610 A1 | 4/2011 | Batada |
| 2011/0105022 A1 | 5/2011 | Vawter |
| 2011/0113473 A1 | 5/2011 | Corda |
| 2011/0145049 A1 | 6/2011 | Hertel |
| 2011/0145149 A1 | 6/2011 | Valdes |
| 2011/0179113 A1 | 7/2011 | Thomas |
| 2011/0196788 A1 | 8/2011 | Lu et al. |
| 2011/0218911 A1 | 9/2011 | Spodak |
| 2011/0246284 A1 | 10/2011 | Chaikin |
| 2011/0250866 A1 | 10/2011 | Fisher |

(56) References Cited

U.S. PATENT DOCUMENTS

| | | |
|---|---|---|
| 2011/0251941 A1 | 10/2011 | Dunwoody |
| 2011/0258024 A1 | 10/2011 | Prince |
| 2011/0258115 A1 | 10/2011 | Mulhim |
| 2011/0276417 A1 | 11/2011 | Campbell |
| 2011/0295750 A1 | 12/2011 | Rammal |
| 2011/0302016 A1 | 12/2011 | Haddad |
| 2011/0302406 A1 | 12/2011 | Machani |
| 2011/0313924 A1 | 12/2011 | Carell |
| 2011/0320243 A1 | 12/2011 | Khan |
| 2011/0320293 A1 | 12/2011 | Khan |
| 2011/0320294 A1 | 12/2011 | Votaw |
| 2011/0320345 A1 | 12/2011 | Taveau |
| 2012/0005076 A1 | 1/2012 | Dessert |
| 2012/0011058 A1 | 1/2012 | Pitroda et al. |
| 2012/0011063 A1 | 1/2012 | Killian |
| 2012/0028612 A1 | 2/2012 | Hurst |
| 2012/0029990 A1 | 2/2012 | Fisher |
| 2012/0047070 A1 | 2/2012 | Pharris |
| 2012/0074232 A1 | 3/2012 | Spodak |
| 2012/0078735 A1 | 3/2012 | Bauer |
| 2012/0079521 A1 | 3/2012 | Garg et al. |
| 2012/0084203 A1 | 4/2012 | Mehew |
| 2012/0095855 A1 | 4/2012 | Sterling |
| 2012/0095856 A1 | 4/2012 | Sanjeev |
| 2012/0122447 A1 | 5/2012 | Craft |
| 2012/0123841 A1 | 5/2012 | Taveau |
| 2012/0123868 A1 | 5/2012 | Brudnicki |
| 2012/0123880 A1 | 5/2012 | Craft |
| 2012/0123935 A1 | 5/2012 | Brudnicki |
| 2012/0123937 A1 | 5/2012 | Spodak |
| 2012/0143752 A1 | 6/2012 | Wong |
| 2012/0150669 A1 | 6/2012 | Langley |
| 2012/0158589 A1 | 6/2012 | Katzin |
| 2012/0171992 A1 | 7/2012 | Cheong |
| 2012/0172026 A1 | 7/2012 | Kwon |
| 2012/0172089 A1 | 7/2012 | Bae |
| 2012/0174189 A1 | 7/2012 | Lim |
| 2012/0191557 A1 | 7/2012 | Fisher |
| 2012/0191612 A1 | 7/2012 | Spodak |
| 2012/0196586 A1 | 8/2012 | Grigg |
| 2012/0197691 A1 | 8/2012 | Grigg |
| 2012/0197740 A1 | 8/2012 | Grigg |
| 2012/0197743 A1 | 8/2012 | Grigg |
| 2012/0197745 A1 | 8/2012 | Fisher |
| 2012/0197787 A1 | 8/2012 | Grigg |
| 2012/0203610 A1 | 8/2012 | Grigg et al. |
| 2012/0203632 A1 | 8/2012 | Blum |
| 2012/0209688 A1 | 8/2012 | Lamothe |
| 2012/0209749 A1 | 8/2012 | Hammad |
| 2012/0215701 A1 | 8/2012 | Mehta |
| 2012/0221421 A1 | 8/2012 | Hammad |
| 2012/0221475 A1 | 8/2012 | Grigg |
| 2012/0226610 A1 | 9/2012 | Gill |
| 2012/0229647 A1 | 9/2012 | Calman |
| 2012/0229657 A1 | 9/2012 | Calman |
| 2012/0231424 A1 | 9/2012 | Calman |
| 2012/0231425 A1 | 9/2012 | Calman |
| 2012/0232937 A1 | 9/2012 | Calman |
| 2012/0232977 A1 | 9/2012 | Calman |
| 2012/0232983 A1 | 9/2012 | Bertha |
| 2012/0245986 A1 | 9/2012 | Regan |
| 2012/0253852 A1 | 10/2012 | Pourfallah |
| 2012/0259686 A1 | 10/2012 | Yurrow |
| 2012/0259698 A1 | 10/2012 | Yurrow |
| 2012/0259732 A1 | 10/2012 | Sasankan |
| 2012/0265677 A1 | 10/2012 | Rackley |
| 2012/0265685 A1 | 10/2012 | Brudnicki |
| 2012/0271712 A1 | 10/2012 | Katzin |
| 2012/0284131 A1 | 11/2012 | Soffer |
| 2012/0286928 A1 | 11/2012 | Mullen |
| 2012/0290376 A1 | 11/2012 | Dryer |
| 2012/0290449 A1 | 11/2012 | Mullen |
| 2012/0290478 A1 | 11/2012 | Crofts et al. |
| 2012/0293303 A1 | 11/2012 | Khan |
| 2012/0296708 A1 | 11/2012 | Bachmann |
| 2012/0296720 A1 | 11/2012 | Pirillo |
| 2012/0296722 A1 | 11/2012 | Gosavi |
| 2012/0296741 A1 | 11/2012 | Dykes |
| 2012/0297204 A1 | 11/2012 | Buer |
| 2012/0302204 A1 | 11/2012 | Gupta |
| 2012/0303425 A1 | 11/2012 | Katzin |
| 2012/0310720 A1 | 12/2012 | Balsan |
| 2012/0310760 A1 | 12/2012 | Phillips |
| 2012/0310824 A1 | 12/2012 | Liberty |
| 2012/0310826 A1 | 12/2012 | Chatterjee |
| 2012/0316950 A1 | 12/2012 | LaPorte |
| 2012/0316951 A1 | 12/2012 | Fisher |
| 2012/0316992 A1 | 12/2012 | Oborne |
| 2012/0317019 A1 | 12/2012 | Carnes |
| 2012/0323653 A1 | 12/2012 | Fisher |
| 2012/0323664 A1 | 12/2012 | Klems |
| 2012/0323670 A1 | 12/2012 | Fisher |
| 2012/0323777 A1 | 12/2012 | Liberty |
| 2012/0329394 A1 | 12/2012 | Fisher |
| 2012/0330737 A1 | 12/2012 | Liberty |
| 2012/0330792 A1 | 12/2012 | Kashanian |
| 2013/0012125 A1 | 1/2013 | Fisher |
| 2013/0012126 A1 | 1/2013 | Fisher |
| 2013/0012131 A1 | 1/2013 | Fisher |
| 2013/0013352 A1 | 1/2013 | Fisher |
| 2013/0013353 A1 | 1/2013 | Fisher |
| 2013/0013355 A1 | 1/2013 | Fisher |
| 2013/0013432 A1 | 1/2013 | Fisher |
| 2013/0013434 A1 | 1/2013 | Fisher |
| 2013/0013490 A1 | 1/2013 | Keller |
| 2013/0013498 A1 | 1/2013 | Fisher |
| 2013/0013499 A1 | 1/2013 | Kalgi |
| 2013/0013501 A1 | 1/2013 | Rackley |
| 2013/0017784 A1 | 1/2013 | Fisher |
| 2013/0018738 A1 | 1/2013 | Faires |
| 2013/0018740 A1 | 1/2013 | Fisher |
| 2013/0018742 A1 | 1/2013 | Fisher |
| 2013/0018793 A1 | 1/2013 | Wong |
| 2013/0023209 A1 | 1/2013 | Fisher |
| 2013/0023294 A1 | 1/2013 | Singh |
| 2013/0024220 A1 | 1/2013 | Fisher |
| 2013/0024221 A1 | 1/2013 | Fisher |
| 2013/0024223 A1 | 1/2013 | Thomas |
| 2013/0024280 A1 | 1/2013 | Fisher |
| 2013/0024364 A1 | 1/2013 | Shrivastava et al. |
| 2013/0024371 A1 | 1/2013 | Hariramani |
| 2013/0024372 A1 | 1/2013 | Spodak |
| 2013/0024377 A1 | 1/2013 | Stong |
| 2013/0029646 A1 | 1/2013 | Chowdhury |
| 2013/0030828 A1 | 1/2013 | Pourfallah |
| 2013/0030960 A1 | 1/2013 | Kashanian |
| 2013/0030997 A1 | 1/2013 | Spodak |
| 2013/0035035 A1 | 2/2013 | Fisher |
| 2013/0035036 A1 | 2/2013 | Fisher |
| 2013/0035037 A1 | 2/2013 | Fisher |
| 2013/0035068 A1 | 2/2013 | Fisher |
| 2013/0035069 A1 | 2/2013 | Fisher |
| 2013/0035070 A1 | 2/2013 | Fisher |
| 2013/0035071 A1 | 2/2013 | Fisher |
| 2013/0035072 A1 | 2/2013 | Fisher |
| 2013/0035087 A1 | 2/2013 | Fisher |
| 2013/0035967 A1 | 2/2013 | Fisher |
| 2013/0035968 A1 | 2/2013 | Fisher |
| 2013/0035969 A1 | 2/2013 | Fisher |
| 2013/0035970 A1 | 2/2013 | Fisher |
| 2013/0040568 A1 | 2/2013 | Fisher |
| 2013/0040569 A1 | 2/2013 | Fisher |
| 2013/0041699 A1 | 2/2013 | Fisher |
| 2013/0041700 A1 | 2/2013 | Fisher |
| 2013/0041701 A1 | 2/2013 | Roth |
| 2013/0041736 A1 | 2/2013 | Coppinger |
| 2013/0041743 A1 | 2/2013 | Coppinger |
| 2013/0041744 A1 | 2/2013 | Coppinger |
| 2013/0041745 A1 | 2/2013 | Coppinger |
| 2013/0041769 A1 | 2/2013 | Fisher |
| 2013/0046608 A1 | 2/2013 | Coppinger |
| 2013/0046634 A1 | 2/2013 | Grigg |
| 2013/0046645 A1 | 2/2013 | Grigg |
| 2013/0048723 A1 | 2/2013 | King |

(56) References Cited

U.S. PATENT DOCUMENTS

| | | |
|---|---|---|
| 2013/0052952 A1 | 2/2013 | Fisher |
| 2013/0054336 A1 | 2/2013 | Graylin |
| 2013/0054337 A1 | 2/2013 | Brendell |
| 2013/0054412 A1 | 2/2013 | Brendell |
| 2013/0054441 A1 | 2/2013 | Kamdar |
| 2013/0057392 A1 | 3/2013 | Bullock |
| 2013/0060618 A1 | 3/2013 | Barton |
| 2013/0073373 A1 | 3/2013 | Fisher |
| 2013/0073377 A1 | 3/2013 | Heath |
| 2013/0073458 A1 | 3/2013 | Sherwin |
| 2013/0080228 A1 | 3/2013 | Fisher |
| 2013/0080229 A1 | 3/2013 | Fisher |
| 2013/0080230 A1 | 3/2013 | Fisher |
| 2013/0080231 A1 | 3/2013 | Fisher |
| 2013/0080232 A1 | 3/2013 | Fisher |
| 2013/0080233 A1 | 3/2013 | Fisher |
| 2013/0080240 A1 | 3/2013 | Fisher |
| 2013/0080241 A1 | 3/2013 | Fisher |
| 2013/0080329 A1 | 3/2013 | Royyuru |
| 2013/0091012 A1 | 4/2013 | Liberty |
| 2013/0132219 A1 | 5/2013 | Liberty |
| 2013/0238455 A1 | 9/2013 | Laracey |
| 2013/0246141 A1 | 9/2013 | Liberty |
| 2013/0246203 A1 | 9/2013 | Laracey |
| 2013/0317928 A1 | 11/2013 | Laracey |
| 2013/0332347 A1 | 12/2013 | Liberty |
| 2013/0346309 A1 | 12/2013 | Giori |
| 2014/0006048 A1 | 1/2014 | Liberty |
| 2014/0201070 A1 | 7/2014 | Liberty |
| 2015/0039517 A1 | 2/2015 | Liberty |
| 2016/0055483 A1 | 2/2016 | Liberty |
| 2016/0055583 A1 | 2/2016 | Liberty |

FOREIGN PATENT DOCUMENTS

| | | |
|---|---|---|
| CN | 102073958 | 5/2011 |
| DE | 10119808 | 9/2002 |
| EP | 1280115 | 1/2003 |
| JP | 2001-297198 | 10/2001 |
| JP | 2001357164 | 12/2001 |
| JP | 2002-99716 | 4/2002 |
| KR | 10-2002-0065989 | 8/2002 |
| KR | 10-2003-0068603 | 8/2003 |
| KR | 10-2007-0092400 | 9/2007 |
| WO | 9834203 | 8/1998 |
| WO | 9913636 | 3/1999 |
| WO | 0171627 | 9/2001 |
| WO | 0197118 | 12/2001 |
| WO | 02071354 | 9/2002 |
| WO | 03012717 | 2/2003 |
| WO | 2004010393 | 1/2004 |
| WO | 2004023353 | 3/2004 |
| WO | 2004053640 | 6/2004 |
| WO | 2004088641 | 10/2004 |
| WO | 2005079254 | 9/2005 |
| WO | 2005086593 | 9/2005 |
| WO | 2007145500 | 12/2007 |
| WO | 2008008735 | 1/2008 |
| WO | 2012025824 | 3/2012 |
| WO | 2013009444 | 1/2013 |
| WO | 2013009446 | 1/2013 |
| WO | 2013025273 | 2/2013 |
| WO | 2013078176 | 5/2013 |
| WO | 2013166174 | 11/2013 |

OTHER PUBLICATIONS

Labrou, Yannis et al, Wireless Wallet. Proceedings of the First Annual International Conference on Mobile and Ubiquitous Systems: Networking and Services [Online] 2004, pp. 1-10.
Motorola, Motorola M-Wallet Solution. [Online] 2006 http://www.motorola.com/networkoperators/pdfs/M-Wallet-Brochure.pdf (Accessed Oct. 4, 2012).
Valcourt, E. et al., "Investigating Mobile Payment," Wireless And Mobile Computing, Networking and Communications, 2005. (WiMob'2005), IEEE International Conference on Aug. 22-24, 2005, Aug. 2005, vol. 4, pp. 29-36.
Gao, Jerry, et al., "P2P-Paid: A Peer-to-Peer Wireless Payment System," Proceedings of the 2005 Second IEEE International Workshop on Mobile Commerce and Services (WMCS'05) Jul. 2005, 10 pages.
Edwin, et al., "Technobiography," Oct. 2004, 29 pages.
International Search Report and Written Opinion for PCT/US2012/066013 dated Jan. 29, 2013.
International Search Report and Written Opinion for PCT/US2012/040131 dated Jan. 29, 2013.
International Search Report and Written Opinion for PCT/US2012/043321 dated Sep. 6, 2012.
International Search Report and Written Opinion for PCT/US2012/058849 dated Jan. 4, 2013.
International Search Report and Written Opinion for PCT/US2013/039100 dated Aug. 23, 2013.
European Search Report for EP12824344 dated Sep. 29, 2014.
Sykes, et al. "Securing Mobile Banking," Credit Union Management, Nov. 2010, vol. 33 No. 11; ISSN 0273-9267.
Clarke, Irvine III, "Emerging Value Propositions for M-commerce," *Journal of Business Strategies,* vol. 25, Issue 2, Fall 2008, p. 41-57; ISSN: 0887-2058.
Wei, et al., "Development of a Web-Based Mobile Airline Ticketing Model with Usability Features," 2005, Industrial Management + Data Systems; vol. 105 No. 9, ISSN: 0263-5577.
International Search Report and Written Opinion for PCT/US2012/43458 dated Aug. 17, 2012.
International Search Report and Written Opinion for PCT/US2015/58886 dated Feb. 4, 2016.
European Search Report for EP12851211 dated Feb. 18, 2016.
U.S. Appl. No. 13/484,199, Dec. 26, 2012, Office Action.
U.S. Appl. No. 13/484,199, Jun. 7, 2013, Notice of Allowance.
U.S. Appl. No. 13/527,466, Apr. 15, 2013, Office Action.
U.S. Appl. No. 13/527,466, Dec. 4, 2013, Final Office Action.
U.S. Appl. No. 13/964,707, Feb. 24, 2014, Office Action.
U.S. Appl. No. 14/213,543, May 6, 2014, Office Action.
U.S. Appl. No. 13/680,824, Jun. 16, 2014, Office Action.
U.S. Appl. No. 13/528,720, Jun. 25, 2014, Office Action.
U.S. Appl. No. 13/964,707, Jul. 10, 2014, Office Action.
U.S. Appl. No. 13/527,466, Aug. 1, 2014, Office Action.
U.S. Appl. No. 14/012,822, Aug. 7, 2014, Office Action.
U.S. Appl. No. 13/528,720, Dec. 10, 2014, Final Office Action.
U.S. Appl. No. 14/012,822, Jan. 7, 2015, Final Office Action.
U.S. Appl. No. 13/680,824, Feb. 6, 2015, Final Office Action.
U.S. Appl. No. 13/964,707, Mar. 16, 2015, Final Office Action.
U.S. Appl. No. 14/213,543, Apr. 8, 2015, Office Action.
U.S. Appl. No. 13/874,192, Jul. 14, 2015, Office Action.
U.S. Appl. No. 13/527,466, Jul. 16, 2015, Office Action.
U.S. Appl. No. 13/528,720, Jul. 22, 2015, Office Action.
U.S. Appl. No. 14/012,822, Sep. 11, 2015, Office Action.
U.S. Appl. No. 13/680,824, Sep. 18, 2015, Notice of Allowance.
U.S. Appl. No. 14/213,543, Jan. 6, 2016, Final Office Action.
U.S. Appl. No. 13/528,720, Mar. 2, 2016, Final Office Action.
U.S. Appl. No. 13/527,466, Apr. 1, 2016, Office Action.
U.S. Appl. No. 13/874,192, Apr. 18, 2016, Final Office Action.
U.S. Appl. No. 14/012,822, May 6, 2016, Final Office Action.
U.S. Appl. No. 13/527,466, Dec. 14, 2016, Office Action.
Office Action U.S. Appl. No. 13/527,466, dated Aug. 9, 2017.

* cited by examiner

Subscriber Deposit

Subscriber Withdrawal

Subscriber Buys Airtime

Subscriber Pays Bill

Subscriber Makes Retail Purchase

Subscriber Requests Micro-Loan

Subscriber Repays Micro-Loan

Subscriber Deposit At Agent Branch

Subscriber Withdrawal (ATM)

Subscriber To Subscriber Money Transfer

Subscriber To Non-Subscriber Money Transfer

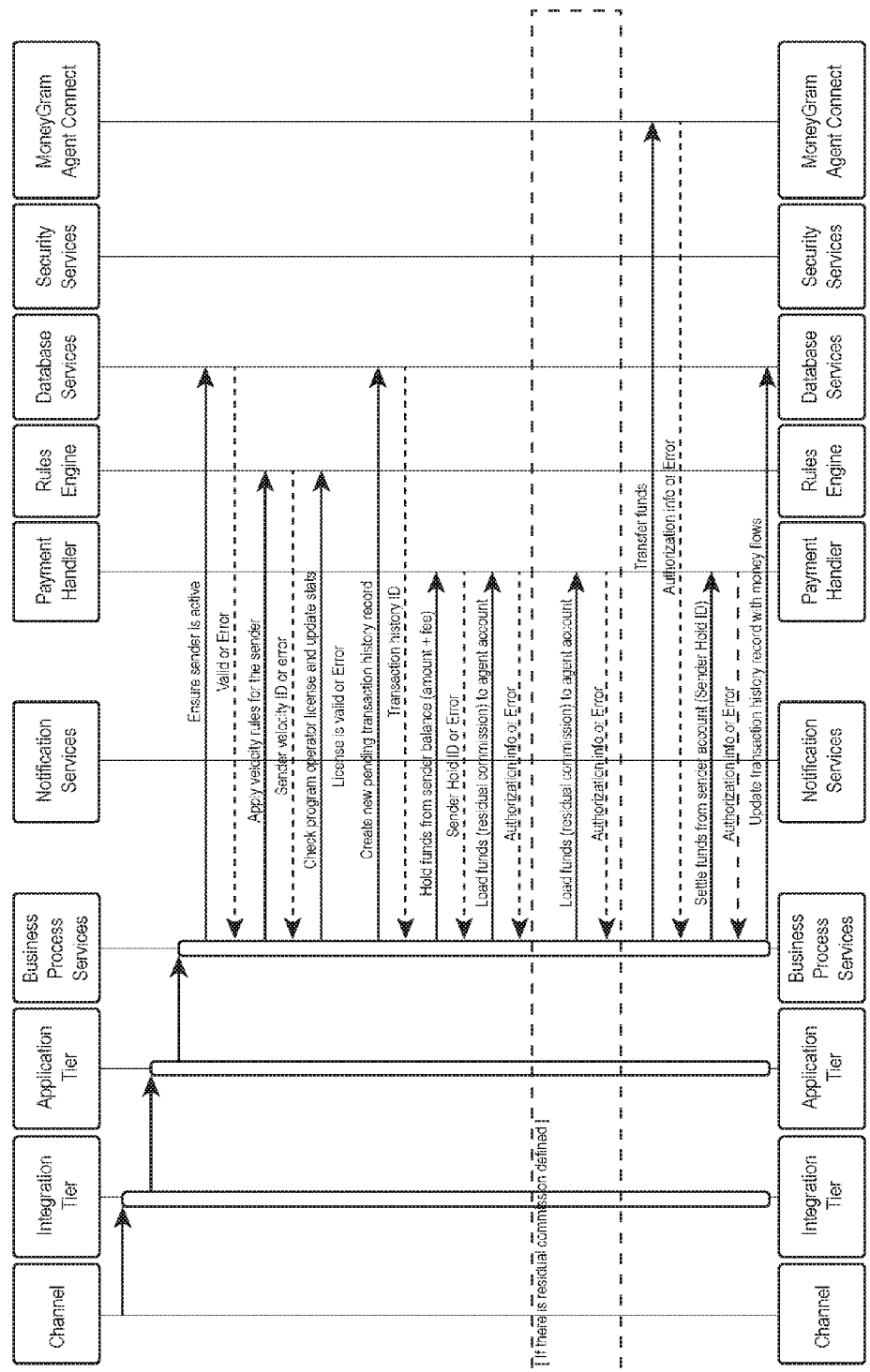

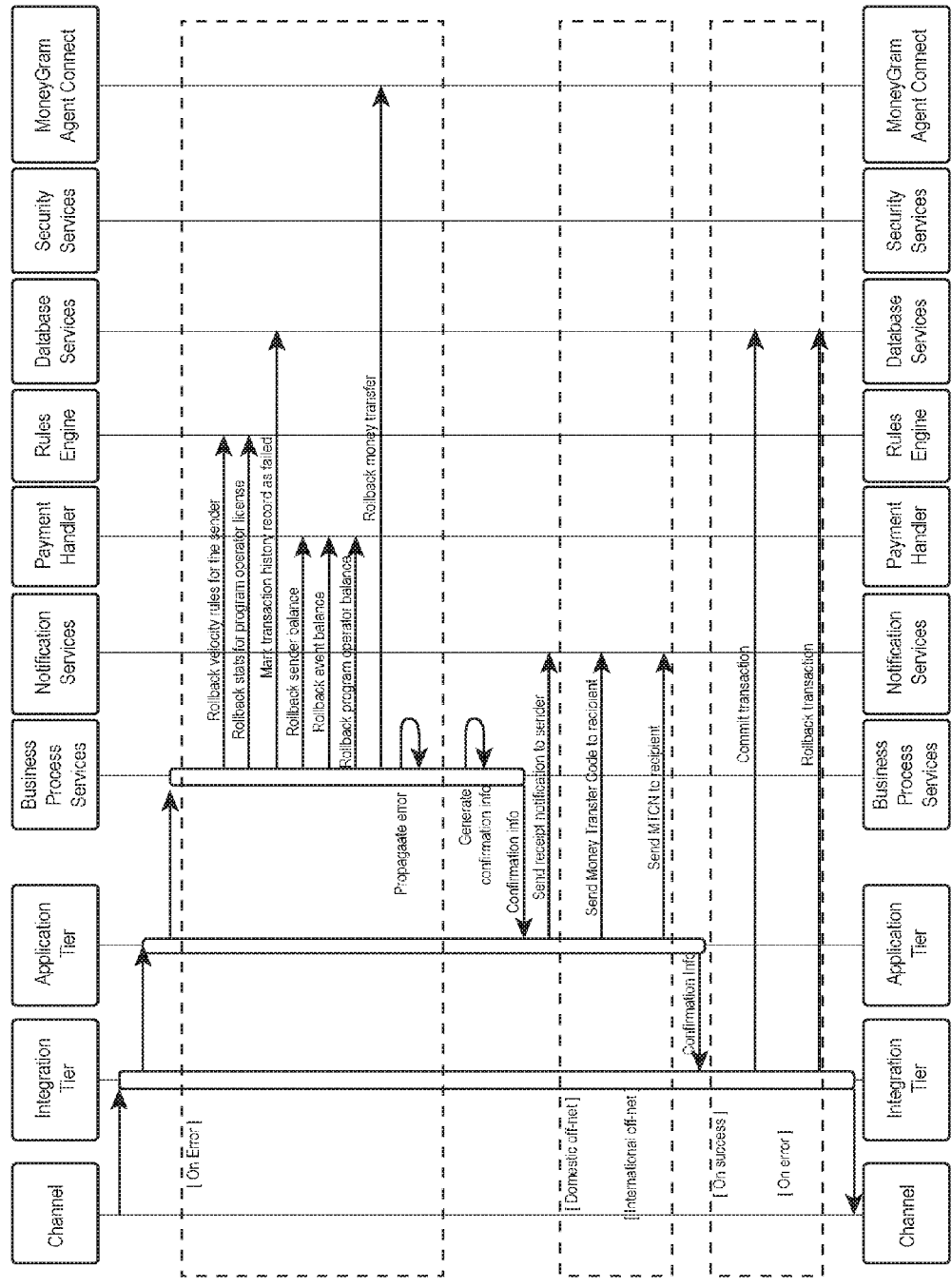

MONETARY TRANSACTION SYSTEM

CROSS-REFERENCE TO RELATED APPLICATIONS

This application is a continuation of U.S. patent application Ser. No. 14/213,543, entitled "Monetary Transaction System", filed Mar. 14, 2014, which is a continuation of U.S. patent application Ser. No. 13/964,707, entitled "Monetary Transaction system", filed Aug. 12, 2013, which application is a continuation of U.S. patent application Ser. No. 13/484,199, filed May 30, 2012, entitled "Monetary Transaction System", which application claims priority to and the benefit of U.S. Provisional Application Ser. No. 61/522,099, filed on Aug. 10, 2011, entitled "Mobile Wallet Platform", and also claims priority to and the benefit of U.S. Provisional Application Ser. No. 61/493,064, filed on Jun. 3, 2011, entitled "Mobile Wallet Platform". All of the aforementioned applications are incorporated by reference herein in their entirety.

BACKGROUND

Mobile phones and other digital devices have become increasingly popular in recent years. Many mobile device users use their devices to perform countless different daily tasks. For instance, mobile devices allow users to check email, send and receive instant messages, check calendar items, take notes, set up reminders, browse the internet, play games or perform any number of different things using specialized applications or "apps". These applications allow mobile devices to communicate with other computer systems and perform a wide variety of network-connected tasks previously not possible with a mobile device.

BRIEF SUMMARY

Embodiments described herein are directed to monetary transaction system for conducting monetary transactions between transaction system subscribers and other entities. In one embodiment, the monetary transaction system includes a mobile device configured to run a monetary transaction system application. The monetary transaction system also includes a monetary transaction system subscriber that has a profile with the system. The subscriber indicates, via the monetary transaction system application, one or more specified transactions that are to be performed using the monetary transaction system. The system further includes a monetary transaction system processor that performs the transactions specified by the subscriber. Performing these transactions includes communicating with a monetary transaction database to determine whether the transaction is permissible based on data indicated in the subscriber's profile.

The monetary transaction system also includes at least one entity that is to be involved in the specified transaction, where the entity has a profile with the monetary transaction system. This entity may be a person, a retail store, an agent or other entity. The subscriber may have access to a bank account, or may be an "unbanked user" that does not have access to a bank account. Each of the terms included above will be described in greater detail below in conjunction with the drawings.

The monetary transaction system may be used for many different tasks including enrolling a customer for a mobile wallet, adding a stored value account (either hosted by a mobile wallet platform or a third party), adding a bank or credit union account to a mobile wallet, adding a debit or credit card account to a mobile wallet, depositing funds in a mobile wallet, withdrawing funds from a mobile wallet, paying bills from a mobile wallet, topping up a prepaid mobile account through a mobile wallet, transferring funds through a mobile wallet (nationally or internationally), making in-store purchases using a mobile wallet, and various other tasks as described herein below.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which:

FIGS. 22A-22J illustrate embodiments of communications between specific components within a monetary transaction system during an operation to transfer funds between financial accounts.

DETAILED DESCRIPTION

Figure 1:
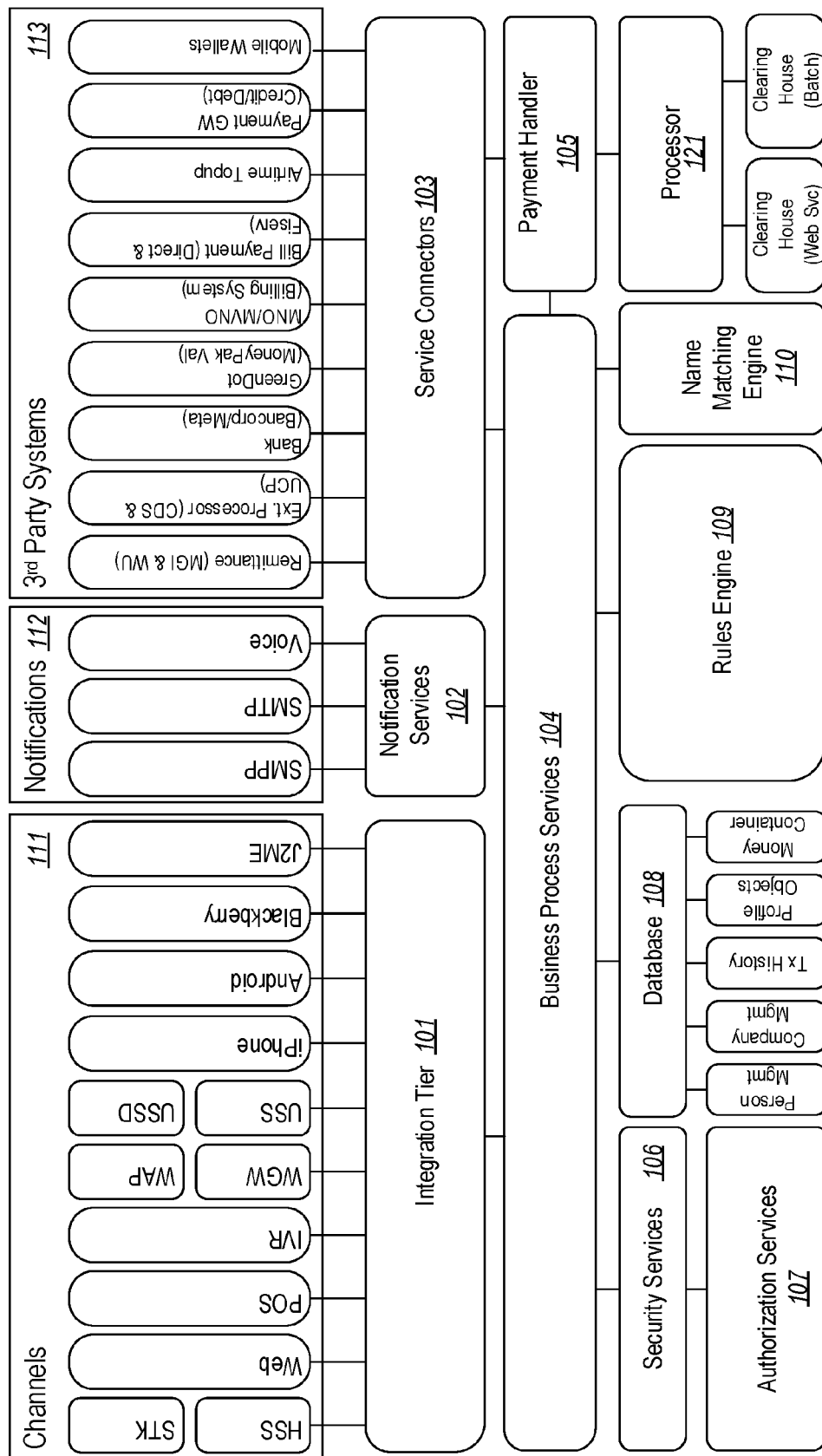
FIG. 1 illustrates a monetary transaction system architecture in which embodiments described herein may operate.

Embodiments described herein are directed to monetary transaction system for conducting monetary transactions between transaction system subscribers and other entities. In one embodiment, the monetary transaction system includes a mobile device configured to run a monetary transaction system application. The monetary transaction system also includes a monetary transaction system subscriber that has a profile with the system. The subscriber indicates, via the monetary transaction system application, one or more specified transactions that are to be performed using the monetary transaction system. The system further includes a monetary transaction system processor that performs the transactions specified by the subscriber. Performing these transactions includes communicating with a monetary transaction database to determine whether the transaction is permissible based on data indicated in the subscriber's profile.

The monetary transaction system also includes at least one entity that is to be involved in the specified transaction, where the entity has a profile with the monetary transaction system. This entity may be a person, a retail store, an agent or other entity. The subscriber may have access to a bank account, or may be an "unbanked user" that does not have access to a bank account. Each of the terms included above will be described in greater detail below in conjunction with the drawings.

The monetary transaction system may be used for many different tasks including enrolling a customer for a mobile wallet, adding a stored value account (either hosted by a mobile wallet platform or a third party), adding a bank or credit union account to a mobile wallet, adding a debit or credit card account to a mobile wallet, depositing funds in a mobile wallet, withdrawing funds from a mobile wallet, paying bills from a mobile wallet, topping up a prepaid mobile account through a mobile wallet, transferring funds through a mobile wallet (nationally or internationally), making in-store purchases using a mobile wallet, and various other tasks as described herein below.

The following discussion now refers to a number of methods and method steps or acts that may be performed. It should be noted, that although the method steps may be discussed in a certain order or illustrated in a flow chart as occurring in a particular order, no particular ordering is necessarily required unless specifically stated, or required because a step is dependent on another step being completed prior to the step being performed.

Embodiments of the mobile transaction system or "mobile wallet platform" described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Various terminology will be used herein to describe the monetary transaction system (also referred to as a "mobile wallet platform", "mobile wallet program" or "mobile wallet transaction system"). The term "agent" is used to refer to an individual with mobile financial services (mFS) transaction system tools and training to support specific mFS functions. These mFS functions include subscriber registration and activation, and the deposit and withdrawal of funds from the mFS transaction system. Agents are representatives of the mFS transaction system or "program". Agents can be employees or contractors of the program provider, or other companies and organizations that partner with the program provider to provide these services themselves. Agents may be found in every facet of a typical economy, and may include large retailers, mobile network operators (MNO) airtime sales agents, gas stations, kiosks, or other places of business.

The mobile wallet platform includes a mobile wallet application, web interface or some other type of functionality that allows the user to interact with the mFS platform using their mobile device. The mobile wallet application may include a subscriber identity module (SIM) application, an Unstructured Supplementary Service Data (USSD) application, a smartphone application, a web application, a mobile web application, a Wireless Application Protocol (WAP) application, a Java 2 Platform, Micro Edition (J2ME) application, a tablet application or any other type of application or interface that provides tools for the agent to register, activate, and offer other services to the mFS subscriber.

As used herein, a mobile wallet application is a mobile wallet application installed on a SIM card. A USSD application is an application that implements USSD for various functionality including prepaid callback service, location-based content services, menu-based information services and other mobile wallet platform services. A web application is one that implements or uses the internet to provide mobile wallet platform functionality. A mobile web application is similar to a web application, but is tailored for mobile devices. A WAP application is one that uses the wireless application protocol to communicate with the mobile wallet platform to provide the platform's functionality. A J2ME application is an application developed in Java and is designed to provide mobile wallet functionality on a variety of different hardware. A tablet application is an application specifically designed for a touchscreen-based tablet that provides mobile wallet platform functionality for tablet devices, and as part of configuring the phone on the network. Any of these applications (or any combination thereof) may be provided on the user's mobile device. This functionality can also be made available on a retail point of sale (POS) system or web site.

The term "agent administrator" refers to an individual with mFS program tools and training to administrate the allocation of funds to agent branches (e.g. retail locations). As agents perform mFS transactions with subscribers, such as depositing and withdrawing money, the agents are adding and removing money from their own accounts. If there are insufficient funds in the agent's account to complete a transaction, additional money will need to be transferred from the agent company's master account to that agent branch account to cover that transaction. An agent administrator is responsible for these funds transfers. Any of the applications referred to above may be configured to provide tools used by the agent administrator to view the agent company balance, view the agent branch balances, and transfer funds into and out of agent branch mobile wallets. This functionality can also be made available on a website for easier access.

The term "agent administrator mobile wallet application" refers to a software program or application installed on the agent administrator's terminal in the agent administrator's mobile device (such as a mobile phone or tablet). This software application provides the agent administrator the ability to securely perform agent administrator functions such as querying the agent company account balance or transferring funds into and out of agent branch accounts. The agent administrator's mobile wallet application may be installed on a global system for mobile communications (GSM) SIM card (or on any other type of SIM card), and may be accessed using a GSM mobile phone. The agent administrator's application may also be installed on a code division multiple access (CDMA) mobile phone, a 3 G, 4G, 4G LTE (Long Term Evolution) or other wireless carrier standard. The application may, additionally or alternatively, be installed directly on the agent administrator's mobile device. The application communicates with the mFS transaction system using binary and/or text short message service (SMS) messages. A wireless service provider or MNO provides the GSM SMS network infrastructure on which the mFS platform operates.

In some embodiments, the mFS platform application may utilize triple data encryption standard (3DES) encryption (or some other type of encryption), encrypted message signing, and password security on some or all of its communications with the mFS transaction system in order to ensure that the transactions are properly secured and authenticated.

The term "agent branch" refers to any location where an agent provides support for subscriber services of the mFS platform. Funds are allocated by the agent administrator from the agent company's main account to each agent branch to fund the subscriber mFS functions such as depositing or withdrawing cash, in-store purchases, bill payments, prepaid airtime top-ups and money transfers. In some cases, multiple agents may work in a single branch. However, at least in some cases, monetary funds are allocated to from the agent company's main account on a per branch basis.

The term "agent branch account balance" refers to the amount of money residing in a particular agent branch account at a given time. Funds can be deposited into the branch account by the agent administrator, or the funds can come from participating in subscriber mFS transactions such as depositing or withdrawing cash from the subscriber's mobile wallet accounts, or making retail purchases with the mobile wallet.

Each agent branch is to maintain a balance in their branch account. This applies more strongly in countries where mFS program and financial services infrastructure is still developing. In cases where real-time processing of financial transactions including card processing is not practical, subscribers leverage the applications on their mobile phones to submit transactions and conduct business with retailers, businesses, and other subscribers. The mFS platform manages the balance of mobile wallet accounts for each subscriber as value is transferred from one mobile wallet to another (e.g. from a subscriber's mobile wallet to an agent's mobile wallet in payment for goods or services). This value is referred to herein as "eMoney".

As subscribers conduct business with mFS agents, they deposit or withdraw cash from their mobile wallet accounts. Virtual or eMoney credits are transferred between the subscriber's mobile wallet account and the agent branch's account as a form of currency to support the transaction. As agents accept cash into their cash register by mFS subscribers, they transfer the equivalent amount of eMoney credits into the mFS subscriber's mobile wallet account. For instance, if an mFS subscriber gives an mFS agent $10 to deposit into the subscriber's mobile wallet account, the agent would place the cash into his register and transfer $10 from the agent branch's eMoney account into the subscriber's mobile wallet account. While the agent acquired $10 in his register, he transferred out $10 of eMoney credits from his branch eMoney account.

In some embodiments, in countries with more developed economies, it may be beneficial to use program-issued pre-paid debit cards, pre-paid access accounts, stored value accounts or gift cards to conduct business along with the added convenience of card processing networks such as Cirrus, STAR, or Visa for POS and automated teller machine (ATM) functionality. Agents, particularly those in retail outlets and kiosks, can still support subscribers with deposits, withdrawals, and other transfers, but in this case bank external card processors manage the mobile wallet and branch account balances and provide the real-time transfer of funds.

The term "agent branch ledger" refers to a written (or electronic) ledger maintained by the mFS platform. Agent branch transactions are performed on the agent's and subscriber's mobile phones where an electronic record of the transaction is generated and stored on the mFS platform. These electronic transactions are then reconciled with agent branch ledgers to ensure the security and integrity of the transaction. Agent branch ledgers are printed or electronic transaction logs that are distributed to the agent branch locations in hard copy form to serve as a backup record to the electronic transactions.

The term "agent company" refers to a business that registers to participate in the mFS program as a partner of the mFS program provider or owner. The agent company has one or more agent branches which conduct mFS business with mFS program subscribers. In some cases, the agent company may be referred to as a distributor or retailer.

The term "agent company account balance" refers to the sum of the funds deposited at a "partner bank" (defined below) by the agent company to fund the agent company's daily transactions. The funds in the agent company account are then distributed to agent branches by the agent company's agent administrator to conduct everyday business such as accepting cash deposits and cash withdrawals from mFS subscribers. This balance is sometimes referred to as the "agent company float".

An "agent manager" is a supervisor of company agents for a given company. The agent manager has the training and tools to create, delete or modify agent accounts for a company, as well as monitor the transactions performed by agents. The agent manager may have a special application or an increased level of rights to access applications features not available to other users. The special application is a program installed on the agent manager's terminal. This application provides the agent manager the ability to securely perform agent manager functions such as registering and activating new agent accounts.

The mFS agent manager application may be installed on any terminal or device. It communicates with the mFS platform using binary and/or text SMS messages. A wireless service provider or MNO provides the GSM SMS network infrastructure on which the mFS platform operates. The mFS platform mobile wallet applications may utilize 3DES encryption (or any other type of encryption), encrypted message signing, and password security on some or all of its communications with the mFS platform in order to ensure that the transactions are properly secured and authenticated.

The term "agent application" refers to an application that provides all the tools necessary for an agent to register, activate, and offer other services to the mFS subscriber. The agent application is a program installed on the agent's SIM card or otherwise installed in the agent's mobile device's memory. This application provides the agent the ability to securely perform agent functions such as registering and activating new subscribers and depositing and withdrawing funds from mobile wallet accounts. The mFS agent application may be installed on a GSM SIM card or mobile phone and may be accessed using a GSM or CDMA mobile phone. A wireless service provider or MNO provides the data and SMS network infrastructure on which the mFS platform operates.

The terms "mFS platform", "mobile wallet platform" and "monetary transaction system" refer to an overall platform or ecosystem of different components that work together to provide the various functions described herein on a global scale. At least some of the various logic components include the following: the application. The "mobile wallet application" or "mFS application" manages the processing of incoming transactions regardless of their source. The application handles end-user authentication, transaction processing, subscriber profile management, and further manages interactions between the various platform components.

The mFS platform further includes a transaction processor. This component is used when the mFS application is implemented in a country where real-time processing of financial transactions is not practical (or not possible). The transaction processor manages the balance of mobile wallet accounts, agent accounts, and the accounts of any other program participant. The transaction processor handles balance inquiries, credits, debits, and transaction roll-backs.

The mFS platform further includes a rules engine that manages and applies the rules and policy that are defined for transactions as they are processed on the mFS platform. Rules impact transaction fees, limits, velocity limits, and commissions as well as program actor roles and permissions. Rules can be customized for each implementation. The mFS platform also includes an integration interface that manages the integration and interaction between external systems (i.e. external to the mFS platform) and the mFS platform. Connectivity to the wireless service provider's pre-paid airtime billing platform and the program partner bank, for example, are managed by the integration interface.

The mFS platform further includes a transaction database that stores the data that supports the mFS platform. This includes subscriber profiles and subscription data, transaction data and logs, and application configuration and runtime data, among other types of data. Another component of the mFS platform is a handset support service that interfaces with the wireless service provider's SMS network to allow communication between the mobile wallet applications and the back-office systems via SMS messaging or some other form of data transfer. Still further, another component of the mFS platform is a web component that provides a web interface to the mFS program participants that allows the subscriber to perform the same functions in the web interface that they would have available through their applications.

The term "bill pay company" refers to a business that signs-up to participate in the mFS transaction system. As a participant in the mFS transaction system, the company accepts payment from mFS mobile wallet accounts, either in the form of eMoney or through periodic settlements.

At least in some embodiments, financial transactions that take place in the mFS mobile wallet platform are funded through pre-paid mobile wallet accounts. Mobile wallet platform subscribers can deposit cash into their mobile wallet account through a process referred to herein as 'cash-in'. The cash-in process is supported by mFS agents at agent branch locations. The agent accepts the cash from the subscriber and transfers the equivalent amount of eMoney to the subscriber's mobile wallet account. This process is similar to withdrawing cash from a bank account.

As mentioned above, in some embodiments, financial transactions that take place in the mobile wallet platform are funded through pre-paid mobile wallet accounts. Mobile wallet platform subscribers can withdraw cash from their mobile wallet account through a process known as "cash-out". The cash-out process is supported by mFS agents at agent branch locations. The subscriber transfers eMoney from their mobile wallet account to the agent's eMoney account. Upon receiving the eMoney, the agent gives the subscriber cash from their branch cash register.

Accounts managed on the mFS platform by the mFS eMoney transaction processor maintain the mobile wallet balance of mFS program participants including subscribers, agent branches, agent companies, and non-agent companies. eMoney is moved between Mobile Wallet accounts by the transaction processor based on mFS transaction processing. Only when transactions involving cash (i.e. depositing or withdrawing funds from the mFS program) or the movement of money from mFS participants to non-mFS program participants are funds moved from the master bank accounts.

As subscribers, agents, and other mFS program participants conduct business in the mFS program, value is transferred from one account to the next as payment for services rendered or goods purchased. This value can be in the form of real currency or the electronic representation referred to herein as eMoney.

Among other situations, eMoney is used in mFS implementations where the real-time processing of financial transactions including card processing is not practical. The mFS platform utilizes an internal transaction processor for managing the real-time balance of mobile wallet and agent accounts as value (eMoney) is transferred from one mobile wallet to another in payment for services.

As subscribers conduct business with mFS agents, they deposit or withdraw cash from their mobile wallet accounts. Virtual or eMoney credits are transferred between the subscriber mobile wallet accounts and the agent branch accounts as a form of currency to support the transaction. As agents accept cash into their cash register by mFS subscribers, they transfer the equivalent amount of eMoney credits into the mFS subscriber's mobile wallet account. For example, if an mFS subscriber gives an mFS agent $10 to deposit into the subscriber's mobile wallet account, the agent would place the cash into his or her register, and transfer $10 from the agent branch eMoney account into the subscriber's mobile wallet account. While the agent acquired $10 in his or her register, the agent transferred-out $10 of eMoney credits from his or her branch eMoney account. This will be explained in greater detail below.

In some embodiments, employers may wish to participate in the mFS program by allowing the direct deposit of paychecks into subscribers' mobile wallet accounts. Accordingly, each payday, the user's pay is directly transferred to the subscribers' mobile wallet.

The term "know your customer" or "KYC" refers to information collected about an individual that identifies that individual. Such information is used to establish a mobile wallet account with the mobile wallet platform. Regulatory requirements in some countries require that new bank account creation must be preceded by a display of a valid government ID. These KYC regulations may vary from country to country. Accordingly, different KYC information may be requested from subscribers in different countries in order to establish a mobile wallet account.

The term micro-finance institution (MFI) refers to a lender that issues small loans. MFIs participating in the mFS program lend to mFS program subscribers and accept loan repayment either in the form of eMoney or settlements with the mFS platform provider.

The term "mFS program", like the term "mFS platform" refers to the ecosystem of companies, service providers, and subscribers that participate in providing mobile financial services to their customers. In some embodiments, there may be one mFS program implementation per country. Each program includes a program owner and operator, a program platform, a partner wireless services provider or MNO, and a partner bank.

The term "mFS program master account" refers to a bank account maintained by the mFS program partner bank to provide funds and float for the operation of the mFS platform. Depending on the type of mFS implementation, the master account can include sub-accounts for each of the agent branches and subscriber mobile wallets, giving the bank visibility into all transactions on a per-user basis. The mFS platform can also manage the balance of sub-accounts and interact with the bank's master account when funds need to be deposited or withdrawn from the account.

The term mobile network operator (MNO) refers to a provider of mobile phone service including basic voice, SMS, unstructured supplementary service data (USSD) and data service, and may also be referred to as a "wireless service provider".

The term "mobile wallet" or "mobile wallet account" refers to a stored value account or prepaid access account (PPA) that allows the owner (or "subscriber") to pay for goods and services on the mFS platform from his or her mobile wallet account. When the mFS eMoney transaction processor is used, the mobile wallet balance is maintained by the mFS platform and value is exchanged within the mFS program as eMoney. When the mFS platform is integrated to an external card processor, the mobile wallet utilizes funds from the subscriber's prepaid debit card and bank account to exchange value on the mFS platform.

The term "non-agent company" refers to a mFS program participant who accepts payments from mFS subscribers but does not provide the same services as mFS agent companies. Payment is accepted either in the form of eMoney or through periodic settlements with the mFS platform provider. Examples of non-agent companies include bill pay providers and micro-finance lenders.

The term "non-mFS subscribers" refers to unregistered users that participates in various use cases in the mFS program. Non-mFS subscribers can send money to or receive money from mFS subscribers through interaction with the mFS program agents or with international remittance providers.

The term "partner bank" refers to the primary bank participating in the mFS program. The partner bank is responsible for holding the mFS program master accounts that hold the funds for all mFS services and transactions. A "PIN" refers to a numeric password that may be required to perform a transaction via the mobile wallet application. A "transaction processor" refers to an application or service that manages the mFS program account balances. The transaction processor determines the amount of funds or eMoney is in a particular account at any given time, and manages account balances. Mobile transaction system requests to credit, debit, or view the balance of a particular mobile wallet or program account are handled by the transaction processor (in conjunction with other components of the mobile wallet platform).

The term "sub-accounts" refers to accounts that are maintained within the mFS platform or by an external card processor. A partner bank may elect to maintain a separate bank account for each subscriber and/or agent branch, or a single master account may be established that contains the funds for all of the subscriber mobile wallet and agent branch accounts (at least within a country or other geographical region). The balance of each individual user may be managed by the mFS transaction processor.

When using a master account, the bank is involved only in transactions that require the movement of funds external to the mFS program. For example, subscriber cash-in and cash-out transactions involve the addition and removal of cash from the mFS program and would consequently include a deposit or withdrawal from the master account. Retail purchases from participating mFS program retailers or the exchange of funds between mFS subscribers results in no net change in the mFS program balance and thus do not require involvement by the partner bank.

The term "subscriber" refers to a participant of the mFS mobile wallet platform. The subscriber maintains a mobile wallet balance and performs transactions using the mFS application. An "unbanked subscriber" is a subscriber that does not have (or does not have access to) a bank account or credit union account. The application or "mobile wallet application" provides mobile wallet functionality to the (unbanked) subscriber. The mobile wallet application is installed on a mobile device in the device's memory, on a SIM card (such as a GSM SIM card) or is otherwise accessible to the mobile device. The mobile wallet application provides the subscriber the ability to securely perform subscriber functions such as making retail purchases, paying bills, or transferring money to other mFS subscribers and non-subscribers. The mobile wallet application communicates with the mFS platform using binary and text SMS messages, among other forms of wireless communication. A wireless service provider or MNO provides the GSM network infrastructure on which the mFS platform operates.

FIG. 1 illustrates an example system architecture for a mobile wallet platform. Integration tier 101 is configured to manage mobile wallet sessions and maintain integrity of financial transactions. Integration tier 101 can also include a communication (e.g., Web services) API and/or other communication mechanisms to accept messages from channels 111. Other mechanisms include, but are not limited to: International Standards Organization ("ISO") 8583 for Point of Sale ("POS") and Automated Teller Machines ("ATM") devices and Advanced Message Queuing Protocol ("AMQP") for queue based interfaces. Each of channels 111 can be integrated to one or more mechanisms for sending messages to integration tier 101. Notification services 102 is configured to send various notifications through different notification channels 112, such as, for example, Short Message Peer-to-Peer ("SSMP") for Short Messaging Service ("SMS") and Simple Mail Transfer Protocol ("SMTP") for emails. Notification services 102 can be configured through a web services API.

Service connectors 103 are a set of connectors configure to connect to 3rd party systems 113. Each connector can be a separate module intended to integrate an external service to the system architecture. Business process services 104 are configured to implement business workflows, including executing financial transactions, auditing financial transactions, invoking third-party services, handling errors, and logging platform objects. Payment handler 105 is configured to wrap APIs of different payment processors, such as, for example, banking accounts, credit/debit cards or processor 121. Payment handler 105 exposes a common API to facilitate interactions with many different kinds of payment processors.

Security services 106 are configured to perform subscriber authentication. Authorization services 107 are configured to perform client authorization, such as, for example, using a database-based Access Control List ("ACL") table.

Database 108 is configured to manage customer accounts (e.g., storing customer accounts and properties), manage company accounts (e.g., storing company accounts and properties), manage transaction histories (e.g., storing financial transaction details), store customer profiles, storing dictionaries used by the mobile wallet platform, such as, for example, countries, currencies, etc., and managing money containers. Rules engine 109 is configured to gather financial transaction statistics and uses the statistics to provide transaction properties, such as, for example, fees and bonuses. Rules engine 109 is also configured to enforce business constraints, such as, for example, transactions and platform license constraints.

Name matching engine 110 is configured to match different objects according to specified configuration rules. Matching engine 110 can be use to find similarities between names, addresses, etc. Transaction processor 121 is configured to manage financial accounts and transactions. The transaction processor 121 can be used to hold, load, withdraw and deposit funds to mobile wallet accounts. Transaction processor 121 can also be used as a common interface to a third party processor system. When used as a common interface, financial operations may be delegated to the external processor. A Clearing House subsystem of transaction processor 121 can be used to exchange the financial information with a bank.

Components of a mobile wallet platform can be connected to one another over (or be part of) a system bus and/or a network. Networks can include a Local Area Network ("LAN"), a Wide Area Network ("WAN"), and even the Internet. Accordingly, components of the mobile wallet platform can be "in the cloud". As such, mobile wallet platform components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the system bus and/or network.

The components depicted in FIG. 1 can interoperate to provide a number of financial and other services including but not limited to enrolling a customer for a mobile wallet, adding a stored value account (either hosted by a mobile wallet platform or a third party), adding a bank or credit union account to a mobile wallet, adding a debit or credit card account to a mobile wallet, depositing funds in a mobile wallet, withdrawing funds from a mobile wallet, paying bills from a mobile wallet, topping up a prepaid mobile account through a mobile wallet, transferring funds through a mobile wallet (nationally or internationally), making in-store purchases using a mobile wallet, and various other tasks as described herein below. These services will be described in greater detail below with regard to system FIGS. 1 and 2, as well as FIGS. 3-19B.

Figure 2:
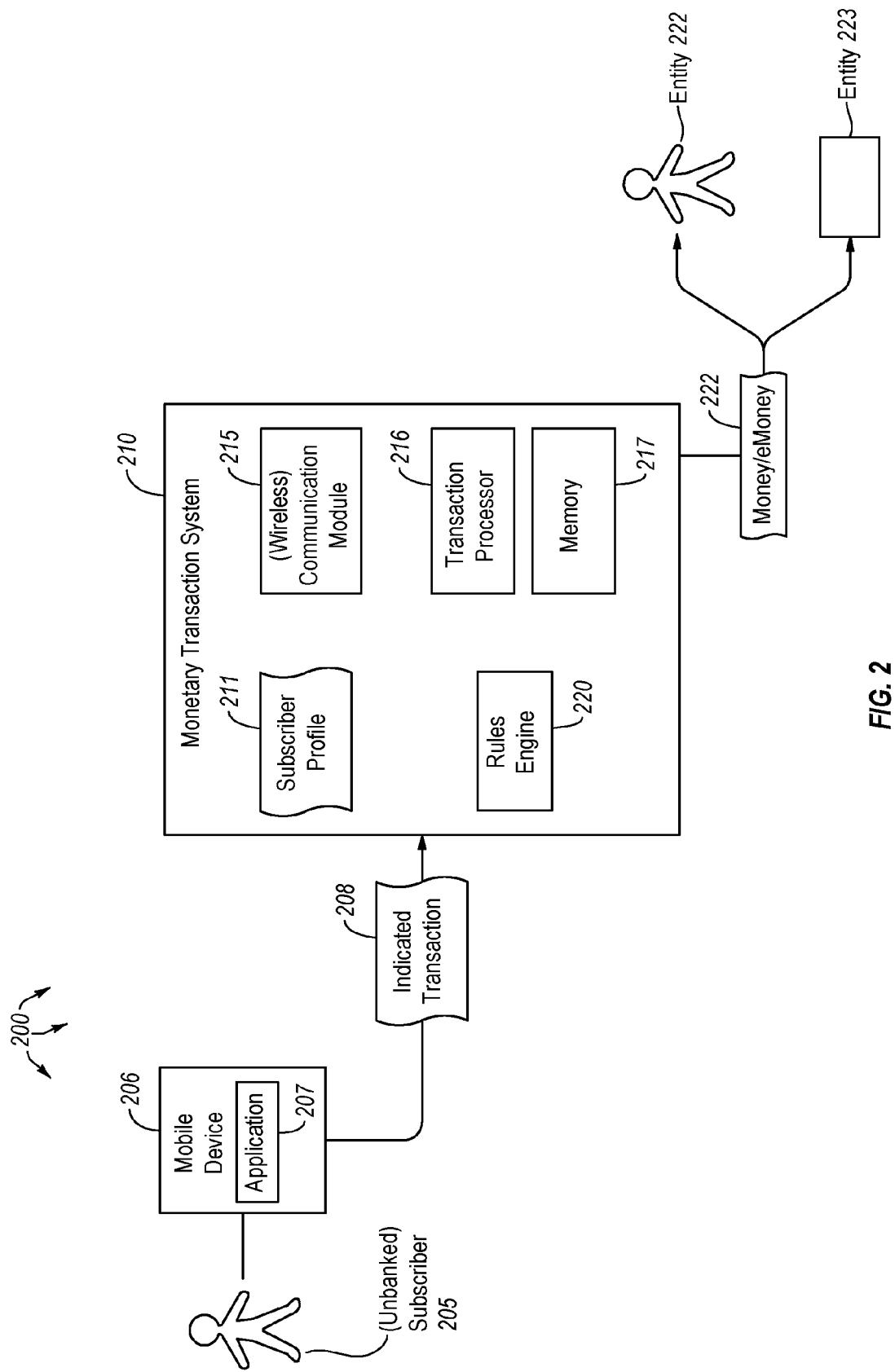
FIG. 2 illustrates an alternate example embodiment of a monetary transaction system.

FIG. 2 depicts a monetary transaction system 200 similar to that described in FIG. 1. The monetary transaction system 200 may provide a more simplified system structure in which each of the above services may be provided. The system includes a subscriber 205. The subscriber may have access to a bank account, or may be an unbanked subscriber. The subscriber has a profile 211 with the monetary transaction system 210. The profile includes the subscriber's KYC information, as well as any associated bank accounts, credit union accounts, bill pay accounts or other accounts. The subscriber has (or has access to) a mobile device 206 such as a phone or tablet. The mobile device runs the mobile wallet application (or mobile wallet application) 207.

The subscriber can indicate, using the mobile application 207 which transaction or other action he or she would like to perform. The indicated transaction 208 is sent to the mobile wallet platform 210 to be carried out by the platform. The transaction processor 216 (which may be similar to or the same as transaction processor 121 of FIG. 1) performs the transaction(s) specified by the (unbanked) subscriber 205. The transaction processor may implement various other components to perform the transaction including memory 217, (wireless) communication module 215, rules engine 210 and/or transaction database 225.

Performing the specified transactions may include communicating with the monetary transaction database 225 to determine whether the transaction is permissible based on data indicated in the unbanked subscriber's profile (for instance, whether the subscriber has enough eMoney in his or her stored value account, or has enough money in his or her bank account). Rules engine 220 may also be consulted to determine whether the subscriber has exceeded a specified number of allowed transactions. Then, if funds are available, and the transaction is otherwise permissible, the monetary transaction system can transfer money or eMoney 221 to or from an entity such as a user or agent (e.g. entity 222) to or from an establishment such as a retail store or agent company (e.g. entity 223).

In some cases, the monetary transaction system 210 application provides a web interface that allows subscribers to perform the same functions provided by the monetary transaction system application. For instance, mobile wallet application 207 may provide a web interface that allows a user to enroll for a mobile wallet. The web interface (or the mobile wallet application itself) receives a subscriber-initiated transaction over one of a plurality of channels (111 from FIG. 1) connected to the monetary transaction system 210. The web interface or mobile wallet application may prompt for and receive enrollment information (e.g. KYC information) for the (unbanked) subscriber 205 over at least one of the plurality of channels (e.g. web, point-of-sale (POS), interactive voice response (IVR, etc.). The web interface or mobile wallet application may then send activation instructions over the same or a different channel to activate the (unbanked) subscriber 205 and create a subscriber account for the (unbanked) subscriber.

Once the subscriber has an account, the monetary transaction system generates a corresponding mobile wallet for the unbanked subscriber (available via the web interface and/or the mobile wallet application. The system then presents the (unbanked) subscriber's account data associated with the mobile wallet and/or a notification indicating that enrollment was successful to the subscriber. Accordingly, the mobile wallet application or the web interface may be used to provide user enrollment functionality. It should also be understood that either the mobile wallet application or the web interface may be used to provide substantially all of the mobile wallet functionality described herein.

It should also be noted that the mobile device 206 may be any type of plan-based phone or tablet, or prepaid phone or tablet. Many subscribers, such as unbanked subscribers, may primarily use prepaid phones. The mobile wallet application 207 may be installed on both plan-based phones and prepaid phones. The mobile wallet application may be installed on the device's SIM card, or on the device's main memory. Accordingly, the monetary transaction system 200 may be accessed and used via substantially any type of plan-based or prepaid mobile device.

Figure 3:
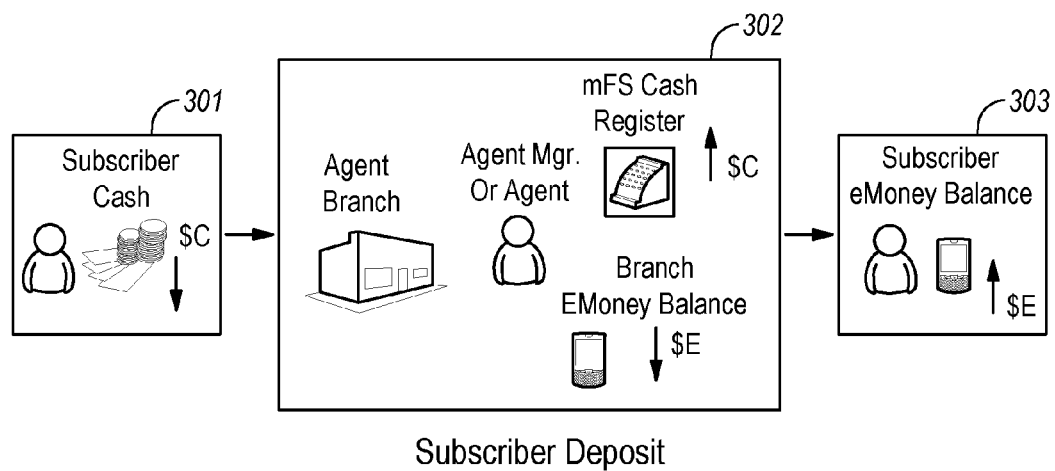
FIG. 3 illustrates an example data flow for performing a subscriber deposit via a mobile wallet.
Figure 3:
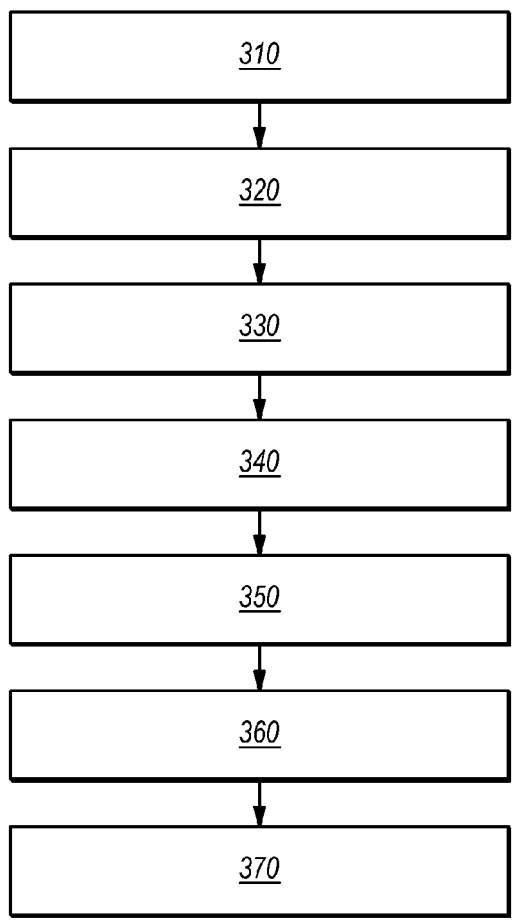

FIG. 3 shows three different graphics (301-303) and corresponding method steps (310-370) that illustrate an unbanked subscriber making a deposit using a mobile wallet (and, by extension, using the mobile wallet transaction system 210). In at least some of the embodiments described below, the actions of each participant are shown and described. This will also, at least in some embodiments, include an illustration of money flow throughout the mobile wallet transaction system. In the graphics, various terms are used as follows: $C=Cash Balance and $E=Electronic Money (eMoney) Balance.

At graphic 301, it is assumed that the unbanked subscriber (e.g. 205) has already registered and activated an eMoney account at an agent branch location (e.g. a retail store, gas station, or other location that has registered to be an agent branch). To deposit cash in order to get eMoney credit, the subscriber informs the agent manager or agent that they want to deposit a certain amount of cash (in 301). The agent manager/agent takes the cash and notifies the mobile wallet transaction system of the deposit using their agent manager or agent application (302). The transaction system 210 then credits the subscriber's eMoney account (303). Accordingly, any location that has registered to accept eMoney payments from subscribers' mobile wallets can also accept cash deposits. The agent branch's eMoney balance is reduced because their actual money balance was increased by the amount of the deposit. The subscriber's mobile wallet account is credited with eMoney in the amount of the deposit. In this manner, a subscriber can deposit cash into their mobile wallet account (in the form of eMoney) at any retail location or other agent branch location.

Thus, the agent manager receives the physical cash deposit into the subscriber's eMoney account via the agent manager or agent's application. The subscriber gives cash to agent manager or agent, and the mFS platform processes the request, updates the agent branch and subscriber's eMoney balances, logs the transaction, and sends details (such as eMoney account balances, transaction logs, etc.) to bank specified by the mobile wallet platform. These details may be sent instantaneously as transactions occur, or in batches at pre-determined intervals.

In one embodiment, the monetary transaction system 210 of FIG. 2 is implemented to deposit funds at an agent branch using a mobile wallet. The monetary transaction system 210 receives communication from an agent branch over one of a plurality of channels (e.g. 111) connected to the monetary transaction system (step 310). The agent communication indicates that the unbanked subscriber 205 desires to deposit a specified amount of funds into the unbanked subscriber's mobile wallet account. The transaction processor 216 then validates the status of the unbanked subscriber's mobile wallet account (step 320) and determines if the agent branch is authorized to receive deposited money (i.e. determine if it has pre-registered as an official agent branch) (step 330).

The monetary transaction system may then use rules engine 220 to perform a limit check (to determine whether sufficient funds are available) and/or a velocity check (to determine whether the user has exceeded a specified number of (hourly, daily, or weekly) transactions) on the unbanked subscriber's mobile wallet account (step 340). The transaction system then credits the unbanked subscriber's mobile wallet account with the specified amount of funds (step 350) and returns a notification to the agent branch confirming the deposit (step 360) and returns another notification to the subscriber notifying the subscriber that the specified amount of funds was deposited in the their mobile wallet account (step 370). Any of channels 111 may be used to perform these communications.

Figure 4:
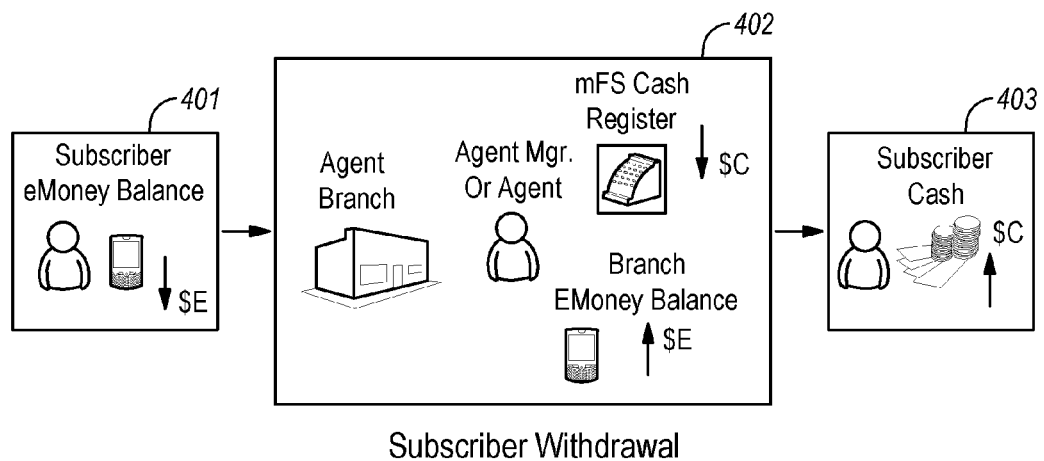
FIG. 4 illustrates an example data flow for performing a subscriber withdrawal via a mobile wallet.
Figure 4:
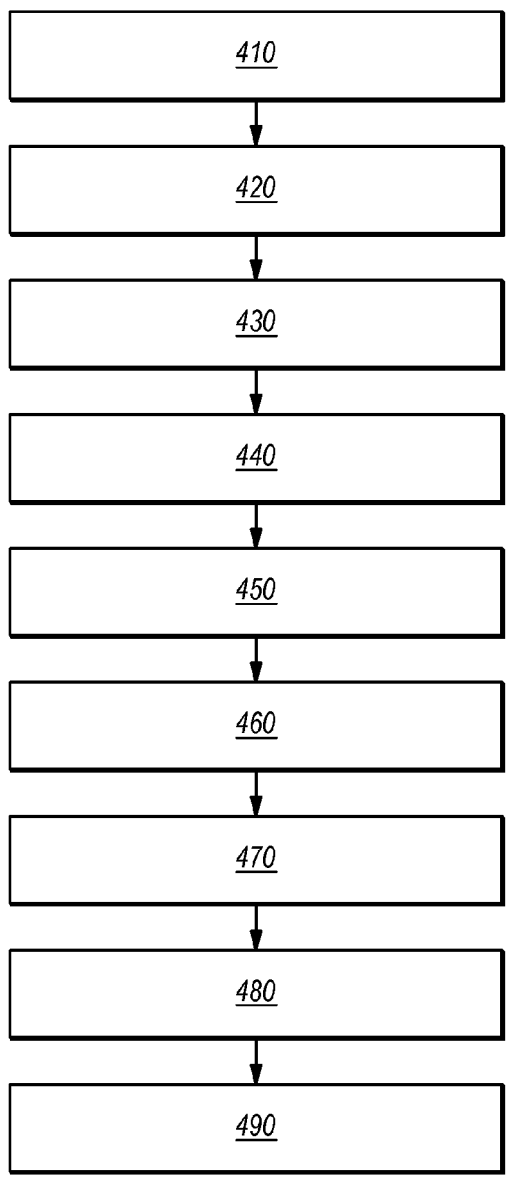

FIG. 4 shows three different graphics (401-403) and corresponding method steps (410-490) that illustrate an unbanked subscriber making a withdrawal using a mobile wallet (and, by extension, using the mobile wallet transaction system 210). As above, the terms in the graphics include "$C" representing cash balance and "$E" representing eMoney balance.

To withdraw cash at an agent branch, a subscriber submits a withdrawal request using their application (401). The subscriber may also enter information about the agent branch (e.g. name of establishment, name of agent, location or other information) that allows the monetary transaction system 210 to identify the agent branch. The transaction processor 216 may then determine whether the unbanked subscriber has enough eMoney to withdraw the requested amount. If he or she does have enough eMoney, then the subscriber's eMoney is deducted and that amount is transferred to the agent branch's eMoney account (402). Then, the agent branch gives the subscriber the requested amount of cash (403). In this manner, any entity that has established itself as an agent branch (including retail stores, gas stations, service providers, etc.) can provide cash withdrawal to a mobile wallet subscriber (whether banked or unbanked). The agent's or agent manager's role is to verify the withdrawal request (e.g. via SMS on the agent's or agent manager's phone) and gives the cash to subscriber. The subscriber requests cash withdrawal from agent branch's eMoney account via the application, and receives physical cash from agent manager/agent. The mobile wallet platform processes the request, updates the agent branch's and subscriber's eMoney balances, logs the transaction, and sends transaction details to a specified bank at pre-determined intervals.

In one embodiment, the monetary transaction system 210 is implemented to withdraw funds at an agent branch using a mobile wallet. The communication module 215 receives a communication from an unbanked subscriber over one of a plurality of channels 111 connected to the monetary transaction system 210 (step 410). The communication indicates that the unbanked subscriber 205 desires to withdraw a specified amount of funds from the unbanked subscriber's mobile wallet account at the agent branch. The monetary transaction system 210 validates the status of the unbanked subscriber's mobile wallet account (step 420) and determines if the balance of the unbanked subscriber's mobile wallet account is sufficient to accommodate the requested withdrawal for the specified amount of funds (step 430).

The transaction processor 216 performs one or more of a limit check (to verify sufficient funds) and a velocity check (to verify the subscriber hasn't exceeded specified transfer limits) on the unbanked subscriber's mobile wallet account (step 440). The monetary transaction system 210 then returns a secure, perishable withdrawal code to the subscriber 205 over at least one of the plurality of channels 111 connected to the monetary transaction system (step 450). The monetary transaction system 210 receives subsequent agent branch communication over at least one of the plurality of channels connected to the monetary transaction system indicating that the withdrawal code has been presented to the agent branch (step 460). The monetary transaction system 210 then debits the unbanked subscriber's mobile wallet account by the specified amount of funds (step 470), returns a notification to the agent branch confirming the withdrawal (step 480) and notifies the subscriber that the specified amount of funds was withdrawn from the unbanked subscriber's mobile wallet account over at least one of the channels 111 connected to the monetary transaction system (step 490). Accordingly, the monetary transaction system 210 may be used to allow subscribers to withdraw cash using their mobile wallet applications at any store or other entity registered as an agent branch.

Figures 5A, 5B:
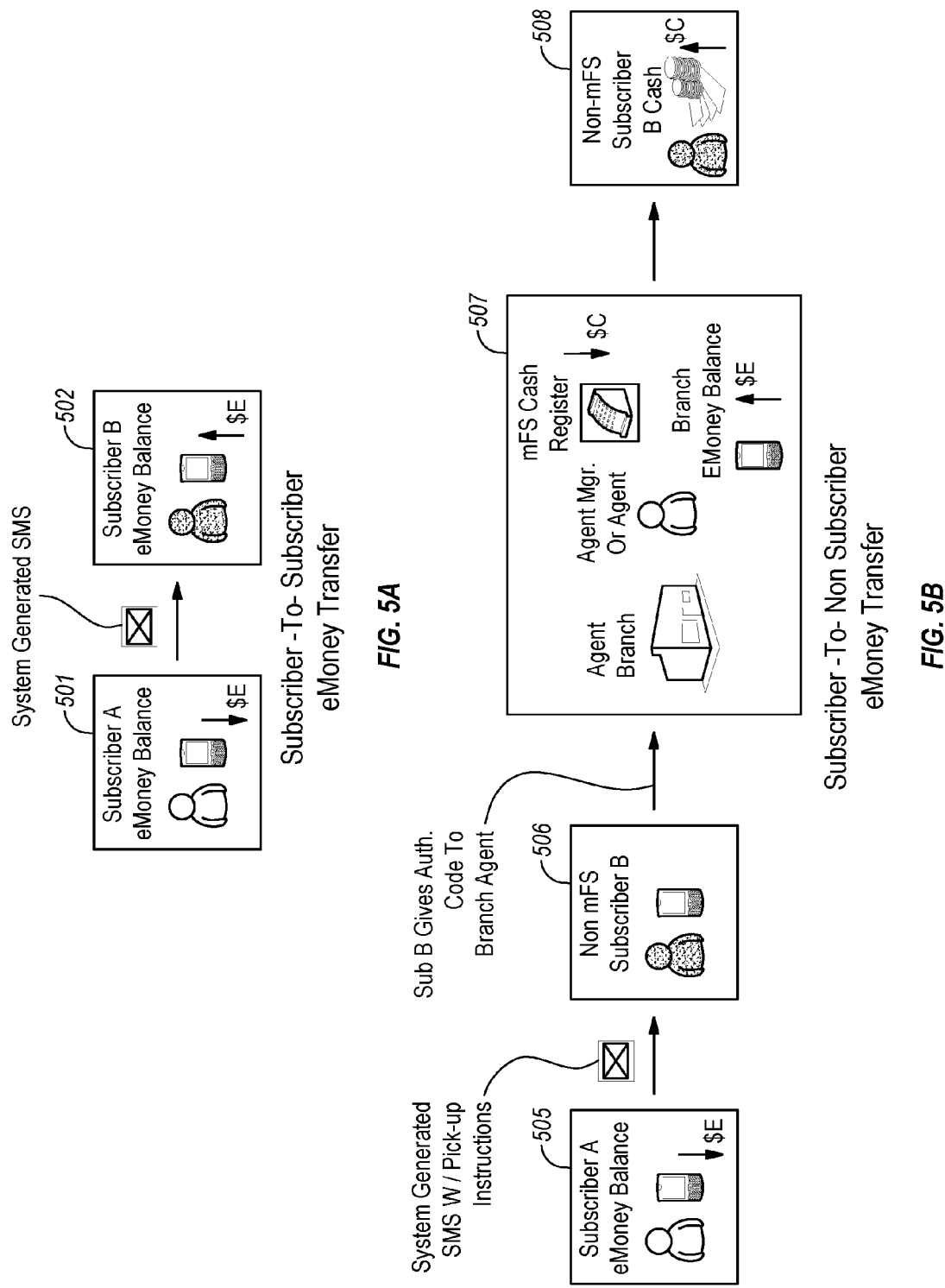
FIGS. 5A and 5B illustrate example data flows for performing subscriber-to-subscriber and subscriber-to-non-subscriber eMoney transfers via a mobile wallet, respectively.

FIG. 5A depicts a subscriber-to-subscriber eMoney transfer. To perform such a transfer, subscriber A (501) enters some type of identification information identifying subscriber B (e.g. subscriber B's phone number) and an amount of money he or she wishes to transfer. The transaction processor 216 of the monetary transaction system 210 determines if there are sufficient funds to complete the transfer. If sufficient funds are available, the monetary transaction system 210 decrements subscriber A's account and credits subscriber B's account (502). The system then sends some kind of notification (e.g. SMS) to subscriber B indicating that a certain amount of money was transferred to their account. Subscriber A may also receive a notification that the transfer was successful. Accordingly, eMoney may be transferred between two mFS platform subscribers, one or both of which may be unbanked. The monetary transaction system 210 processes the subscribers' requests, updates the subscribers' eMoney balances, logs the transactions, and sends transaction information to a specified bank when needed.

FIG. 5B illustrates a subscriber-to-non-subscriber eMoney transfer. In graphic 505, subscriber A wishes to send eMoney to another individual that is not a subscriber to the mFS platform. The transaction is initiated in the same fashion as the subscriber-to-subscriber transfer scenario. However, since non-subscriber B does not have a mobile wallet account, the monetary transaction system 210 cannot credit them with eMoney. Instead, the monetary transaction system 210 sends a notification (e.g. via SMS) to non-subscriber B with instructions for how to pick-up the transferred money, along with an authorization code (506). The monetary transaction system 210 puts a hold on subscriber A's account for the amount transferred. Subscriber B then has a specified number of days to pick up the cash before the hold expires and the amount is credited back to subscriber A's eMoney account by the monetary transaction system 210.

When non-subscriber B goes to pick up the money at an agent branch, the agent branch's manager or agent verifies the authorization code via an agent manager or agent mobile wallet application (that, in turn, accesses the mFS platform). Once the transfer has been validated, the agent gives the cash to non-subscriber B. The agent branch's mFS account is credited with the transfer amount (507) and the user leaves with the cash in hand (508). The mFS platform processes the transfer request, updates subscriber A's eMoney balance, logs the transaction, and sends transaction details to a platform-specified bank.

Figure 6A:
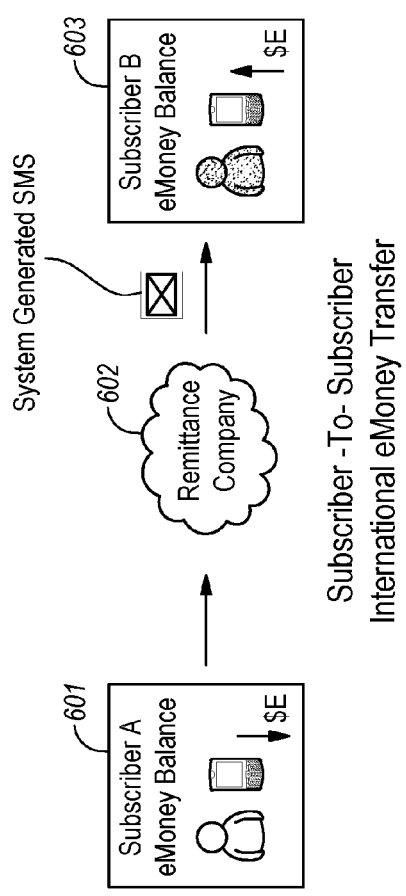
FIGS. 6A and 6B illustrate example data flows for performing subscriber-to-subscriber and subscriber-to-non-subscriber international eMoney transfers via a mobile wallet, respectively.

FIG. 6A illustrates a subscriber-to-subscriber international eMoney transfer. This embodiment is, at least in some respects, similar to sending eMoney to an mFS subscriber domestically. In this case the monetary transaction system 210 leverages one or more existing international money transfer organizations or "remittance companies" such as MoneyGram®. In some embodiments, MoneyGram® is pre-integrated to the monetary transaction system 210, but other international money transfer organizations may also be used. Still further, at least in some embodiments, subscriber B may need to have an eMoney account with a foreign mFS program that is also affiliated with MoneyGram® or another international money transfer organization.

In FIG. 6A, subscriber A initiates the international eMoney transfer at 601, the international money transfer organization (e.g. MoneyGram®) transfers the eMoney to subscriber B at 602 and subscriber B's eMoney balance is increased by the transferred amount. Thus, subscriber A requests to send eMoney from his or her eMoney account via the mobile wallet application. The eMoney is transferred using an international money transfer organization, and subscriber B receives a notification (that may, for example, include a reference number, among other information) that their eMoney balance has increased by the transfer amount. The monetary transfer system 210 processes subscriber A's request, updates subscriber A's and subscriber B's eMoney balances, logs the transaction, and send transaction details to a mFS platform-specified bank.

Figure 6B:
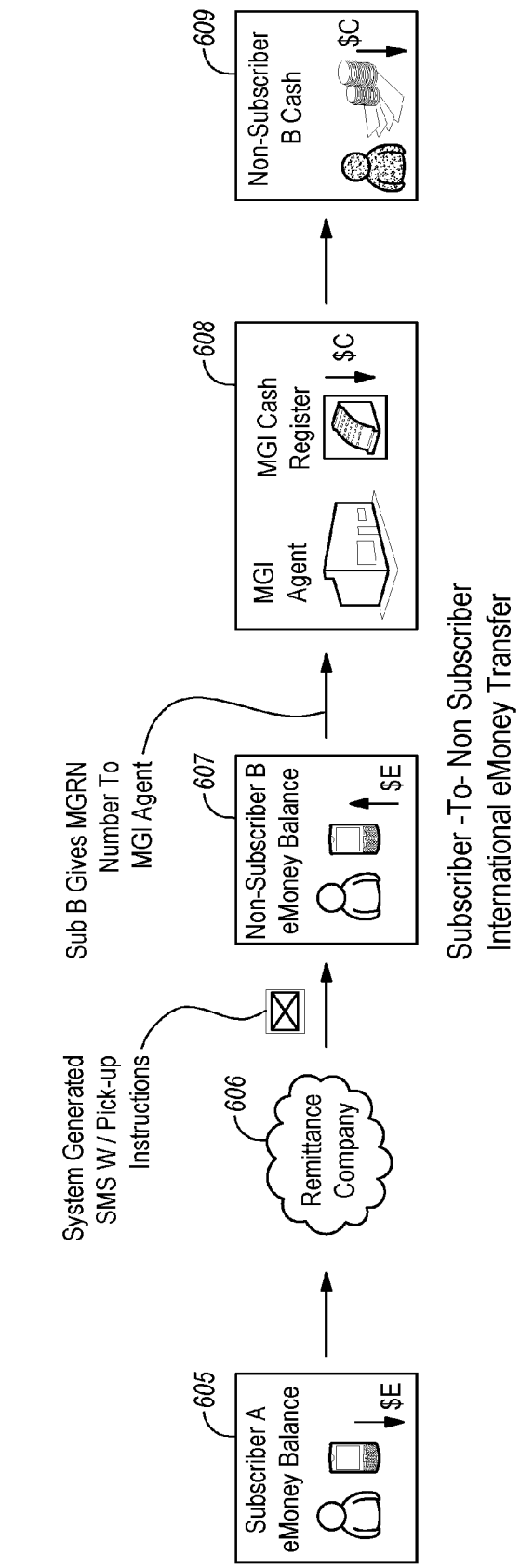

FIG. 6B illustrates a subscriber-to-non-subscriber international eMoney transfer. In this illustration, subscriber A wishes to send cash to subscriber B who is not an mFS program subscriber. Similar to the scenario described in FIG. 6A, the monetary transaction system 210 leverages various international money transfer organizations or remittance companies such as MoneyGram® to transfer the eMoney. Subscriber A initiates a typical eMoney transfer at 605 by providing non-subscriber B's identification information, as well as the amount to be transferred. The Monetary transaction system 210 recognizes the eMoney transfer is not destined for a domestic phone number and routes the request to the international money transfer organization (e.g. MoneyGram®) (606).

The international money transfer organization sends non-subscriber B a notification (e.g. via SMS) with instructions for how and where to pick up the money (in embodiments where MoneyGram® transfers the eMoney, the notification may include a MoneyGram® reference number (MGRN)) (607). Non-subscriber B can then show the MGRN to an agent at an agent branch (608) and then receive the cash (609). The monetary transaction system 210 then decrements subscriber A's eMoney account for the transferred amount. The monetary transfer system 210 thus processes subscriber A's transfer request, updates subscriber A's eMoney balance, logs the transaction, and sends transaction detail to a platform-specified bank. It should also be noted that an mFS subscriber may also receive money in a foreign country from either a subscriber or a non-subscriber in a similar manner.

Figure 7:
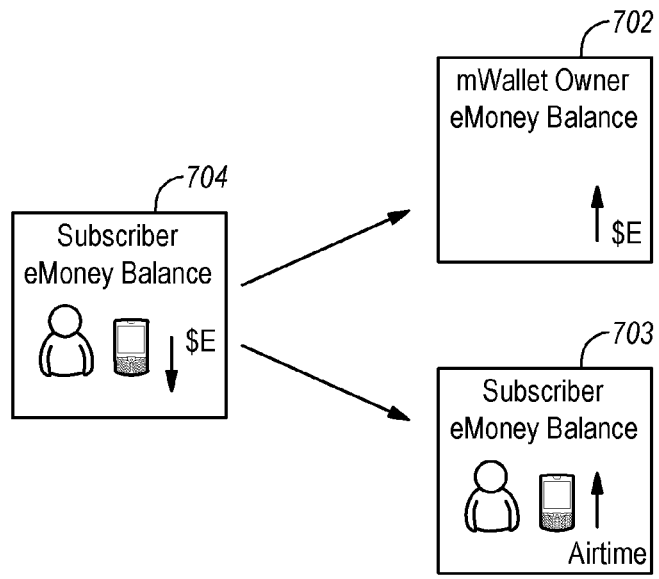
FIG. 7 illustrates an example data flow for performing a subscriber airtime purchase via a mobile wallet.
Figure 7:
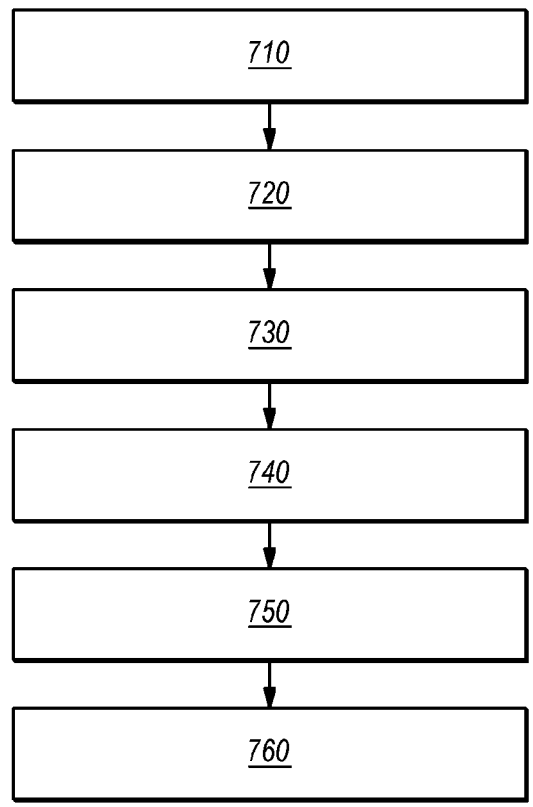

FIG. 7 illustrates a subscriber purchasing airtime using a mobile wallet. Mobile wallet platform subscribers may buy airtime by using their mobile wallet application 207. The monetary transaction system 210 will reload their airtime account within the mobile network operator's (MNO's) systems. The subscriber requests to purchase airtime by entering the request via the mobile wallet application or via a mobile wallet web interface. The monetary transaction system 210 then decrements the subscriber's eMoney account (701), while crediting the mFS platform's eMoney account (702). The purchased airtime is then added to the subscriber's airtime balance (703). The monetary transaction system 210 processes the subscriber's request, updates the subscriber's eMoney balances as well as its own eMoney balance, logs the transaction, and sends transaction detail to a mFS platform-specified bank.

In one embodiment, the monetary transaction system 210 is implemented to top up a prepaid mobile account from a mobile wallet. The communication module 215 of the monetary transaction system 210 receives a subscriber communication over one of a plurality of channels 111 connected to the monetary transaction system (step 710). The subscriber communication indicates that an unbanked subscriber 205 desires to top up a prepaid mobile account by a specified amount using a specified payment method from the unbanked subscriber's mobile wallet. The transaction processor 216 validates the status of the selected payment method (step 720) and performs a limit check and/or a velocity check on the selected payment method (step 730). The monetary transaction system 210 then debits the specified payment method by the specified amount of funds (step 740) and processes the mobile top-up via a billing system integrator and/or an aggregator (step 750), and notifies the subscriber that the prepaid mobile account was topped up over at least one of the channels connected to the monetary transaction system (step 760).

Figure 8:
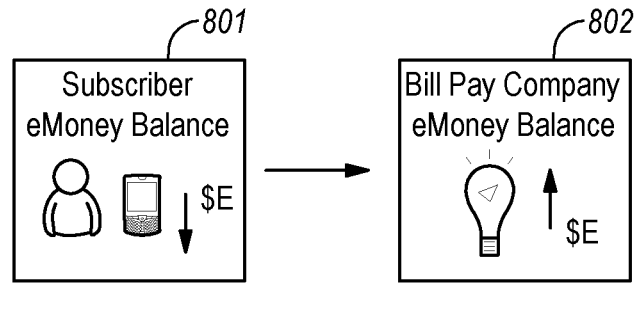
FIG. 8 illustrates an example data flow for performing a subscriber-initiated bill pay via a mobile wallet.
Figure 8:
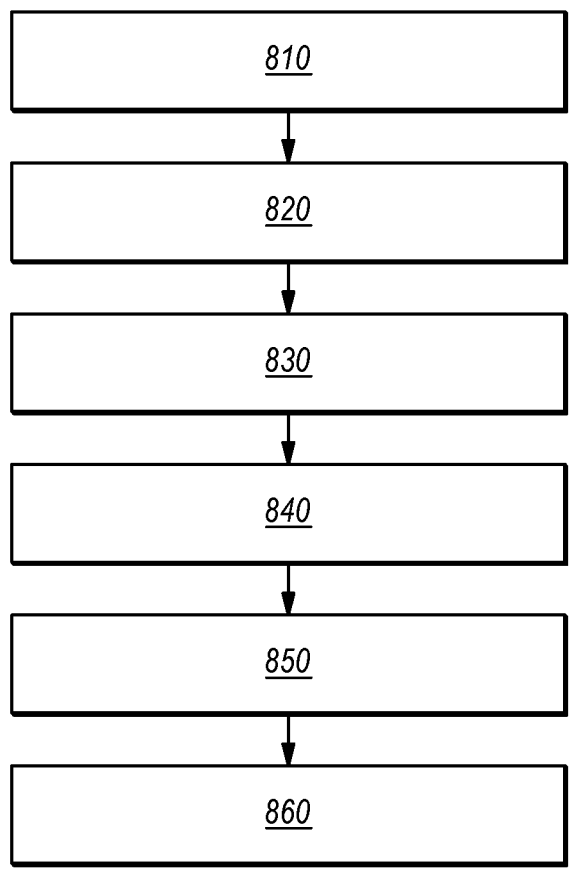

FIG. 8 illustrates an embodiment where a mFS subscriber pays a bill using a mobile wallet. At least in some embodiments, the company that the subscriber wishes to pay needs to have signed-up to be part of the mFS platform. The mFS platform may publish a list of company names that have registered to be part of the mFS platform. This list of companies may include company IDs so that subscribers can know which company ID to enter in their mobile wallet application. Once the company ID is known, the subscriber can pay a bill by entering the company ID and the amount to be paid. The monetary transaction system 210 then decrements the subscriber's eMoney account (801) and credits the identified company's eMoney account (802). Accordingly, in response to the subscriber's request to pay bill via their mobile wallet application, the monetary transaction system 210 processes the request, updates the bill pay company's and the subscriber's eMoney balances, logs the transaction, and sends transaction details to the mFS platform-specified bank.

In one embodiment, the monetary transaction system 210 is implemented to pay a bill from a mobile wallet. The communications module 215 of the monetary transaction system 215 receives a subscriber communication over a communication channel 111 connected to the monetary transaction system (step 810). The subscriber communication indicates that unbanked subscriber 205 desires to pay a bill for a specified amount using a specified payment method from the unbanked subscriber's mobile wallet (e.g. eMoney). The monetary transaction system 210 validates the status of the selected payment method (step 820) and performs a limit check and/or a velocity check on the selected payment method to ensure the eMoney transfer is permissible (step 830). The monetary transaction system then debits the specified payment method by the specified amount of funds (step 840), processes the bill payment via a direct biller connection or a bill pay aggregator (step 850), and notifies the unbanked subscriber that the bill was paid using a communication channel (e.g. SMS) connected to the monetary transaction system (step 860). Thus, in this manner, a subscriber may use a mobile wallet to pay various bills including rent, utility, mortgage, phone, cable, medical and other bills.

Figure 9:
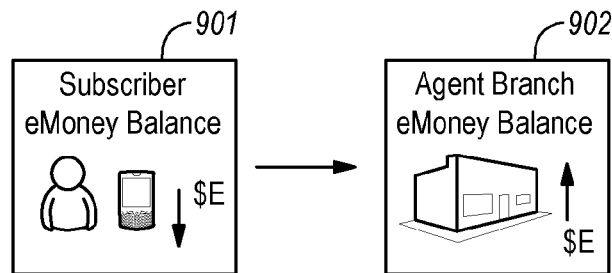
FIG. 9 illustrates an example data flow for performing a subscriber-initiated retail purchase via a mobile wallet.
Figure 9:
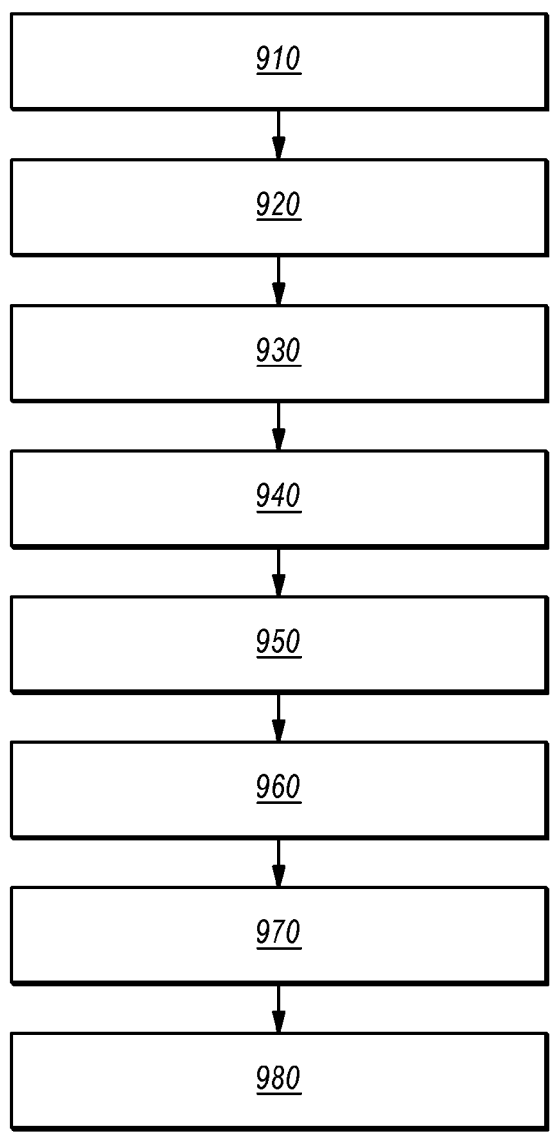

FIG. 9 illustrates a mobile wallet subscriber making a retail purchase.

Mobile wallet subscribers can make retail purchases at agent branches directly from their mobile device. Agent branches, as explained above, are retail stores or other entities that have registered with the mFS system and are able to accept mobile wallet payments. Accordingly, a subscriber can select the items they wish to purchase, and indicate (via the mobile wallet application) to the agent branch that they wish to pay for the items. The mobile wallet application then communicates with the agent branch and the monetary transaction system to indicate the price of the transaction. The monetary transaction system 210 then debits the subscriber's eMoney account (901) and credits the agent branch's eMoney account (902). The agent branch (and/or the agent manager or agent) receives confirmation that subscriber paid for the purchase. The subscriber may also receive a summary of the retail purchase and may be asked to confirm the purchase by entering a PIN. The monetary transaction system processes the purchase request, updates the agent branch and subscriber's eMoney balances, logs the transaction, and sends transaction details to a mFS platform-specified bank.

In one embodiment, the monetary transaction system 210 is implemented to make a purchase from a mobile wallet. The communications module 215 of the monetary transaction system 210 receives a communication from a subscriber over a communication channels 111 (step 910). The subscriber communication indicates that an unbanked subscriber 205 desires to purchase an item for a specified amount of funds using a specified payment method from the unbanked subscriber's mobile wallet.

The monetary transaction system 210 then returns a secure, perishable purchase code to the unbanked subscriber over at least one of the channels connected to the monetary transaction system (step 920) and receives a subsequent agent branch communication over a channel indicating that the purchase code has been presented to an agent (branch) (step 930). The monetary transaction system 210 validates the status of the specified payment method (step 940), determines if the specified payment method can accommodate a purchase for the specified amount (step 950), performs a limit check and/or a velocity check on the selected payment method (960), debits the specified payment method by the specified amount of funds (970), returns a notification to the agent branch authorizing the purchase (980) and sends a receipt to the unbanked subscriber over a communication channel. The monetary transaction system 210 may thus be used to make a retail purchase using a mobile wallet.

Figure 10A:
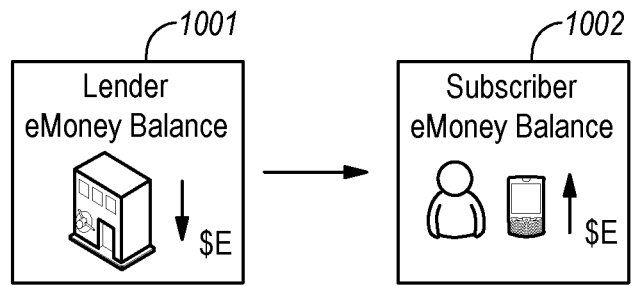
FIGS. 10A and 10B illustrate example data flows for requesting and repaying micro-loans via a mobile wallet, respectively.

FIG. 10A illustrates a subscriber requesting a micro-loan. Financial institutions and potentially other mFS program participants may sign up to become money or eMoney lenders. Mobile wallet subscribers may be able to use their mobile wallets to request micro-loans from these approved lenders. The micro-loans are tracked by the monetary transaction system 210, and repayment reminders, interest and commissions are managed by the monetary transaction system. The subscriber requests a micro-loan from a lender, indicating the amount in the request, as well as other information such as the repayment date and the commission (i.e. interest rate). Potential lenders then have a chance to counter the loan request with their own terms. Once the lender approves the subscriber's request, the lender's eMoney account balance is debited for the specified amount (1001) and the subscriber's eMoney account is credited with the requested amount (1002). The monetary transaction system 210 processes the micro-loan requests, update the lender and subscriber's eMoney balances, sets up repayment schedules and reminders, logs the transaction, and sends transaction detail to a mFS bank. It should also be noted that while the term "micro-loan" is used herein, the loan may be for substantially any amount of money.

Figure 10B:
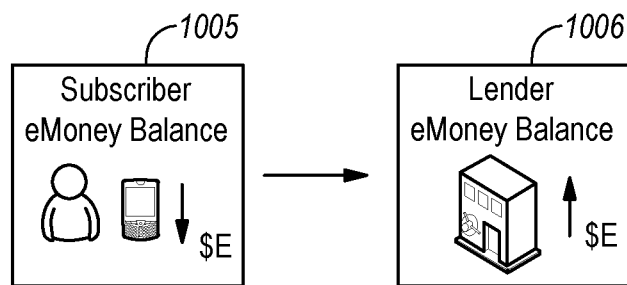

Following on the embodiment described in FIG. 10A, FIG. 10B illustrates a subscriber repaying a micro-loan. The subscriber may repay the loan using functionality provided in the mobile wallet application or in a similar web interface. Repayments can be made in installments or in full depending on the rules of the micro-loan. The subscriber enters the amount they wish to repay and the loan ID. The subscriber's eMoney account is then debited for the specified amount (1005), while the lender's eMoney account is credited the specified amount (1006). Both the lender and the subscriber may receive confirmation that the loan has been repaid via SMS or some other communication channel. The mFS platform thus processes the subscriber's micro-loan repayment request, updates lender and subscriber's eMoney balances, updates repayment schedule and reminders, logs the transaction, and sends transaction details to a specified mFS platform bank.

Figure 11A:
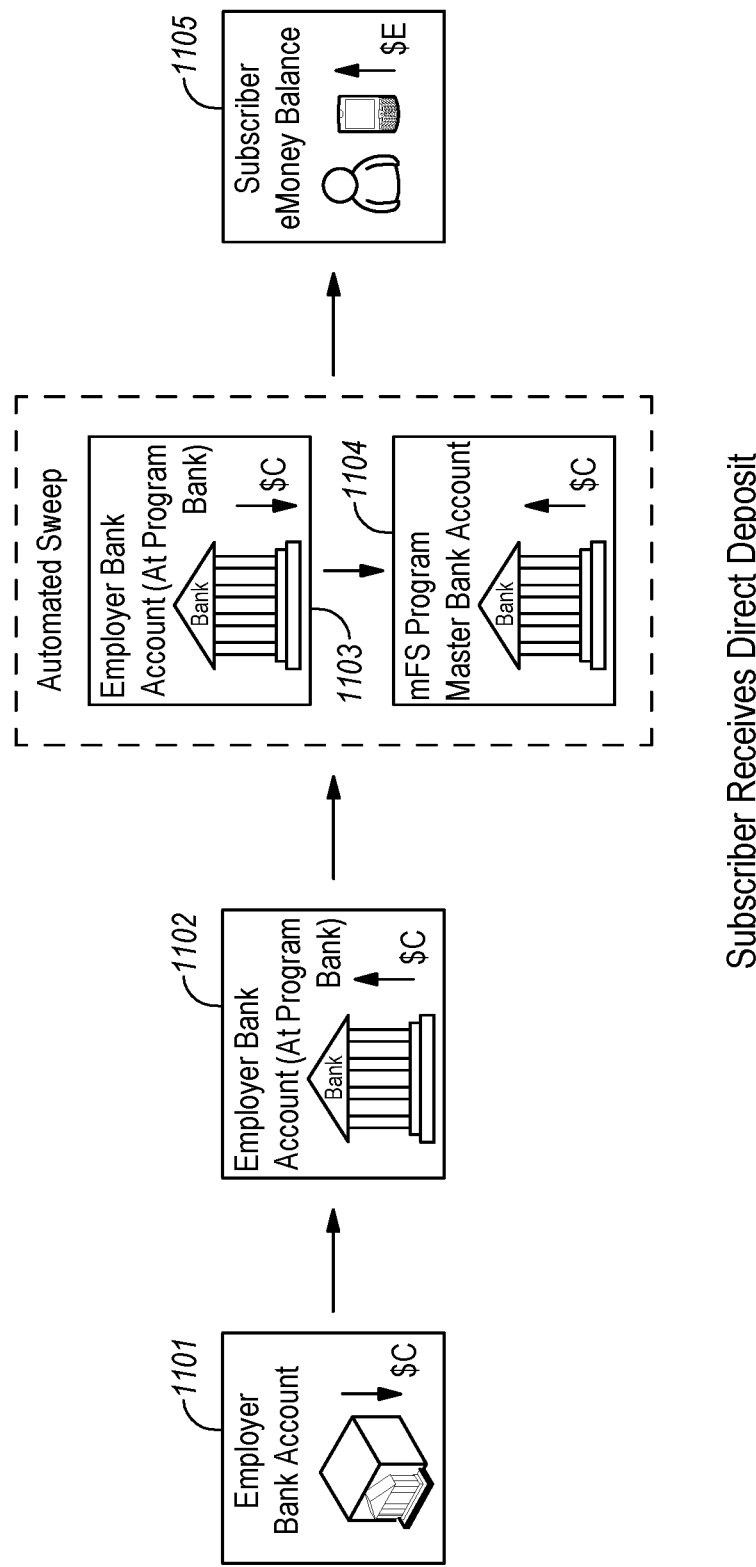
FIG. 11A illustrates an example data flow of a subscriber receiving a direct deposit via a mobile wallet.

FIG. 11A illustrates a subscriber receiving a direct deposit from an employer or other entity. Subscribers to the mFS platform have the ability to receive any direct deposit into their eMoney account. Subscribers may be asked by their employers to provide account information in order to set up direct deposit. The employer then submits a direct deposit request using their existing processes (i.e the processes they use for a normal checking or savings bank account). Once the direct deposit is set up and a payday arrives, the employer's bank account is debited for the proper amount (1101) and the employer's mFS account is credited with that amount (1102). Then, once the funds have been received at the mFS platform bank, the mFS platform bank sweeps the employers direct deposit balance (1103) into a mFS platform master account (1104) and notifies the mFS platform of each account to be incremented (including the subscriber's mobile wallet (eMoney) account). The subscriber's eMoney account is then credited with the paycheck amount (1105) upon which the eMoney may be used to pay for goods, pay bills, top up airtime, transfer to other entities or for cash withdrawal.

The subscriber does not need to have a bank account to participate in direct deposit. The employer's bank can communicate with the mFS platform's bank to perform the necessary steps in directly depositing the subscriber's paycheck in his or her eMoney mobile wallet account. The bank facilitates monetary deposit into the employer's bank account for direct deposit and performs an automated sweep of recent deposits from the employer's bank account into the mFS platform's master bank account. The bank also sends transaction details to the monetary transaction system 210 including transaction logs. The monetary transaction system receives a list of eMoney accounts that are to be credited directly from the employer (or bank), processes the list and requests to establish a direct deposit, updates subscriber's eMoney balance, log the transaction, and sends transaction details to the mFS platform bank.

Figure 11B:
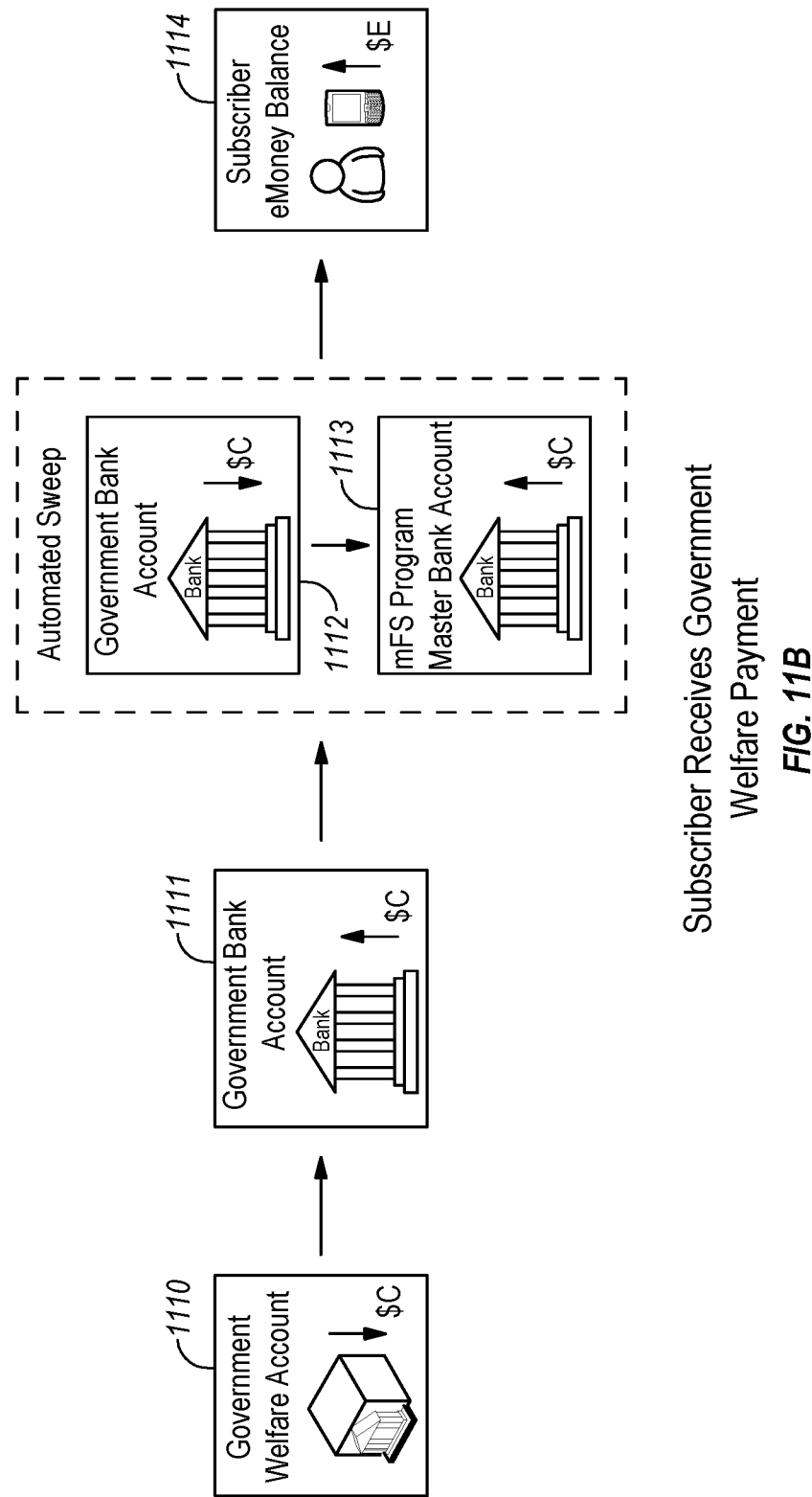
FIG. 11B illustrates an example data flow of a subscriber receiving a governmental welfare payment via a mobile wallet.

In a similar manner, a subscriber may receive a government welfare payment directly on their mobile device. FIG. 11B illustrates a subscriber receiving a government social welfare payment directly into their eMoney account. In some embodiments, subscribers may need to opt-in and register with the government program for which they choose to receive the payment via their mobile wallet. Once the funds have been received, the subscriber can use that eMoney for any goods or services, as described above. Once the direct deposit has been established and a payout has been initiated, the government's welfare account deposits the money (1110) into the government's bank account for welfare payments (1111) and performs an automated sweep of recent deposits from the government's bank account (1112) into the mFS program's master bank account (1113). The bank then sends transaction details to the monetary transaction system 210 regarding the deposit. The subscriber receives a notification that the welfare payment has been credited to their eMoney account (1114). The mFS platform receives an indication of eMoney accounts that are to be credited from the government, processes the welfare payments, updates the subscriber's eMoney balance, logs the transactions, and sends transaction details to the mFS platform bank.

Figure 12A:
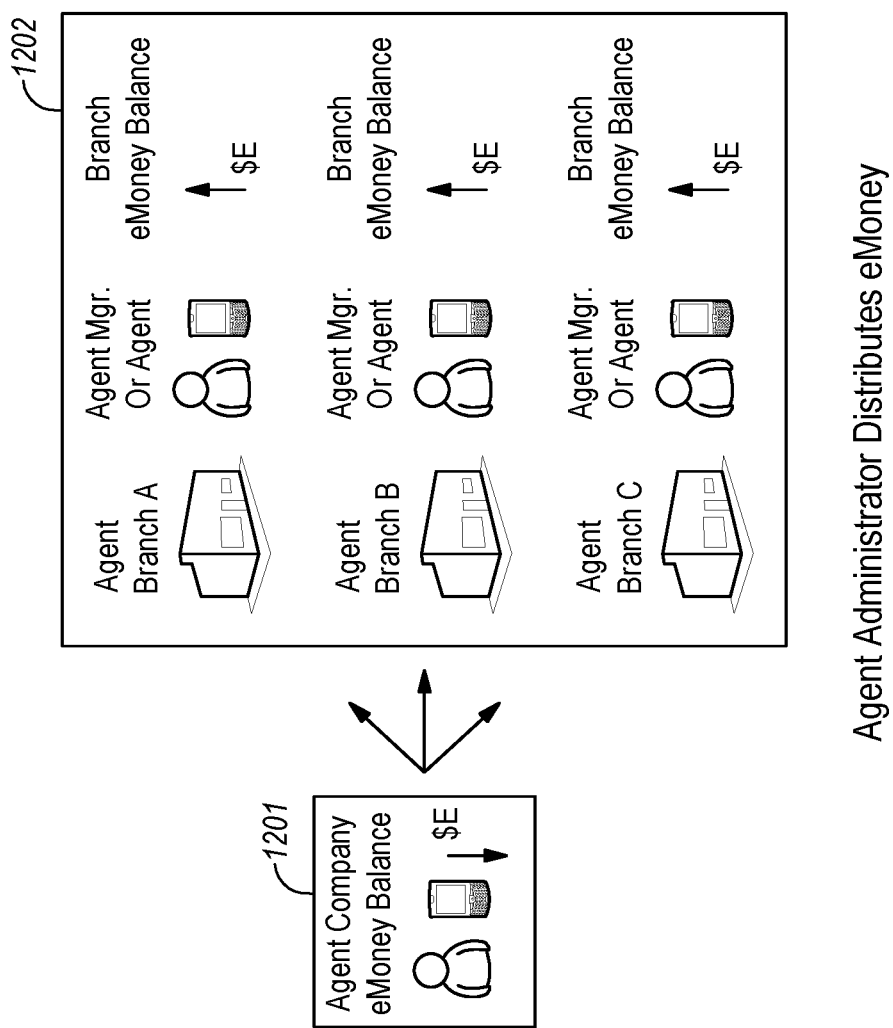
FIG. 12A illustrates an example data flow of an agent administrator distributing eMoney via a mobile wallet.

FIG. 12A illustrates an agent administrator distributing eMoney to various recipients. An agent administrator, as explained above, is a person who acts as an agent company's representative. The agent administrator deposits, withdraws, and distributes funds into and out of the agent company's bank account. When an agent administrator deposits cash into an agent company's bank account, it is credited as eMoney to the agent company's account. In order to provide the agent branches with eMoney, the agent administrator first moves the eMoney from the agent company's account (1201) to the branch accounts (1202). This is performed using the agent administrator's mobile wallet application or portal. In an agent administrator money transfer, the monetary transaction system 210 processes the administrator's eMoney transfer request, updates the agent company and agent branch eMoney balances, logs the transaction, and sends transaction details to the mFS platform bank.

Figure 12B:
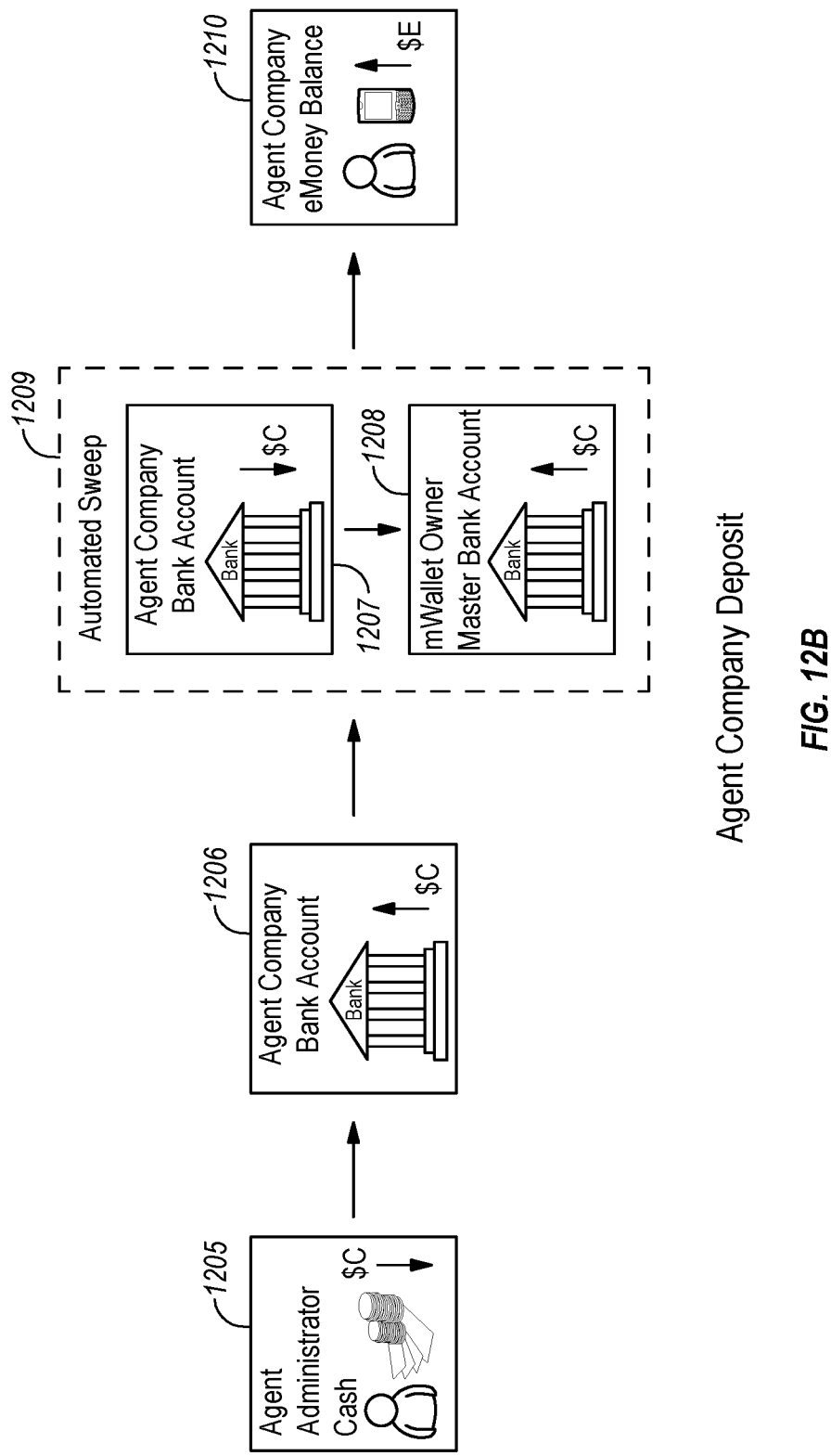
FIG. 12B illustrates an example data flow of an agent company making a deposit using a mobile wallet.

FIG. 12B illustrates an agent company deposit. The agent company has an eMoney account in the monetary transaction system 210 that may also include a corresponding bank account (that may be created automatically upon creation of the agent company's eMoney account). After the agent company's bank account has been set up, the agent administrator can make deposits into that account. As FIG. 12B shows, once cash (1205) has been deposited into the bank account (1206), it is transferred to a mFS platform master account (1208) that includes all or a part of the mFS platform's funds. The agent company's bank account is decreased by the deposit amount (1207), while the agent company's eMoney account balance is correspondingly increased (1210). At this time, the agent company account is credited with eMoney. The agent company's bank facilitates a physical cash deposit into the agent company's bank account and performs an automated sweep (1209) of recent deposits from the agent company's bank account into the mFS platform's master bank account. The agent company's bank then sends transaction details to the monetary transaction system 210. The agent administrator physically delivers the cash (or form of money such as a check or money order) to a bank branch for deposit. The monetary transfer system receives transaction details from the agent company's bank about recent transactions (including deposits, as shown in FIG. 12B.

Figure 13:
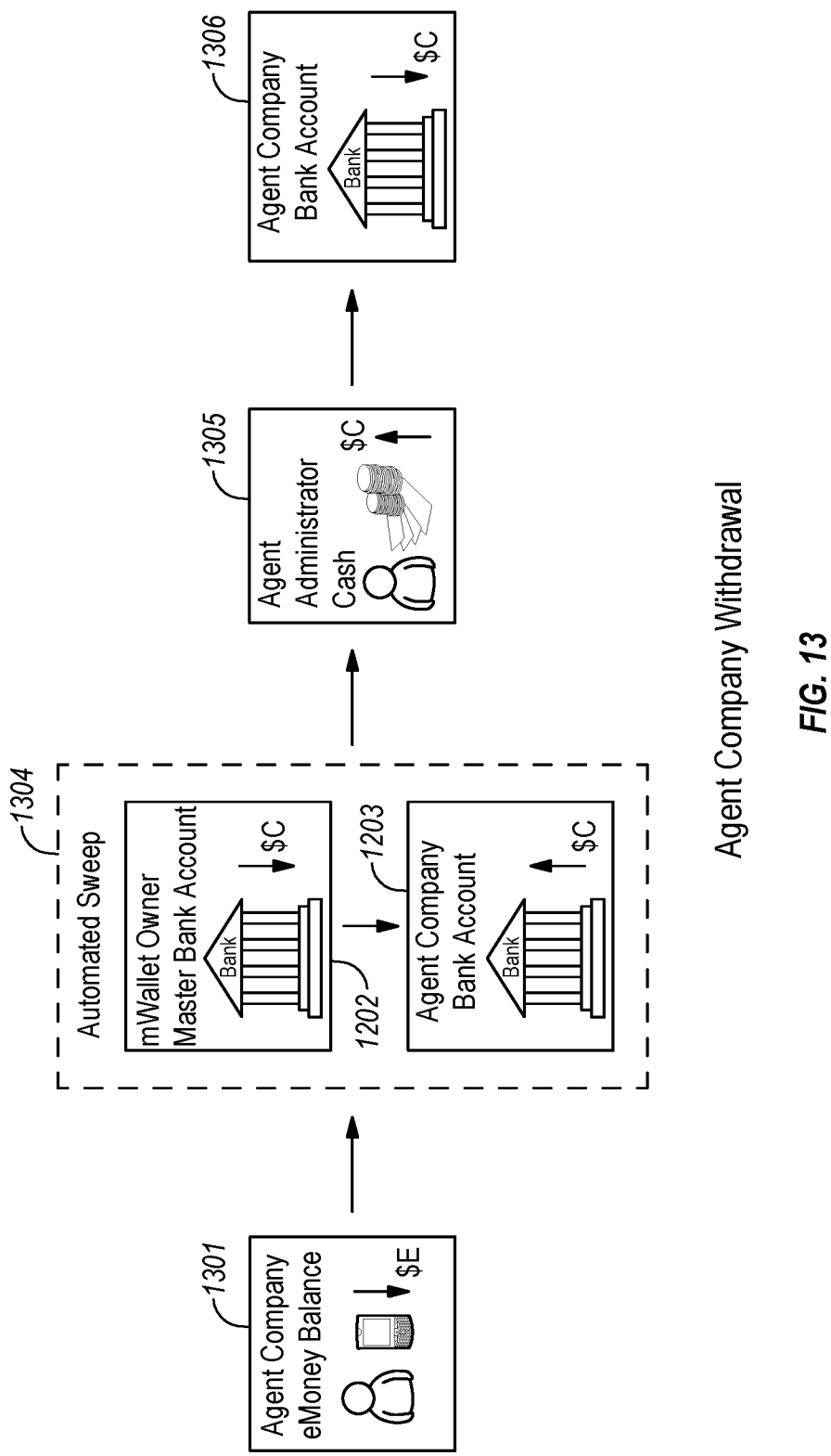
FIG. 13 illustrates an example data flow of an agent company making a withdrawal using a mobile wallet.

FIG. 13 illustrates an agent company withdrawal. To make a cash withdrawal for an agent company, the agent administrator requests a withdrawal using the agent administrator mobile wallet application. The monetary transaction system 210 then notifies the bank that a certain amount of eMoney is to be transferred from the master mFS account (1302) to the agent company bank account (1303). When the money is in the agent company bank account, the agent administrator can withdraw the cash by traditional withdrawal means. The mFS master bank receives transaction details from the monetary transaction system 210 about recent transactions (recent withdrawals in this case). The mFS master bank performs an automated sweep (1304) of the mFS platform's master bank account to reflect the recent withdrawal request from agent the agent company (1301). The agent company's eMoney account is reduced by the amount of the withdrawal. The agent company also sends transaction details to the monetary transaction system 210. The agent administrator can request withdrawal via the agent administrator mobile wallet application and physically withdrawal cash (1305) from the agent company's bank branch (1306). The mFS platform processes the agent company's withdrawal request, updates agent company and agent branch eMoney balances, logs the transaction, and sends transaction details to an mFS platform-specified bank.

Attention will now be turned to embodiments in which subscribers have bank accounts associated with their mobile wallets. The monetary transaction system 210 provides similar functionality to consumers that have bank or credit union accounts. Although many different transactions are presented herein, many more and varied types of transactions may be processed by the monetary transaction system. In the following figures, "$C" refers to cash balance, "$DC" refers to a debit card (prepaid) balance and "$PIN" refers to a recharge PIN value.

Figure 14:
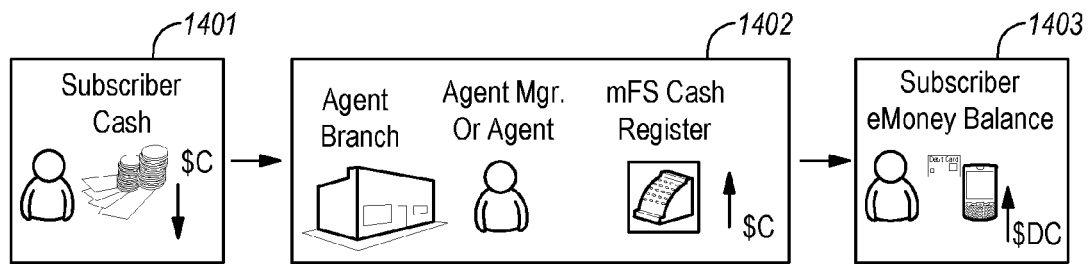
FIG. 14 illustrates an example data flow of a subscriber making a deposit at an agent branch using a mobile wallet.
Figure 14:
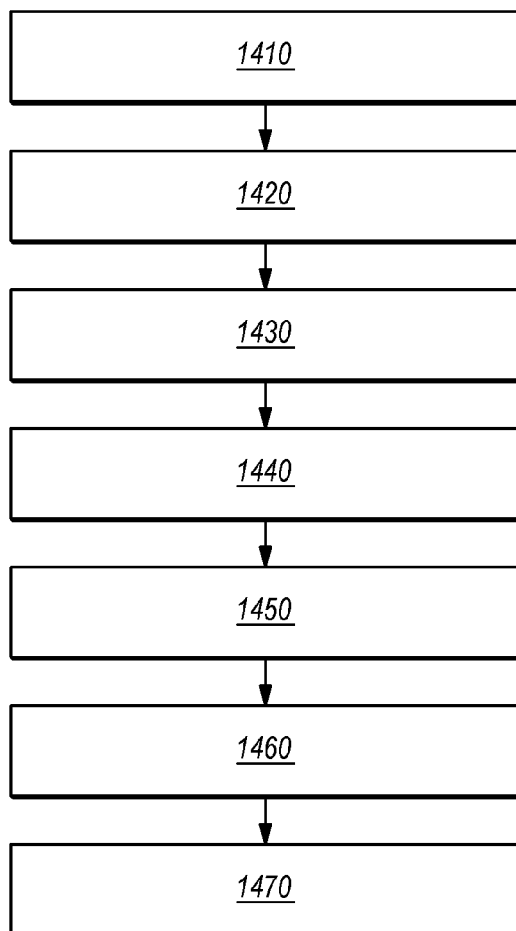

FIG. 14 describes a subscriber deposit at an agent branch. The subscriber has a registered and activated (prepaid) debit card at an agent branch location. The prepaid debit card is associated with the mobile wallet application in the subscriber's mobile device. As such, the debit card is linked to the subscriber's account in the monetary transaction system 210. To deposit cash onto the mobile wallet, the subscriber informs the agent that they want to deposit a specified amount of cash (1401). The agent takes the cash and notifies the monetary transaction system 210 of the deposit using their point of sale (POS) system or the agent mobile wallet application (1402), and the monetary transaction system 210 credits the subscriber's mobile wallet account (1403). The funds collected at the cash register typically do not reach a bank account until the reconciliation and settlement of funds occurs between the agent and the mFS owner's bank.

The subscriber's bank then receives a settlement report from the card processor and receives funds from the agent's bank. The agent or agent manager physically deposits the cash into the subscriber's mobile wallet account via their POS system or agent manager/agent mobile wallet application. The monetary transaction system processes the deposit request, increments the subscriber's mobile wallet balance within the card processor and logs the transaction. An external card processor increments the subscriber's mobile wallet balance and sends reports to the bank for settlement on a regular (e.g. nightly) basis.

In one embodiment, the monetary transaction system 210 is implemented to deposit funds into a bank or credit union account using a mobile wallet. The communications module 215 of the monetary transaction system 210 receives communication from an agent branch over a communication channel (step 1410). The agent communication indicates that a subscriber 205 desires to deposit a specified amount of funds into a bank or credit union account. The transaction processor 216 validates the status of the bank or credit union account (step 1420), determines if the agent branch is authorized to deposit money (step 1430), and performs a limit check and/or a velocity check on the bank or credit union account (step 1440). The monetary transaction system then credits the bank or credit union account with the specified amount of funds (step 1450), returns a notification to the agent branch confirming the deposit (step 1460) and notifies the subscriber that the specified amount of funds was deposited in the bank or credit union account using at least one of the communication channels connected to the monetary transaction system (step 1470). Accordingly, cash may be deposited into a bank or credit union account associated with a subscriber's mobile wallet.

Figure 15:
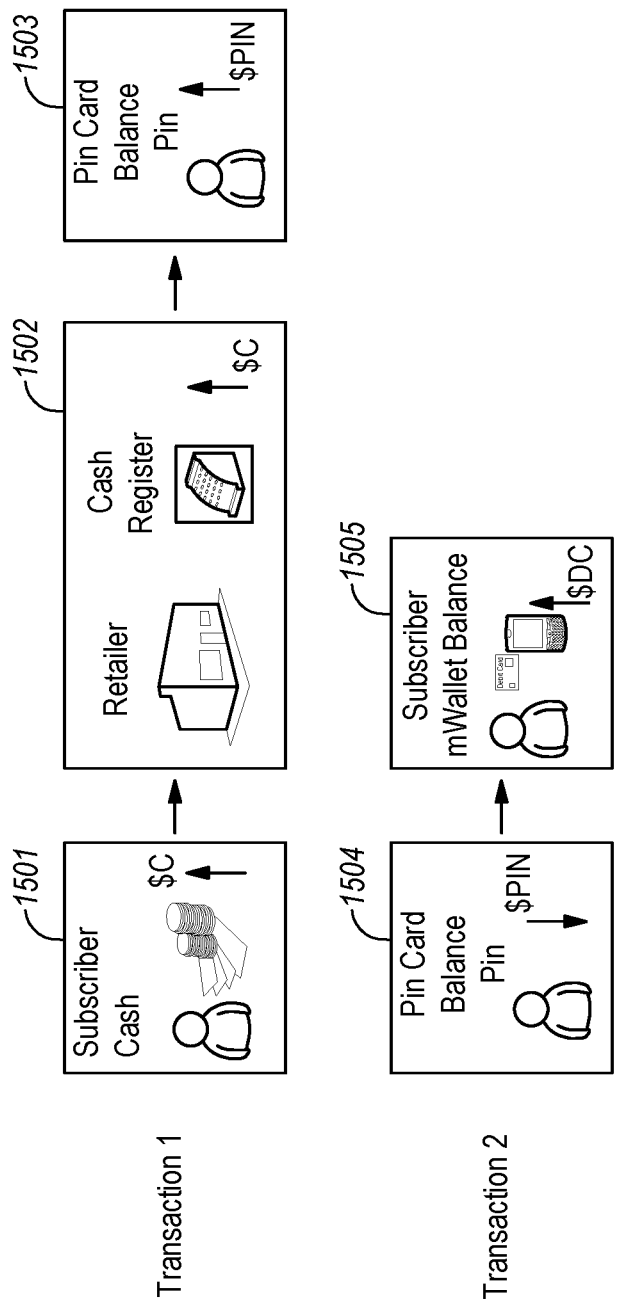
FIG. 15 illustrates an example data flow of a subscriber making a deposit with a non-agent using a mobile wallet.

FIG. 15 illustrates a subscriber deposit that is performed with a non-agent. In some economies, subscribers may have the ability to leverage other channels outside of agents to deposit funds onto their card. One deposit method is a PIN-based recharge that allows a subscriber to purchase a PIN worth the deposit value. The PIN can then be redeemed via an interactive voice response (IVR) system or via the subscriber's mobile wallet application. The mobile wallet application will allow the monetary transaction system 210 to deposit the funds onto the subscriber's card. The retailer's bank settles with the PIN card provider's bank and the PIN card provider's bank settles with the mFS platform's bank for the deposit. The subscriber gives cash to the agent (1501) which increases the agent company's physical cash (1502). The subscriber uses IVR or their SIM Application to recharge mobile wallet account using a PIN card (1503). In some cases, an agent may provide the PIN card (i.e. the prepaid debit card) to the subscriber. The monetary transaction system 210 processes the subscriber deposit request, increments the subscriber's mobile wallet balance within the card processor and logs the transaction. An external card processor decreases the subscriber's PIN card balance (1504), increments the subscriber's mobile wallet balance (1505) and send reports to the mFS platform bank for settlement.

Figure 16:
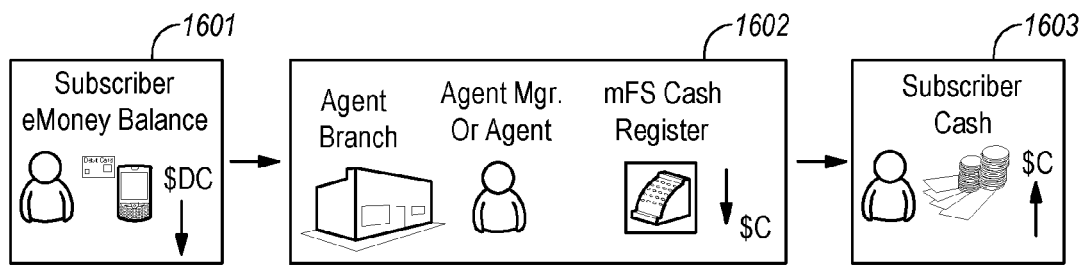
FIG. 16 illustrates an example data flow of a subscriber making a withdrawal with an agent using a mobile wallet.
Figure 16:
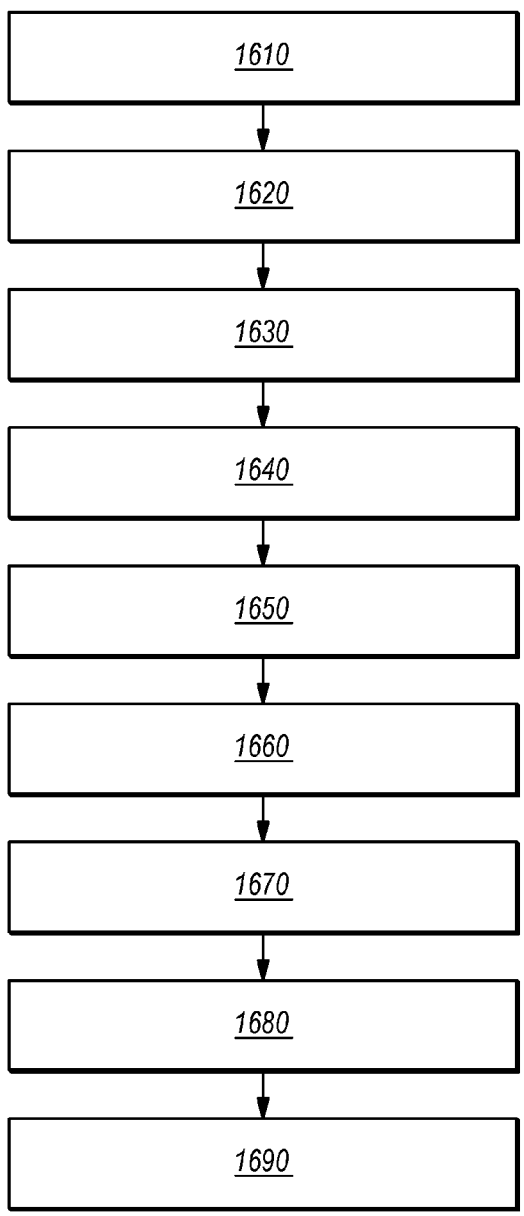

FIG. 16 illustrates a subscriber withdrawal at an agent branch. To withdraw cash at an agent branch from a (prepaid) debit card, a subscriber submits a withdrawal request using the mobile wallet application on their mobile device. The subscriber may also need to enter details about the agent branch that allows the monetary transaction system 210 to determine if the subscriber has sufficient funds on their debit card. The mFS platform then notifies the agent branch that it can give cash to the subscriber. If the subscriber has sufficient funds, the monetary transaction system 210 will decrement the subscriber's funds from their card (1601) and transfer it to the mobile wallet owner's account within the same card processor or bank. The agent branch (1602) then provides the withdrawn cash to the subscriber (1603).

Accordingly, the subscriber requests a cash withdrawal from their own mobile wallet account via the mobile wallet application. The agent or agent manager verifies the withdrawal request via POS authorization or SMS received on agent's phone and, once verified, gives cash to the subscriber. The monetary transaction system 210 processes the subscriber's withdrawal request, decrements the subscriber's mobile wallet balance within the card processor and logs the transaction. An external card processor decrements the subscriber's mobile wallet balance and sends reports to the bank for settlement on a periodic basis.

In one embodiment, the monetary transaction system 210 is implemented to withdraw funds from a bank or credit union account using a mobile wallet. The communication module 215 of the monetary transaction system 210 receives a communication from a subscriber 205 over a communication channel 111 (step 1610). The subscriber communication indicates that subscriber 205 desires to withdraw a specified amount of funds from a bank or credit union account. The transaction processor validates the status of the bank or credit union account (step 1620), determines if the balance of the bank or credit union account is sufficient to accommodate the requested withdrawal for the specified amount of funds (step 1630) and performs a limit check and/or a velocity check on the bank or credit union account (step 1640).

The monetary transaction system 210 then returns a secure, perishable withdrawal code to the subscriber 205 over at least one of the communication channels (step 1650) and receives a subsequent agent branch communication indicating that the withdrawal code has been presented to an agent (step 1660). The monetary transaction system 210 then debits the bank or credit union account by the specified amount of funds (step 1670), returns a notification to the agent branch confirming the withdrawal (1680) and notifies the subscriber that the specified amount of funds were withdrawn from the bank or credit union account using at least one of the communication channels connected to the monetary transaction system (step 1690). Accordingly, a subscriber can withdraw cash stored on their mobile wallet from an agent branch or a non-agent branch.

Figure 17A:
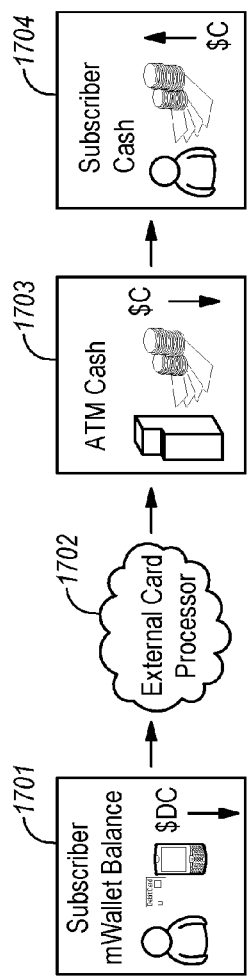
FIG. 17A illustrates an example data flow of a subscriber making a withdrawal from an ATM using a mobile wallet.

FIG. 17A illustrates a subscriber withdrawal using an automated teller machine (ATM). Subscribers in many countries have access to ATM machines and can use their mobile wallets to perform withdrawals using their (prepaid) debit card at most ATMs. Banks provide ATMs to their customers (typically at no charge) and to non-customers (typically for a small charge). The subscriber requests a cash withdrawal from the subscriber's mobile wallet via the subscriber's debit card that is associated with the mobile wallet. The bank providing the debit card may receive settlement reports from the card processor and may transfer and/or settle funds from subscriber's account to the ATM network bank. An extern card processor decrements the subscriber's mobile wallet balance (1701) and sends transaction reports to the bank for settlement. Accordingly, once the withdrawal request has been received and the external card processor (e.g. Visa® or MasterCard®) (1702) has debited the debit card account, the ATM (1703) dispenses the withdrawn cash to the subscriber (1704).

Figure 17B:
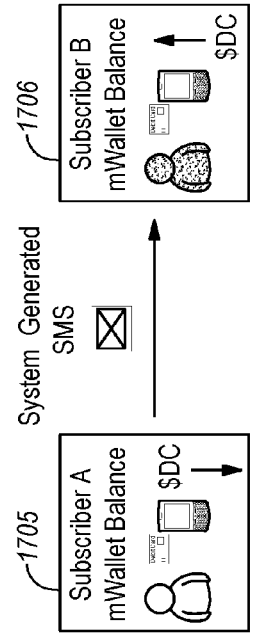
FIG. 17B illustrates an example data flow of a subscriber-to-subscriber money transfer using a mobile wallet.

FIG. 17B illustrates a subscriber-to-subscriber money transfer. An mFS subscriber (1705) may send money to another mFS subscriber (1706). To do so, subscriber A enters information identifying subscriber B (e.g. a phone number, email address or other identifier). The monetary transaction system 210 determines if there are enough funds to complete the transaction, and if so, the monetary transaction system 210 decrements subscriber A's debit card and credits subscriber B's debit card. The subscriber, accordingly, may request to send money from their own mobile wallet (i.e. money stored on a (prepaid) debit card) account via the subscriber mobile wallet application. The other subscriber receives a notification that the balance of the debit card associated with their mobile wallet has increased. The bank receives a settlement report from the debit card processor and transfers or settles funds from subscriber A's account to subscriber B's account (if necessary). The monetary transaction system 210 processes the transfer request, updates subscriber A's and subscriber B's debit cards that are associated with their mobile wallets and logs the transaction. The external card processor decrements subscriber A's debit card balance, increments subscriber B's debit card balance and sends transaction reports to the mFS platform bank for settlement.

Figure 17C:
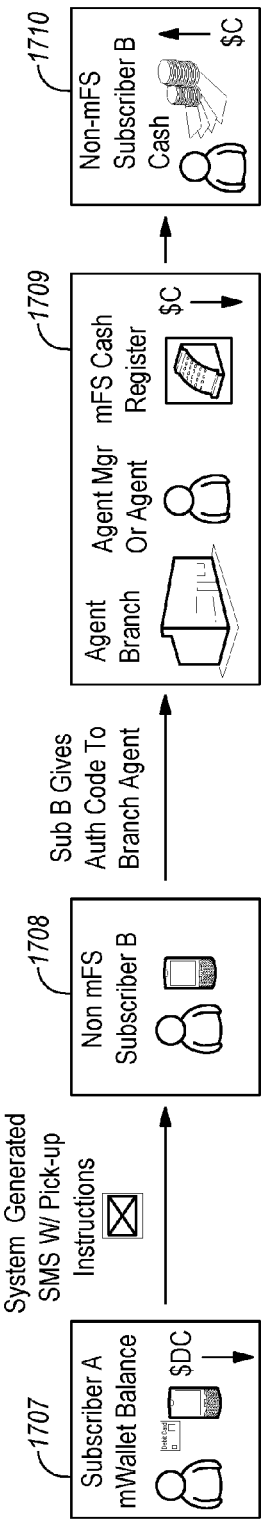
FIG. 17C illustrates an example data flow of a subscriber-to-non-subscriber money transfer using a mobile wallet.

FIG. 17C illustrates subscriber-to-non-subscriber money transfers. In this embodiment, subscriber A (an mFS subscriber) wishes to send money to another subscriber (a non-mFS subscriber). The transaction is initiated in the same fashion as described above in FIG. 17B. However, since subscriber B does not have an mFS account, the monetary transaction system 210 cannot credit them with money. Instead, the monetary transaction system 210 sends a communication (e.g. a SMS) to subscriber B (1708) with an authorization code and instructions for how to pick up the cash. The monetary transaction system 210 puts a hold on subscriber A's debit card for the amount transferred (1707). Subscriber B has a specified time period in which to pick up the cash before the hold expires and the amount is credited back to the debit card associated with subscriber A's mobile wallet account. The agent branch verifies the authorization code via POS or their agent mobile wallet application (1709) and gives the cash to the non-subscriber (1710). (In some countries, an agent network needs to be capable of giving cash to a subscriber based on the money transfer reference number).

The mFS bank receives a settlement report from the card processor and transfer and settle funds from subscriber A's debit card to the agent's bank (if necessary). The monetary transaction system 210 processes the money transfer request, decrements subscriber A's mobile wallet balance within the card processor, generates a money transfer reference number, authorizes the reference number to be paid out by the agent and logs the transaction. An external card processor decrements subscriber A's mobile wallet balance and sends periodic transaction reports to the bank for settlement. Thus, as seen in FIGS. 17B and 17C, money may be transferred from subscriber to subscriber and from subscriber to non-subscriber.

Figure 18A:
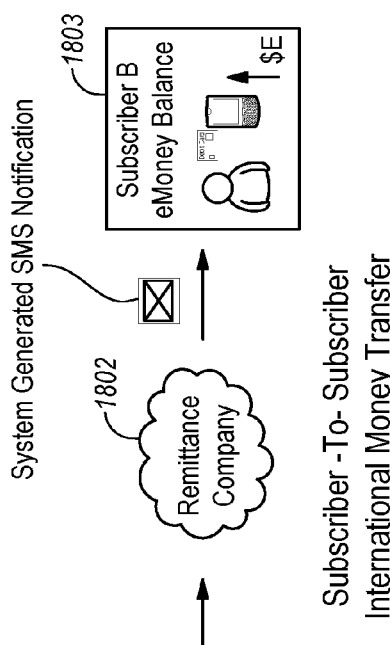
FIG. 18A illustrates an example data flow of a subscriber-to-subscriber international money transfer using a mobile wallet.

Subscribers may similarly send money internationally to both subscribers and non-subscribers. FIG. 18A illustrates a subscriber-to-subscriber international money transfer. In this embodiment, subscriber A wishes to send cash to subscriber B who resides in another country. As in the embodiments described above where money was transferred internationally, the monetary transaction system 210 may use one or more international money transfer organizations or remittance companies such as MoneyGram® to transfer the money. Subscriber A initiates the international money transfer using his or her phone. Subscriber A's debit card account is decremented by the transfer amount (1801). The money is transferred between countries using an international money transfer organization (1802). In this case, subscriber B has an mFS eMoney account with a foreign mFS platform that is also affiliated with the selected international money transfer organization. That organization can then credit subscriber B's eMoney account directly (1803).

Thus, subscriber A requests to send money from their debit card account via the subscriber mobile wallet application. Subscriber B receives a notification (including a MoneyGram® Reference Number (MGRN) (or other reference number when other international money transfer organizations are used) and instructions on how to access the eMoney) that their eMoney balance has increased. The mFS bank receives settlement reports from the debit card processor and transfers and/or settles funds from subscriber's account to the international organization's bank. The monetary transfer system 210 processes the transfer request, update subscriber A's and subscriber B's eMoney balances and logs the transaction. An external card processor decrements subscriber A's mobile wallet balance and sends periodic transaction reports to the bank for settlement.

Figure 18B:
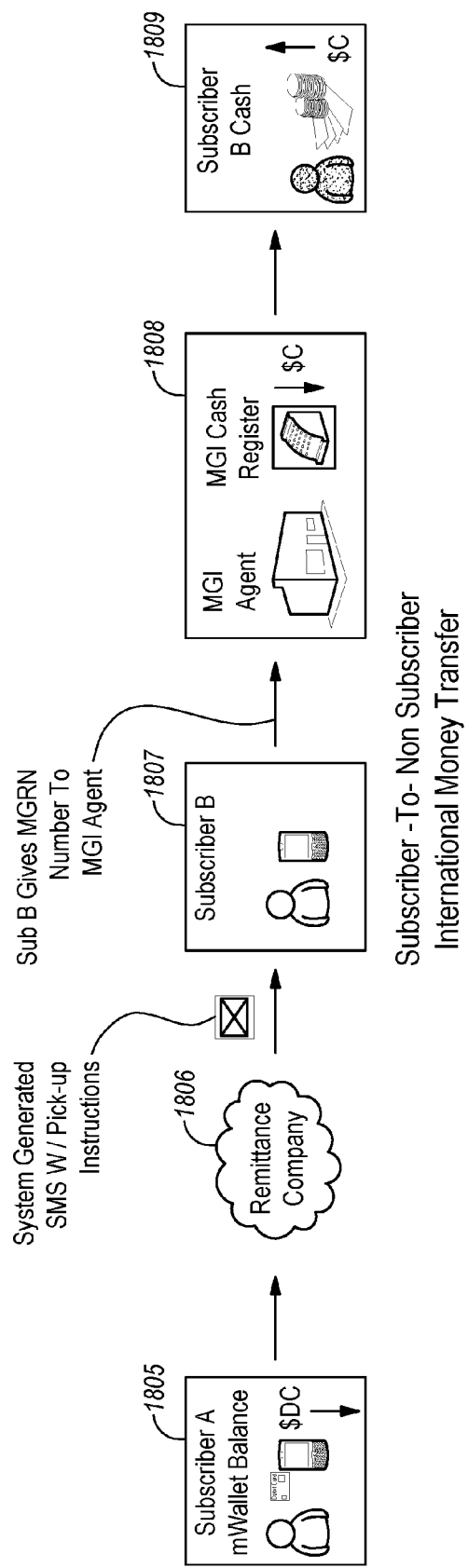
FIG. 18B illustrates an example data flow of a subscriber-to-non-subscriber international money transfer using a mobile wallet.

FIG. 18B illustrates a subscriber-to-non-subscriber international money transfer. In this embodiment, subscriber A wishes to send cash to subscriber B who resides in another country. As above, the monetary transaction system 210 uses an international money transfer organization (1806) to transfer the money between countries. Once the transfer has been initiated by subscriber A, the international money transfer organization debits subscriber A's debit card account (1805) and transfers that money to subscriber B. Subscriber B (1807) receives a notification (e.g. via SMS) with pick up instructions and a transfer ID number. Subscriber B can then go to an agent company (1808), show them the notification (including, perhaps an authorization code), and receive the transferred money (1809).

Similar to the transaction described in FIG. 18A, the embodiment of 19A illustrates a transaction where a subscriber receives an international money transfer. Subscriber B (1901) initiates a money transfer using their mobile wallet application. The international money transfer organization (1902) debits subscriber B's eMoney account balance. This money is then transferred by the international money transfer organization to subscriber A. Subscriber A receives a notification along with a transfer ID number indicating that their debit card account has been credited with the transferred money (1903).

Figure 19A:
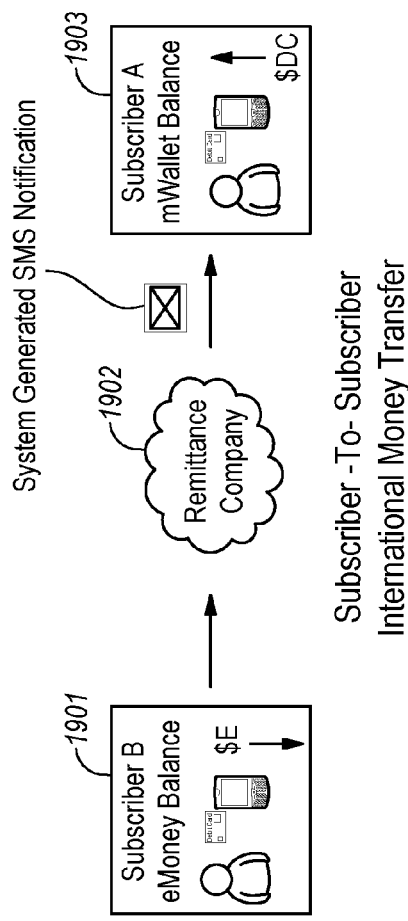
FIG. 19A illustrates an example data flow of a subscriber-to-subscriber international money transfer using a mobile wallet.
Figure 19B:
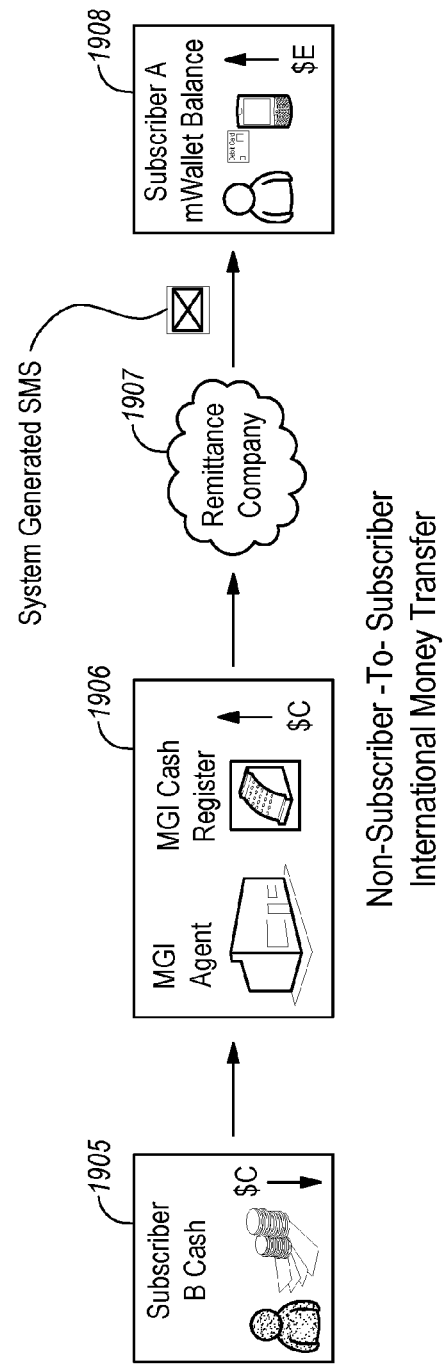
FIG. 19B illustrates an example data flow of a non-subscriber-to-subscriber international money transfer using a mobile wallet.
Figure 20A:
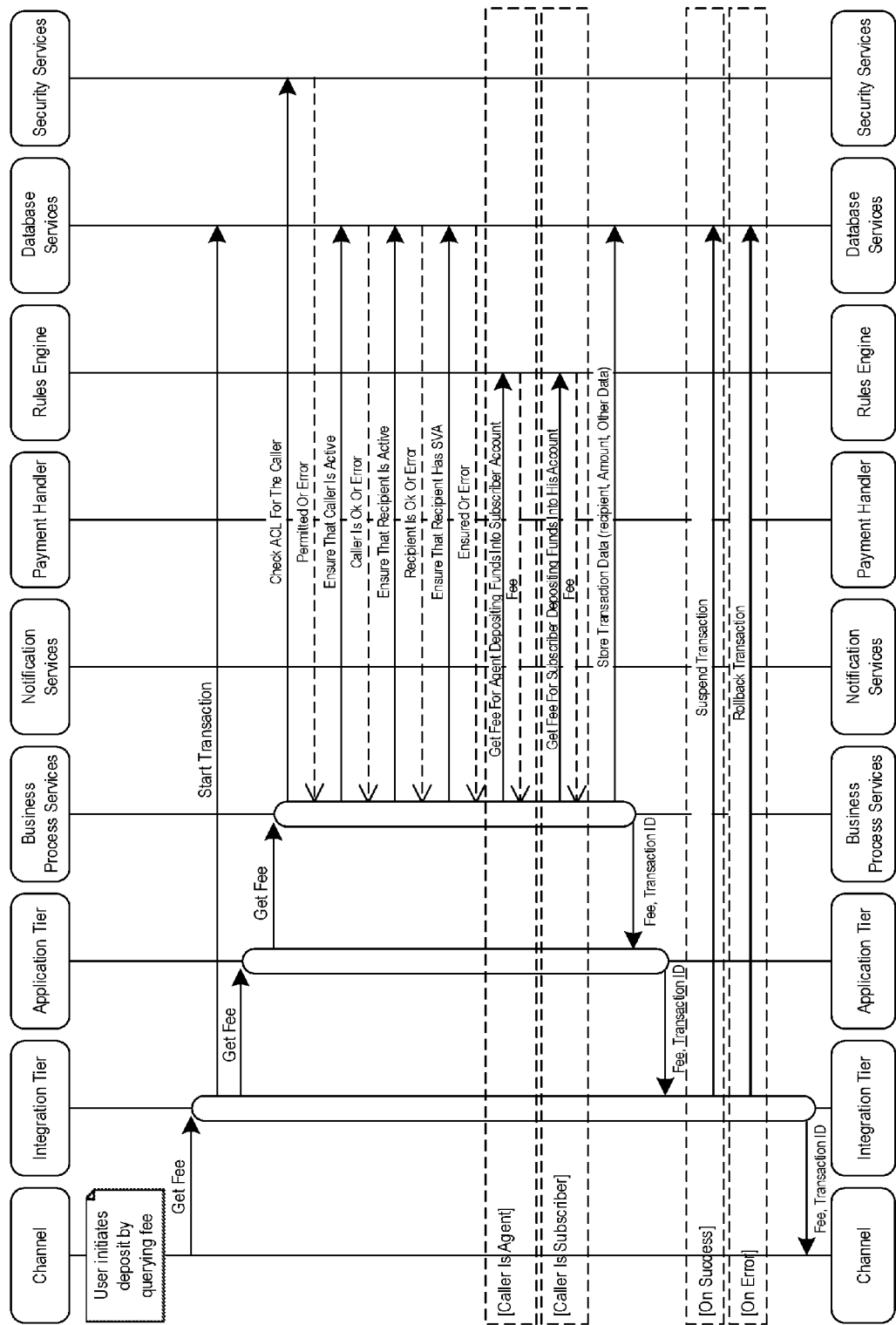
FIGS. 20A-20F illustrate embodiments of communications between specific components within a monetary transaction system during an operation to deposit of funds within a financial account.
Figure 20B:
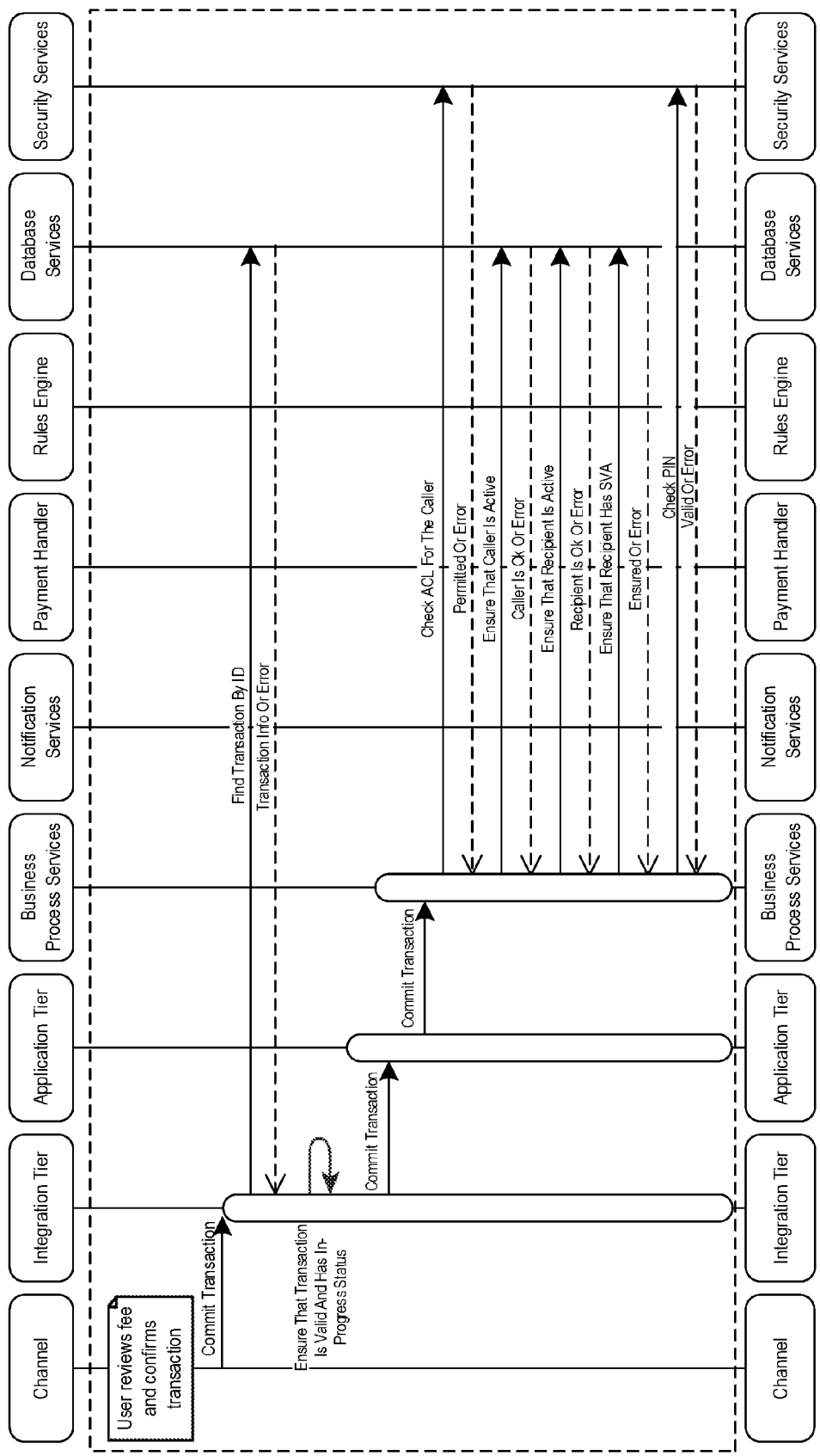
Figure 20C:
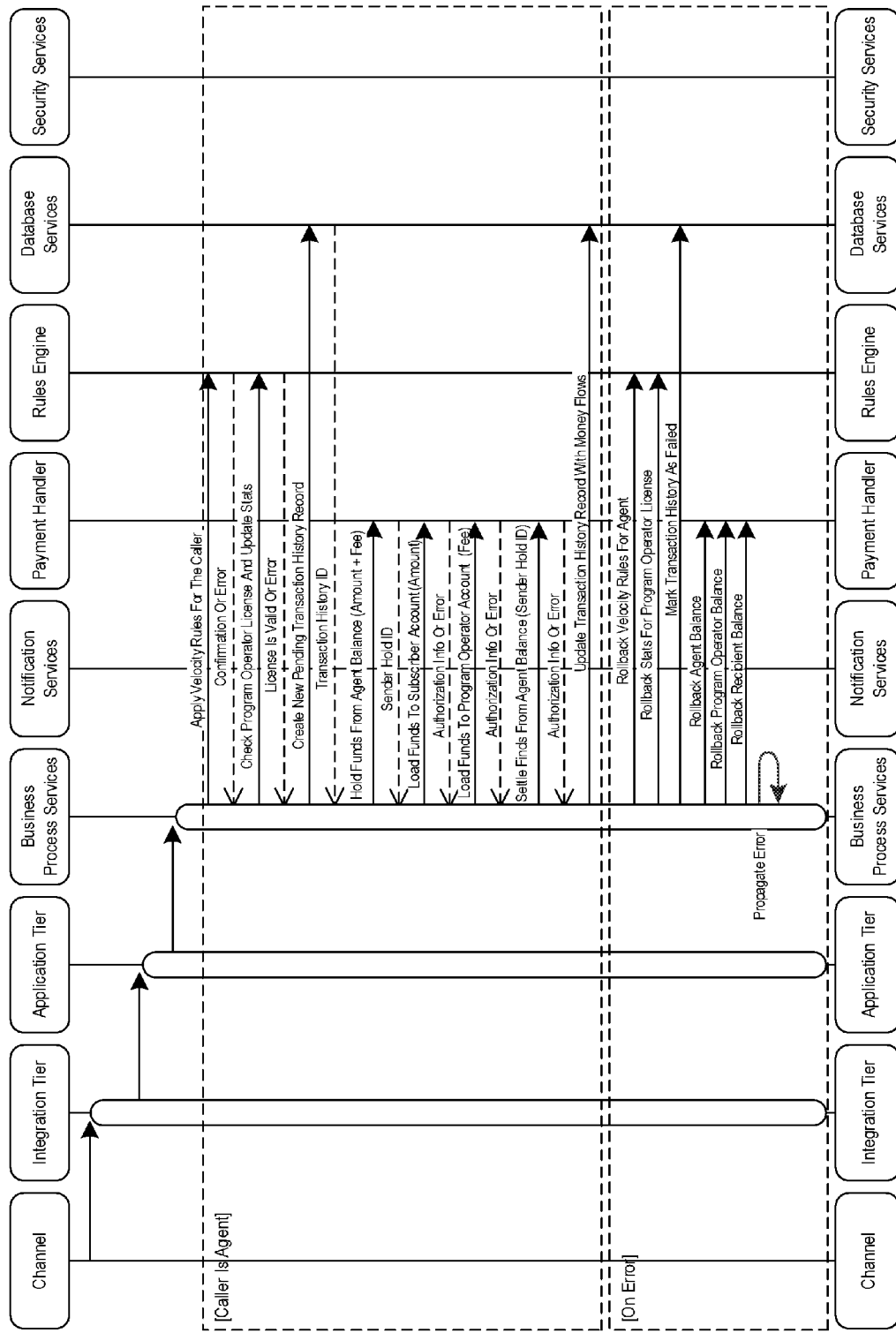
Figure 20D:
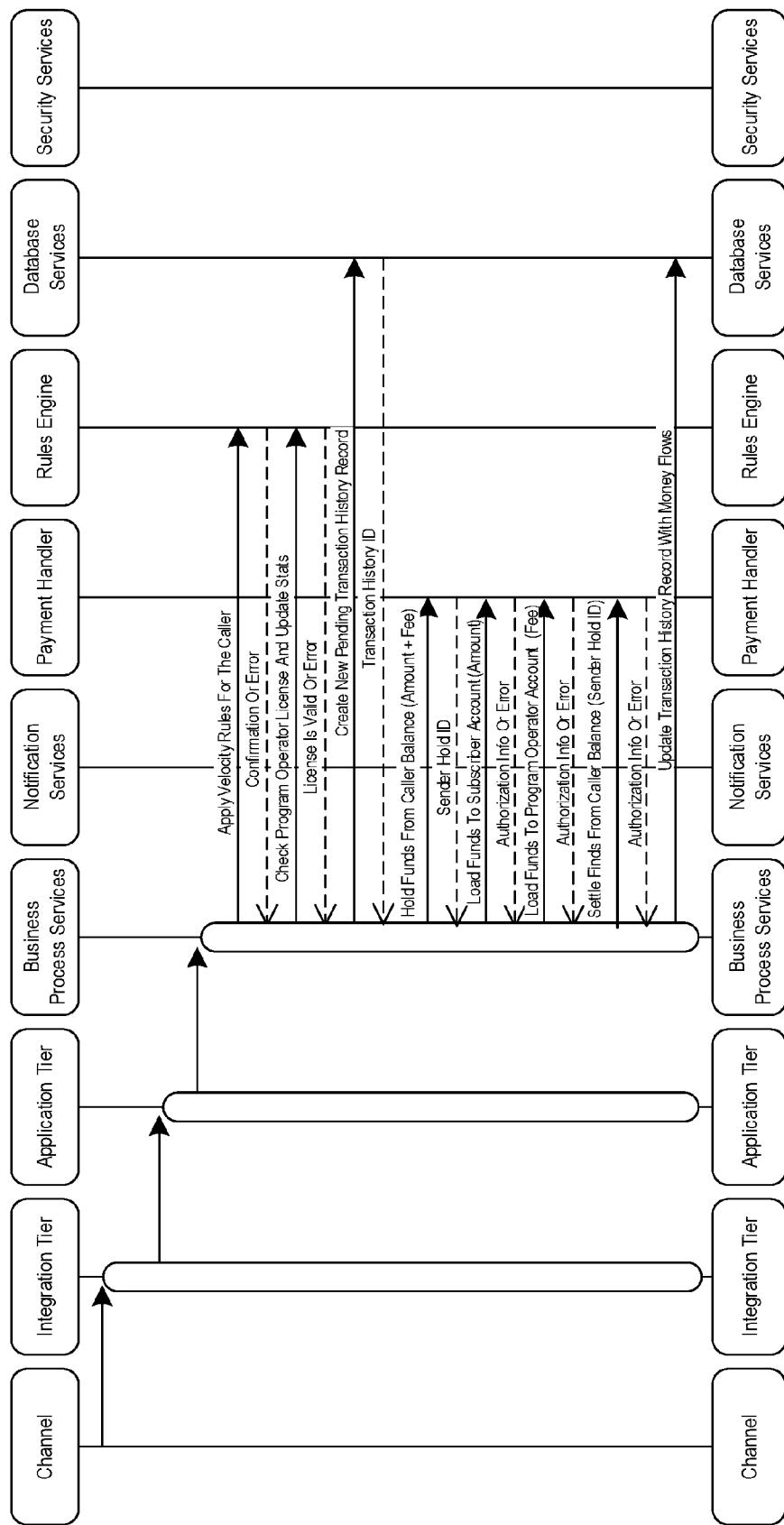
Figure 20E:
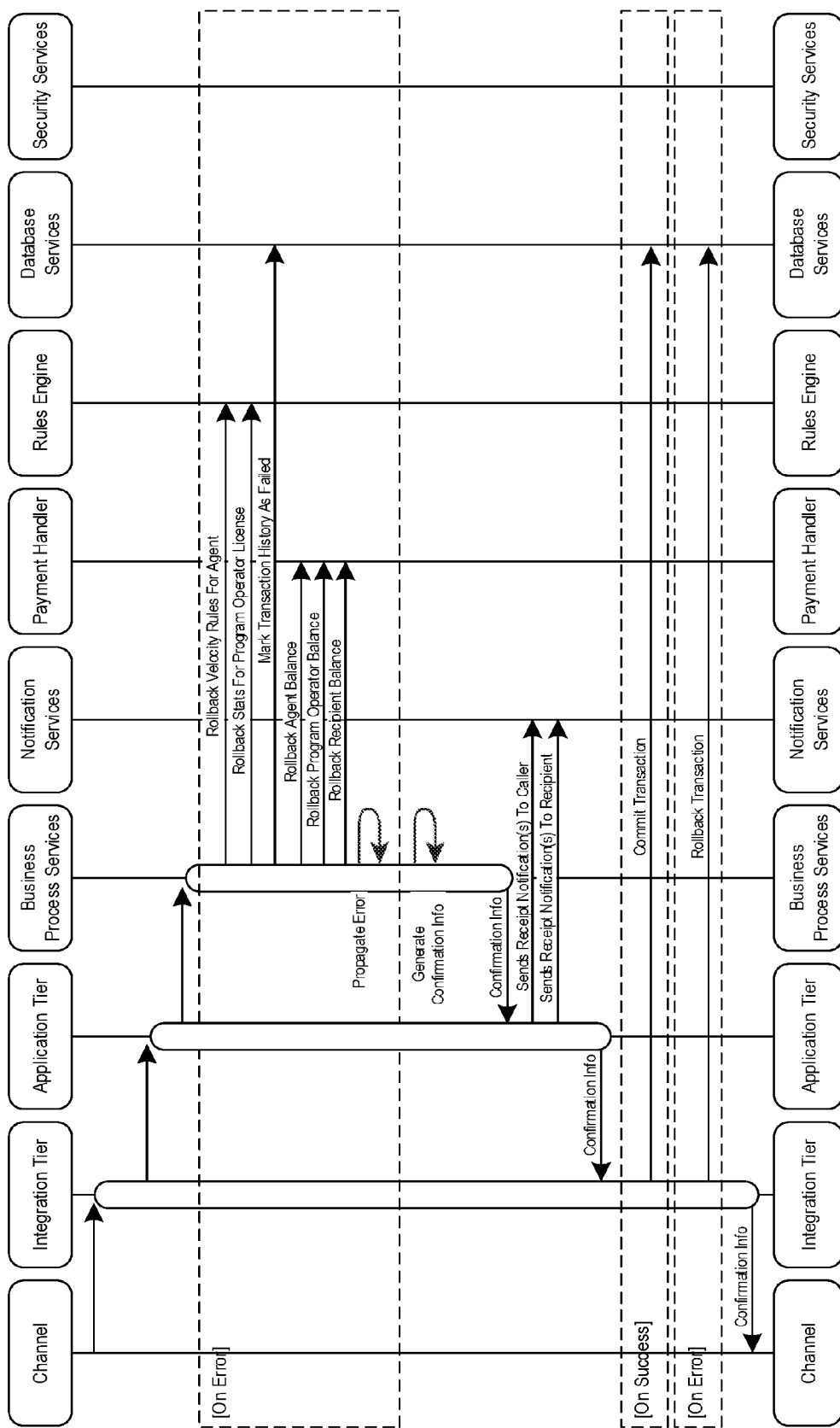
Figure 20F:
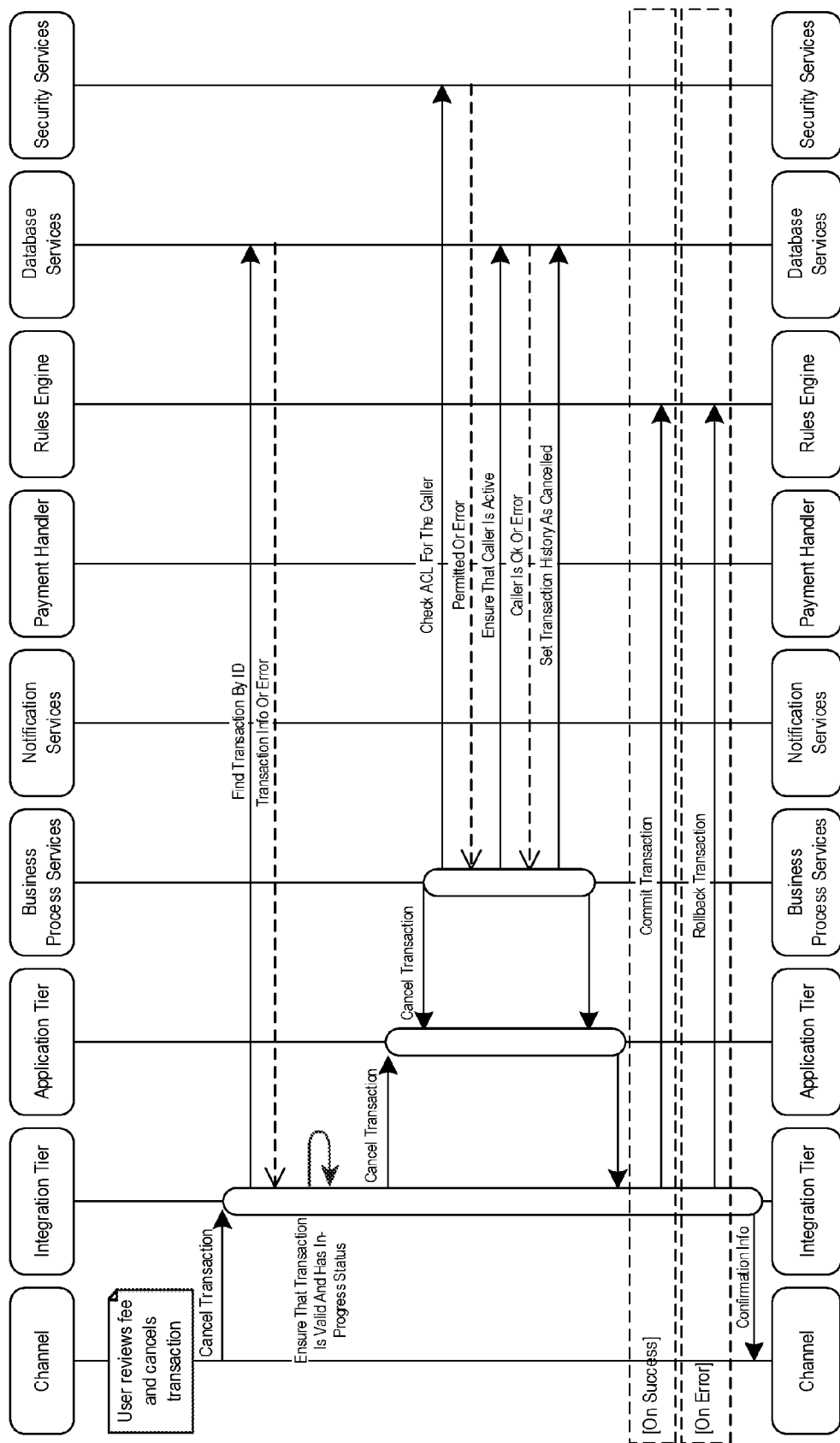
Figure 21A:
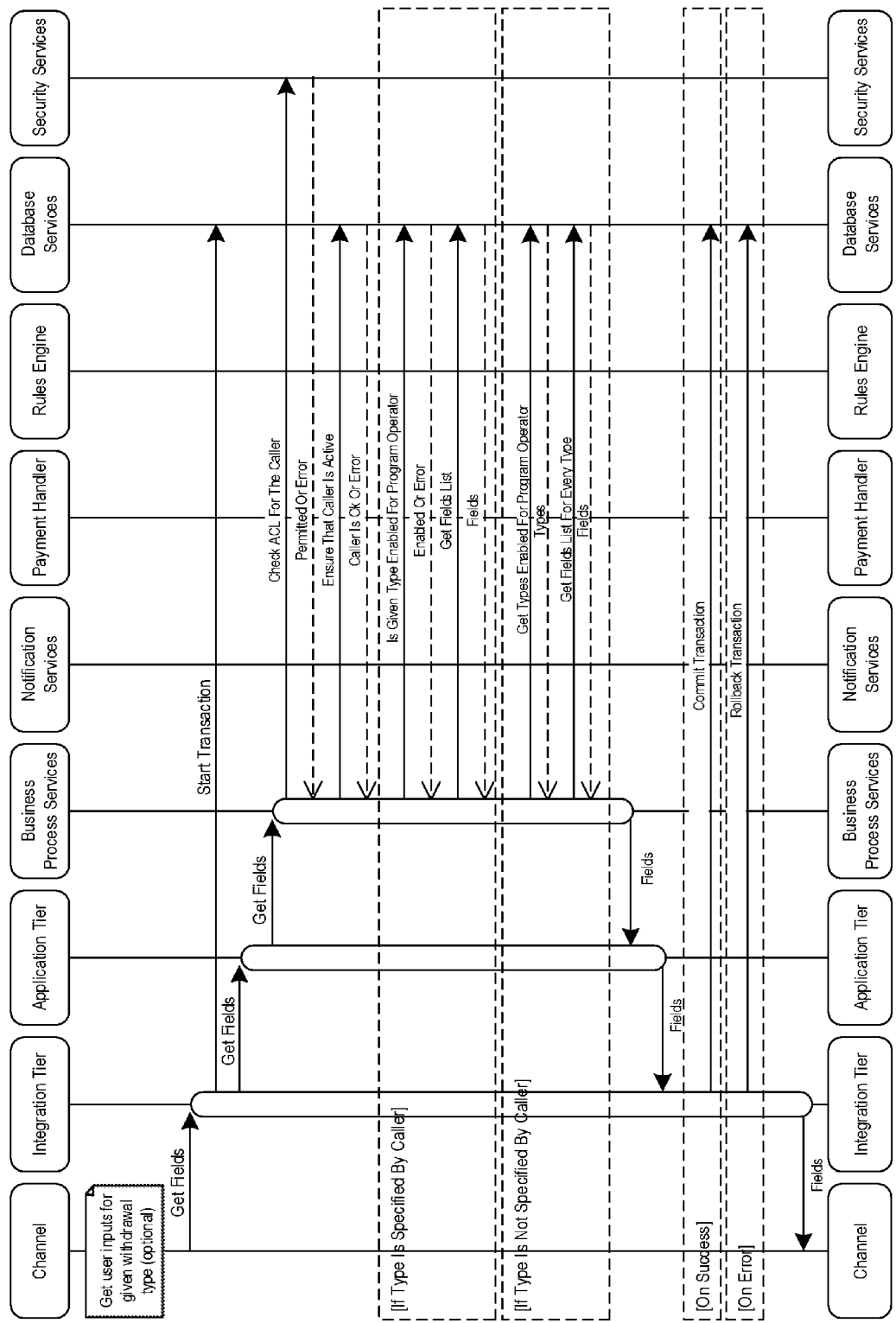
FIGS. 21A-21I illustrate embodiments of communications between specific components within a monetary transaction system during an operation to withdraw of funds from a financial account.
Figure 21B:
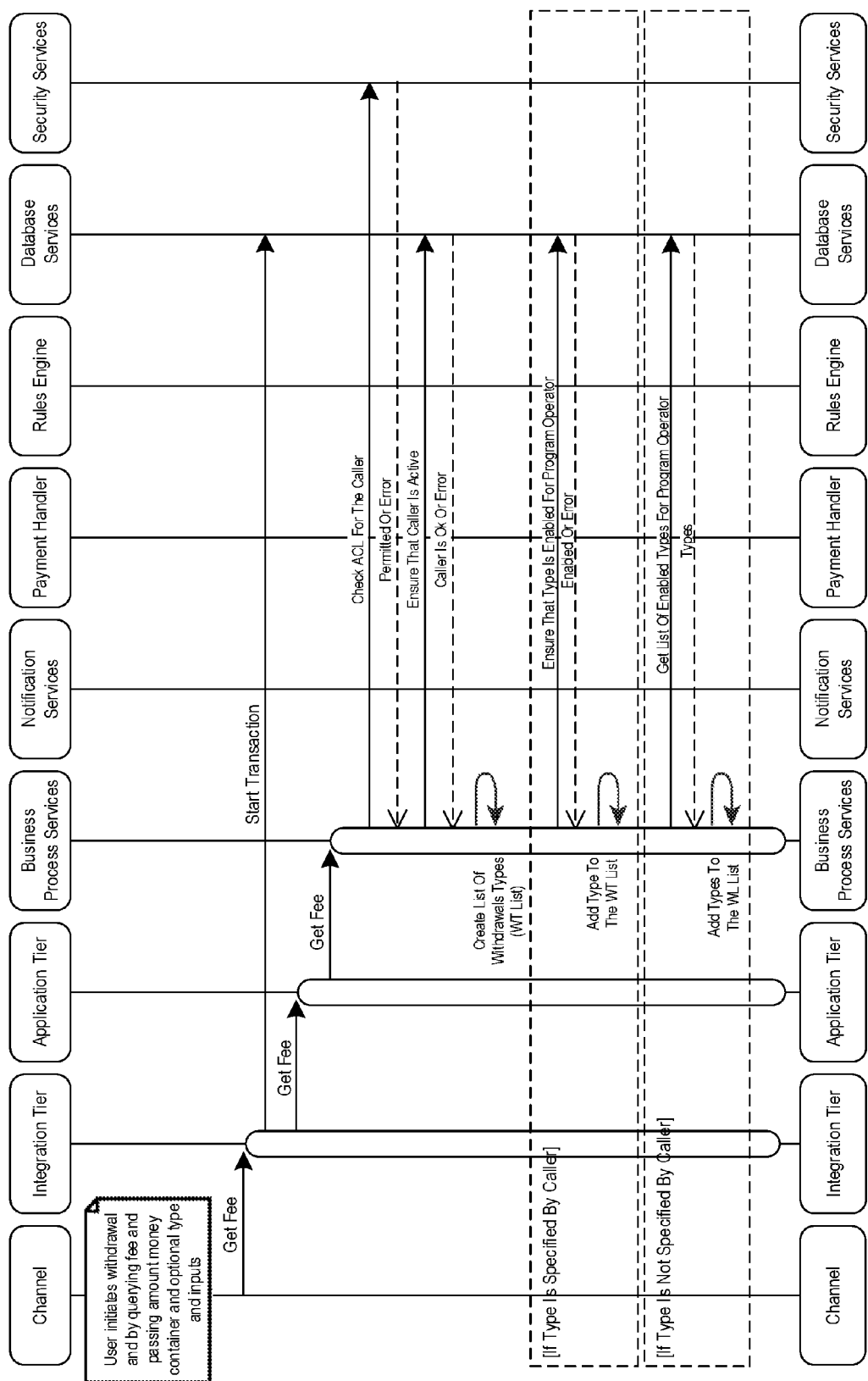
Figure 21C:
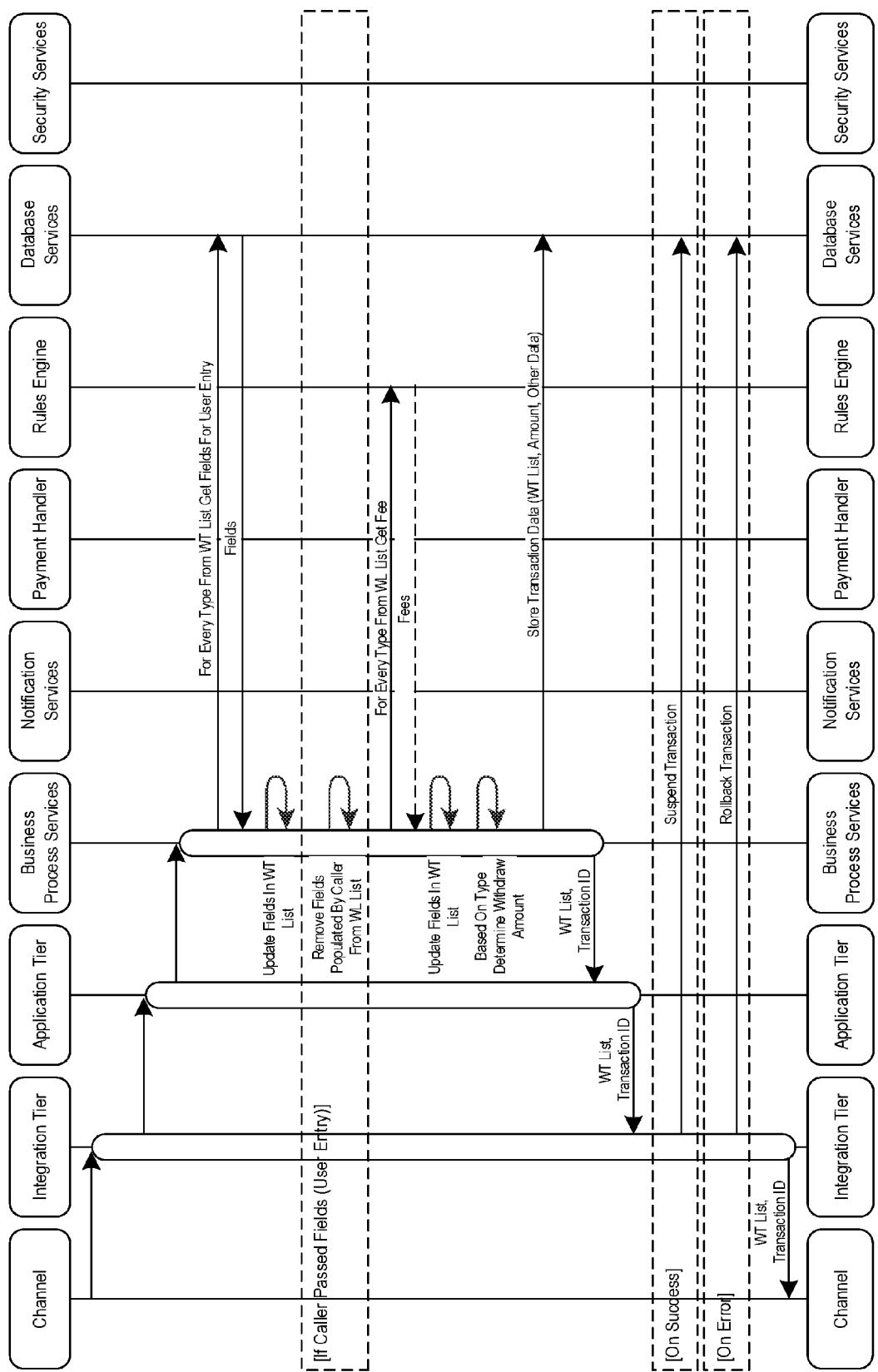
Figure 21D:
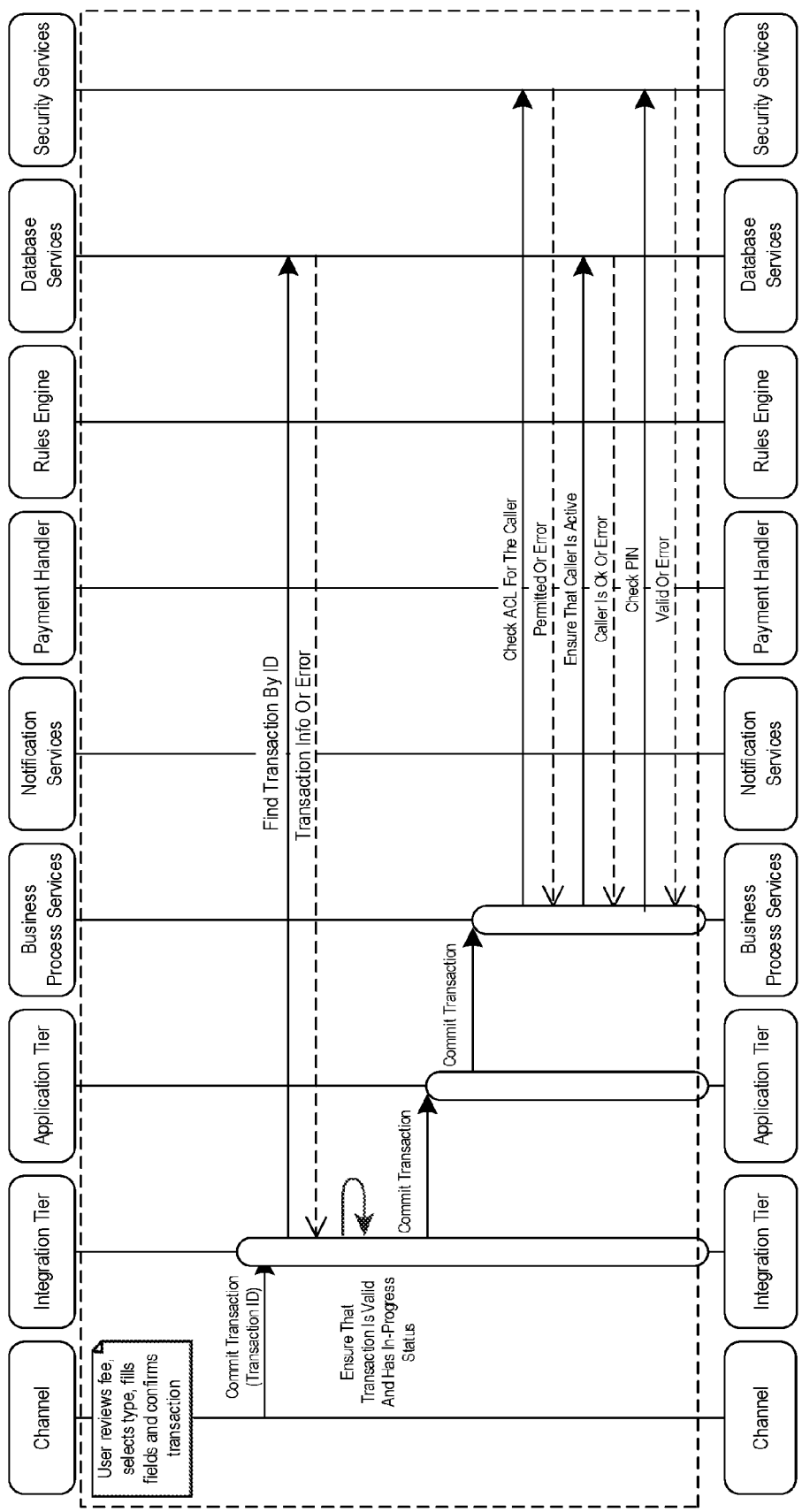
Figure 21E:
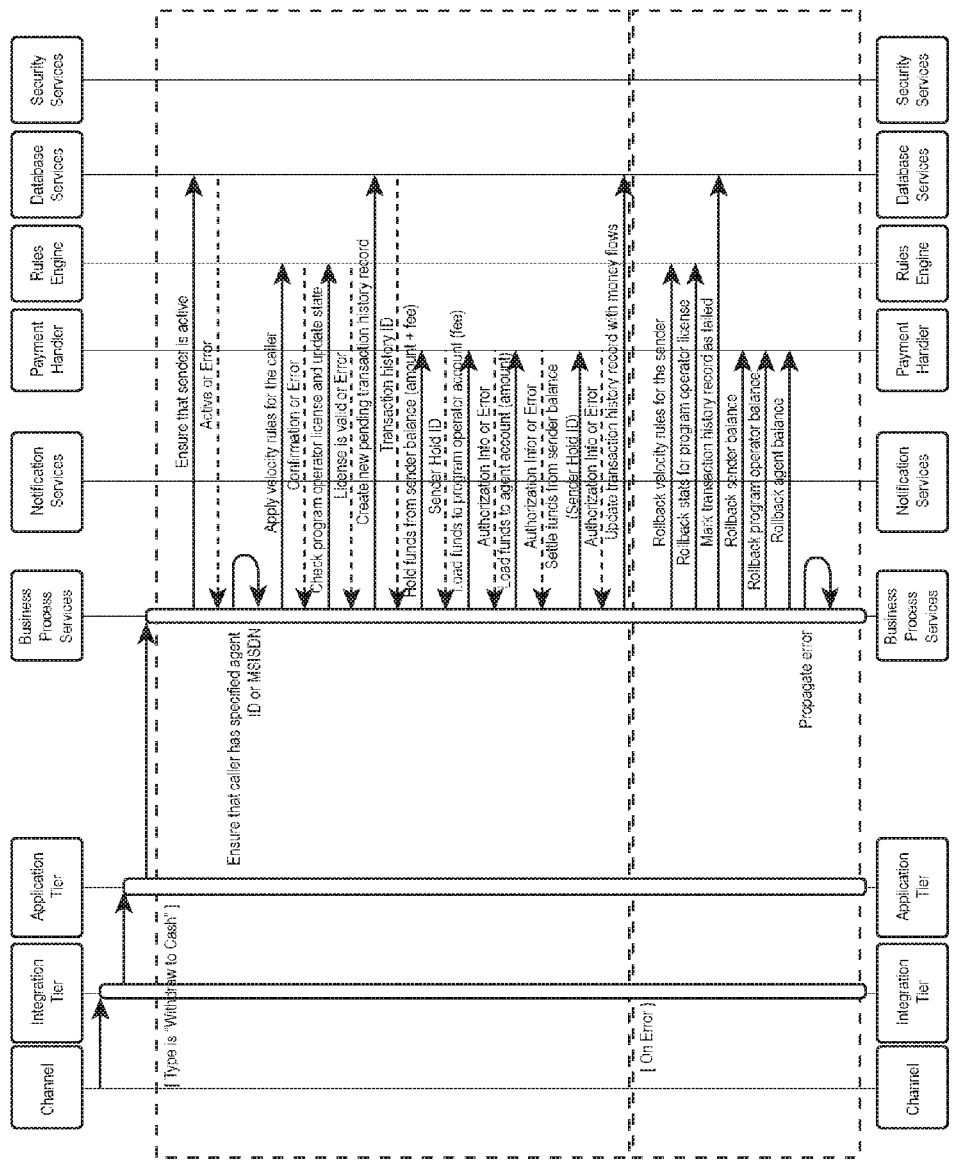
Figure 21F:
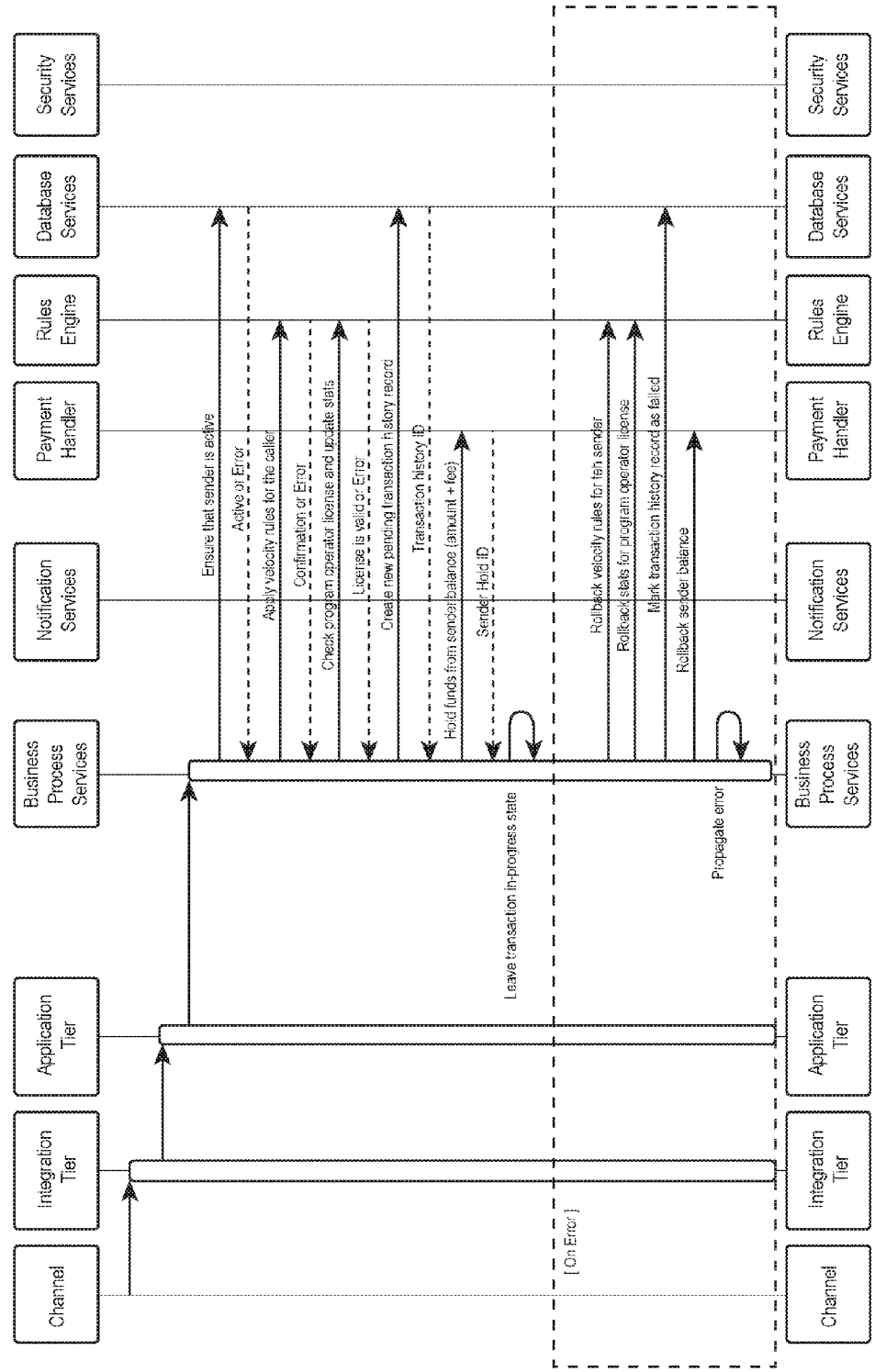
Figure 21G:
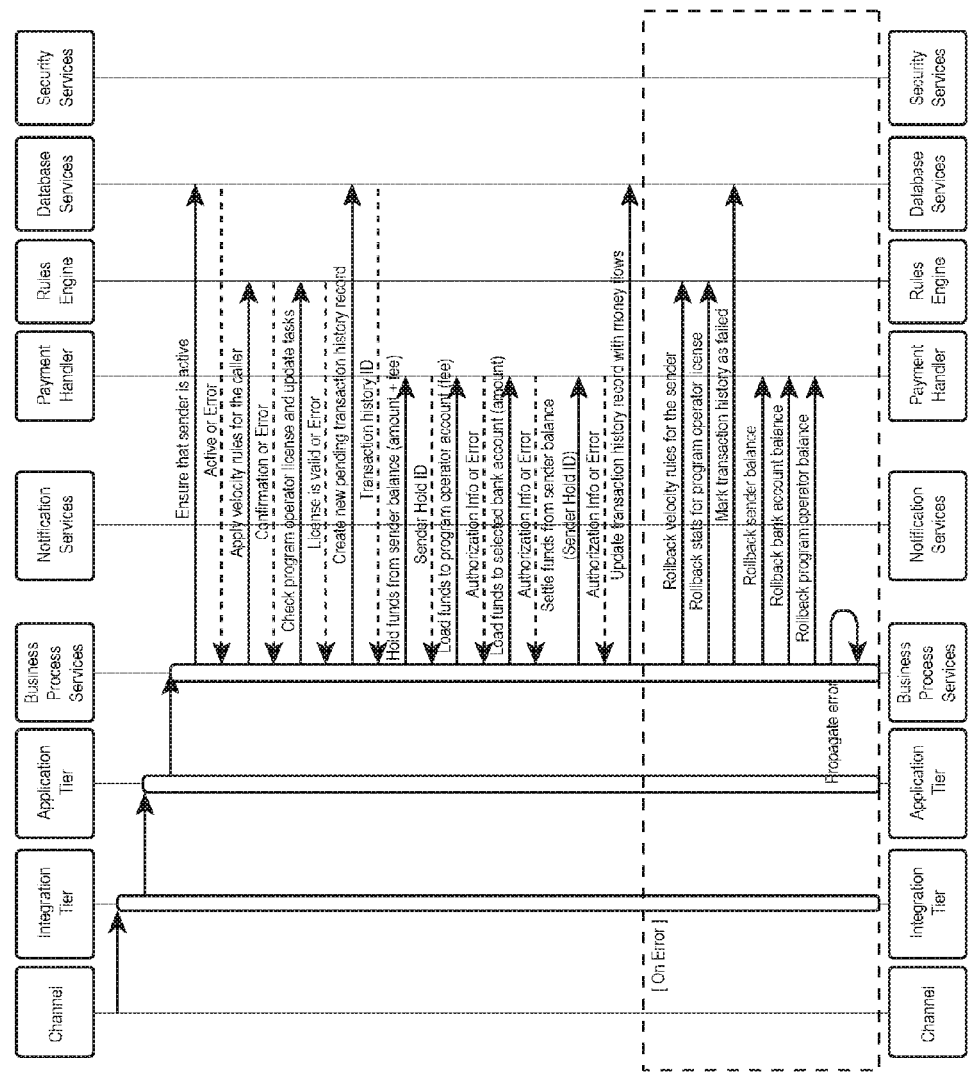
Figure 21H:
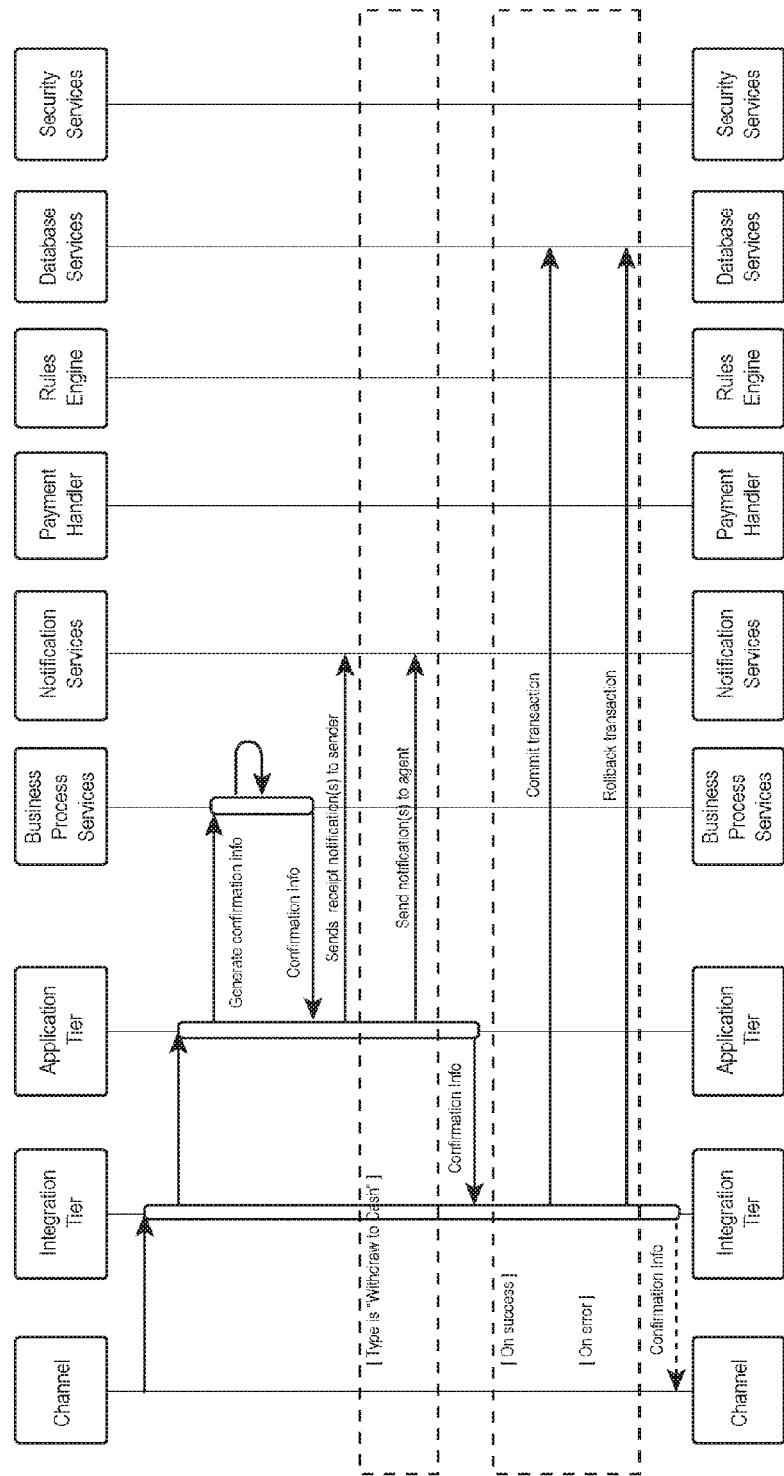
Figure 21I:
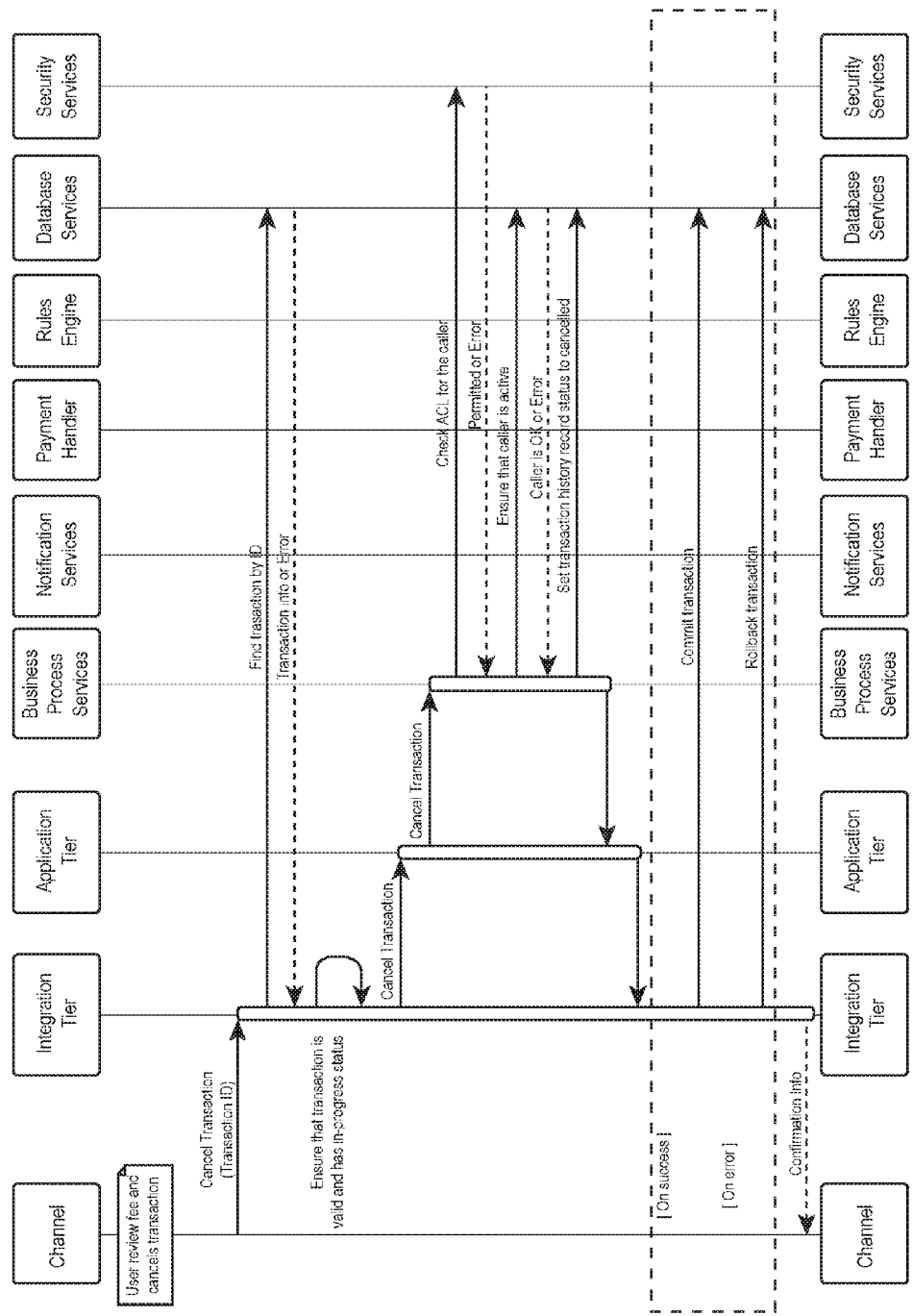
Figure 22A:
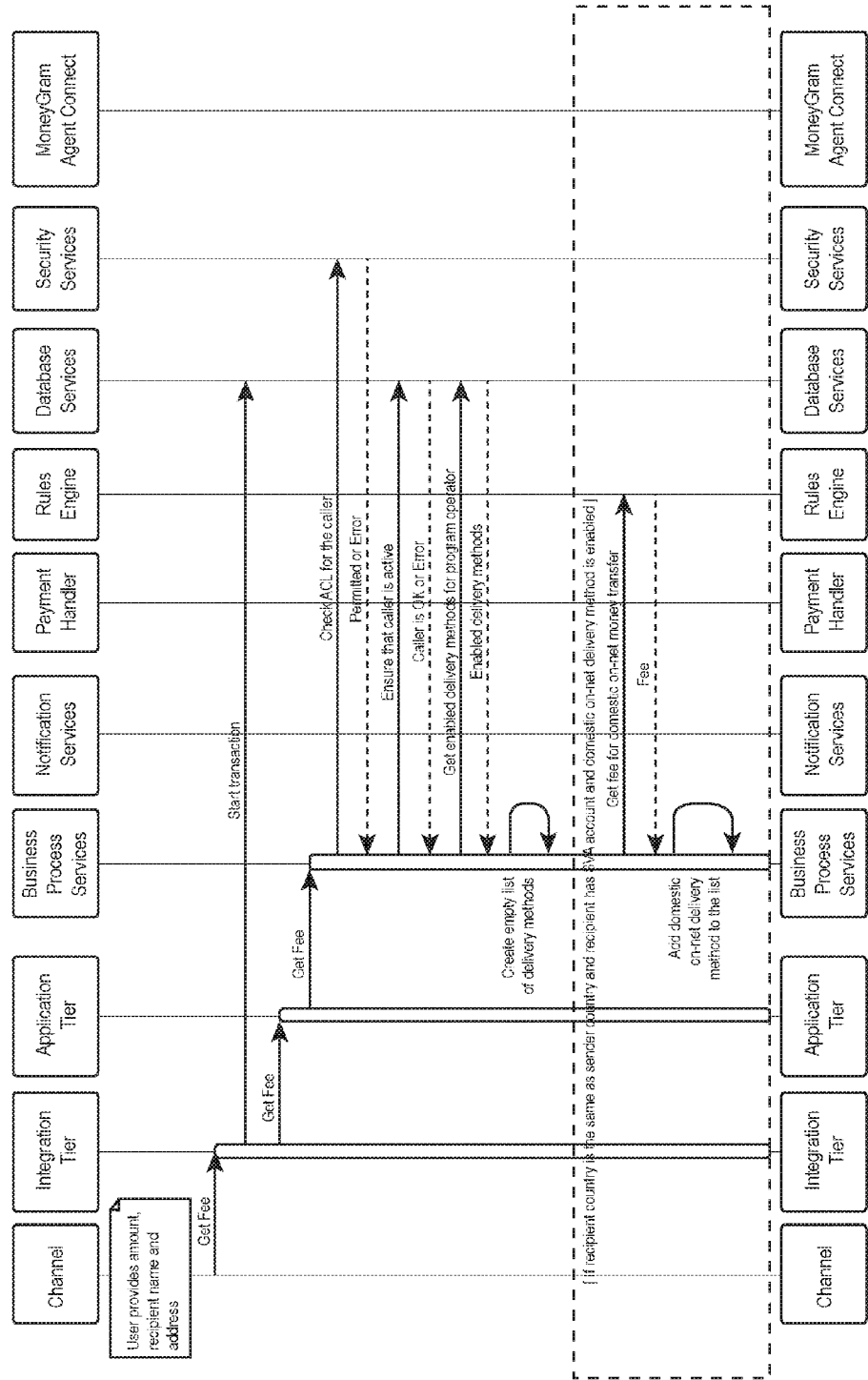
Figure 22B:
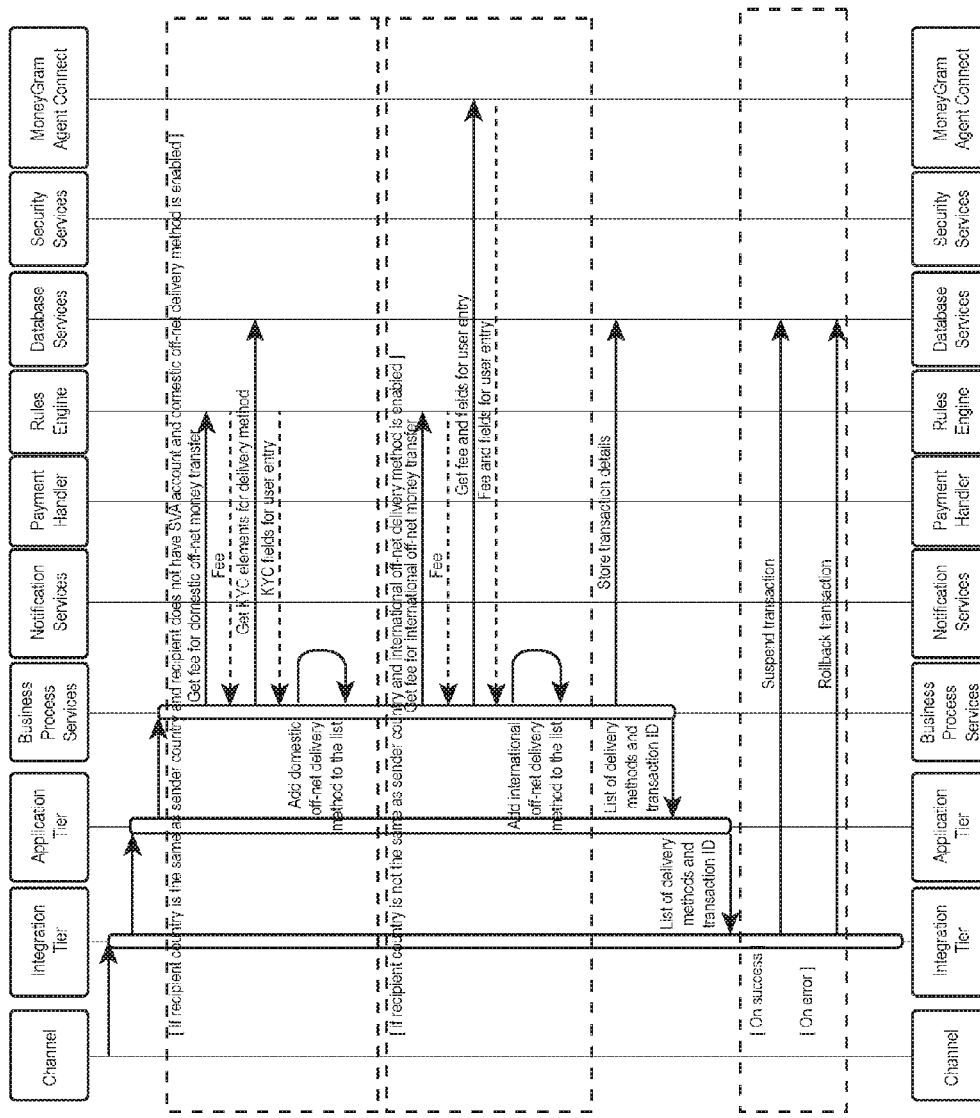
Figure 22C:
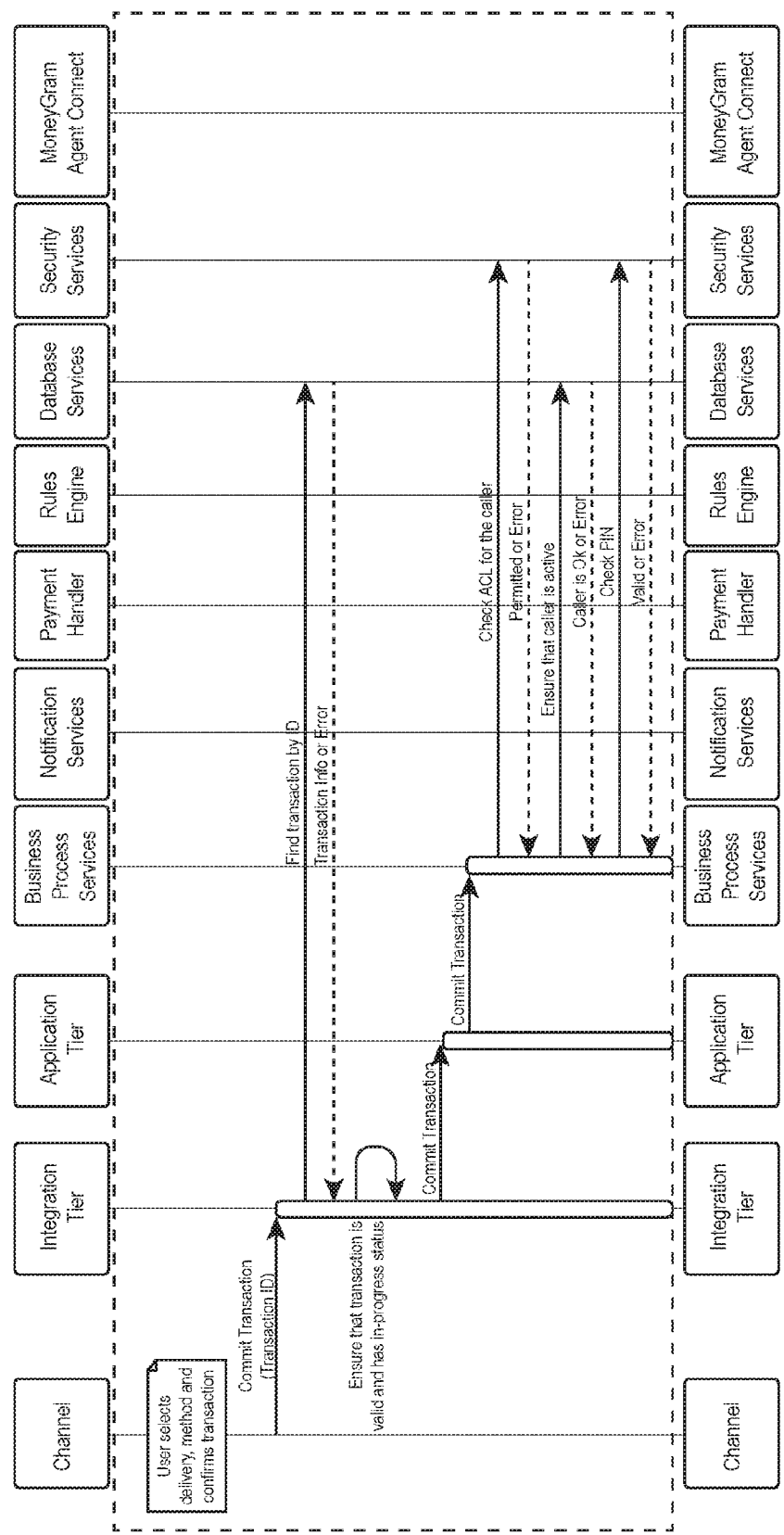
Figure 22D:
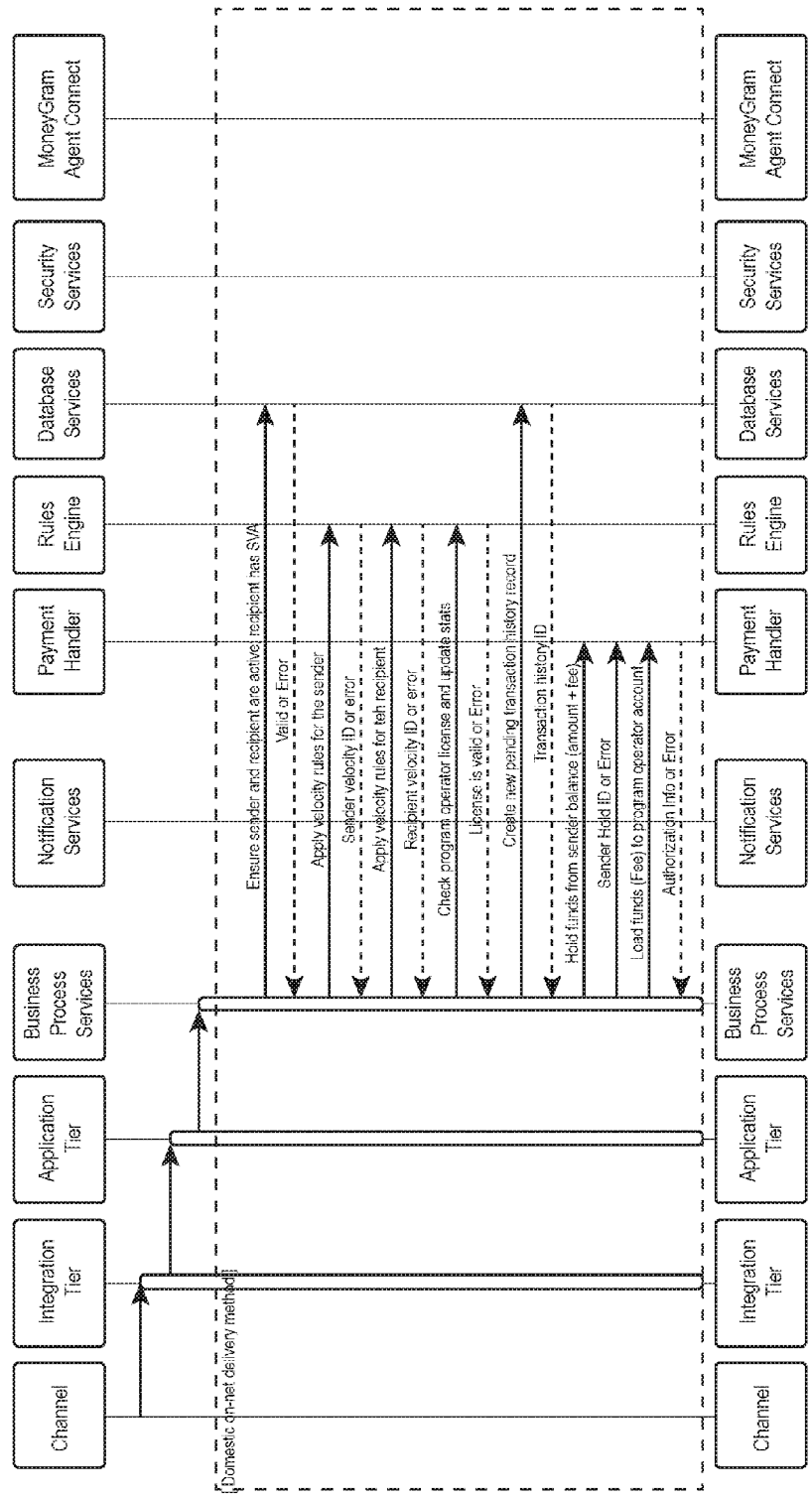
Figure 22E:
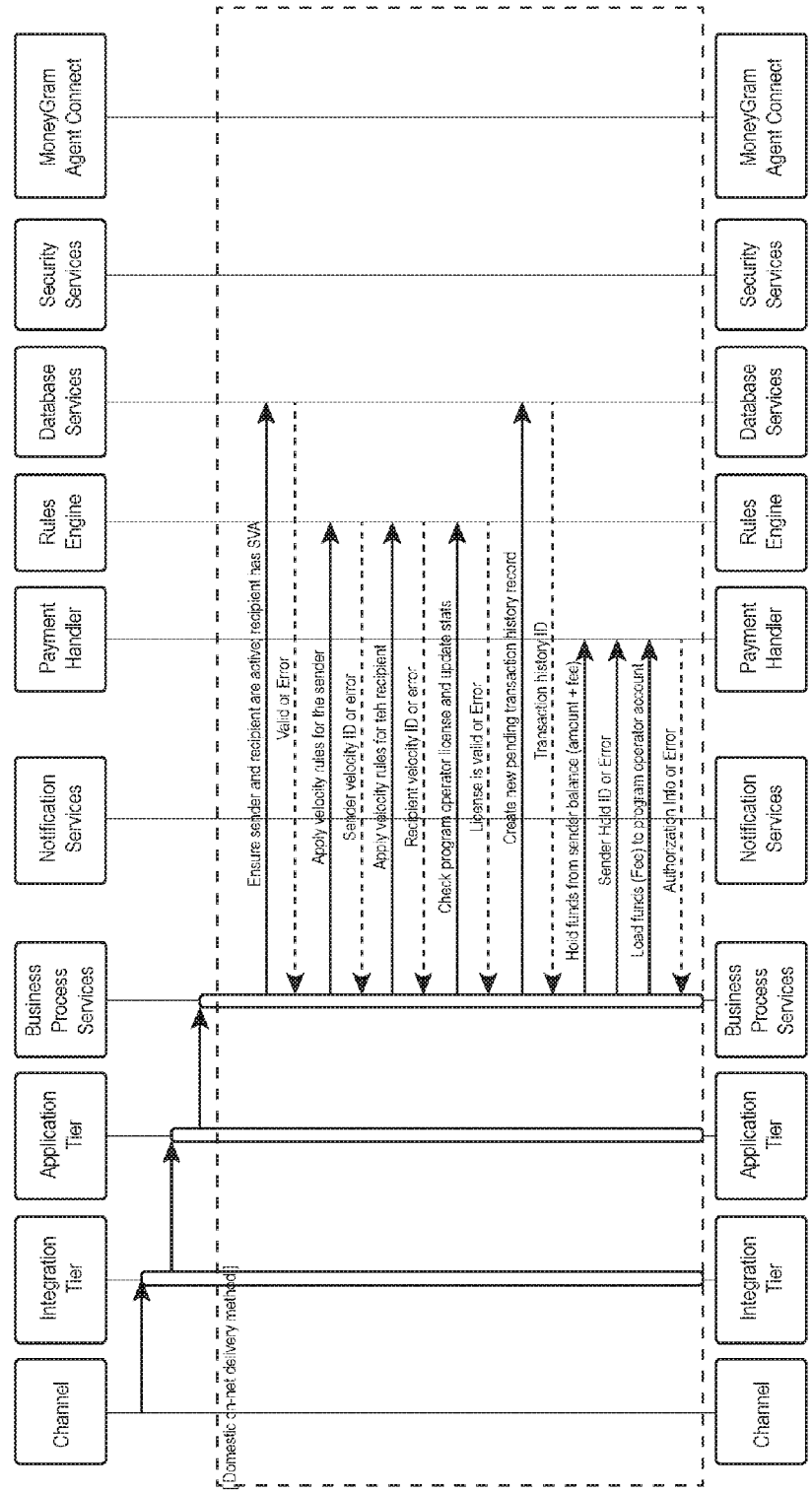
Figure 22F:
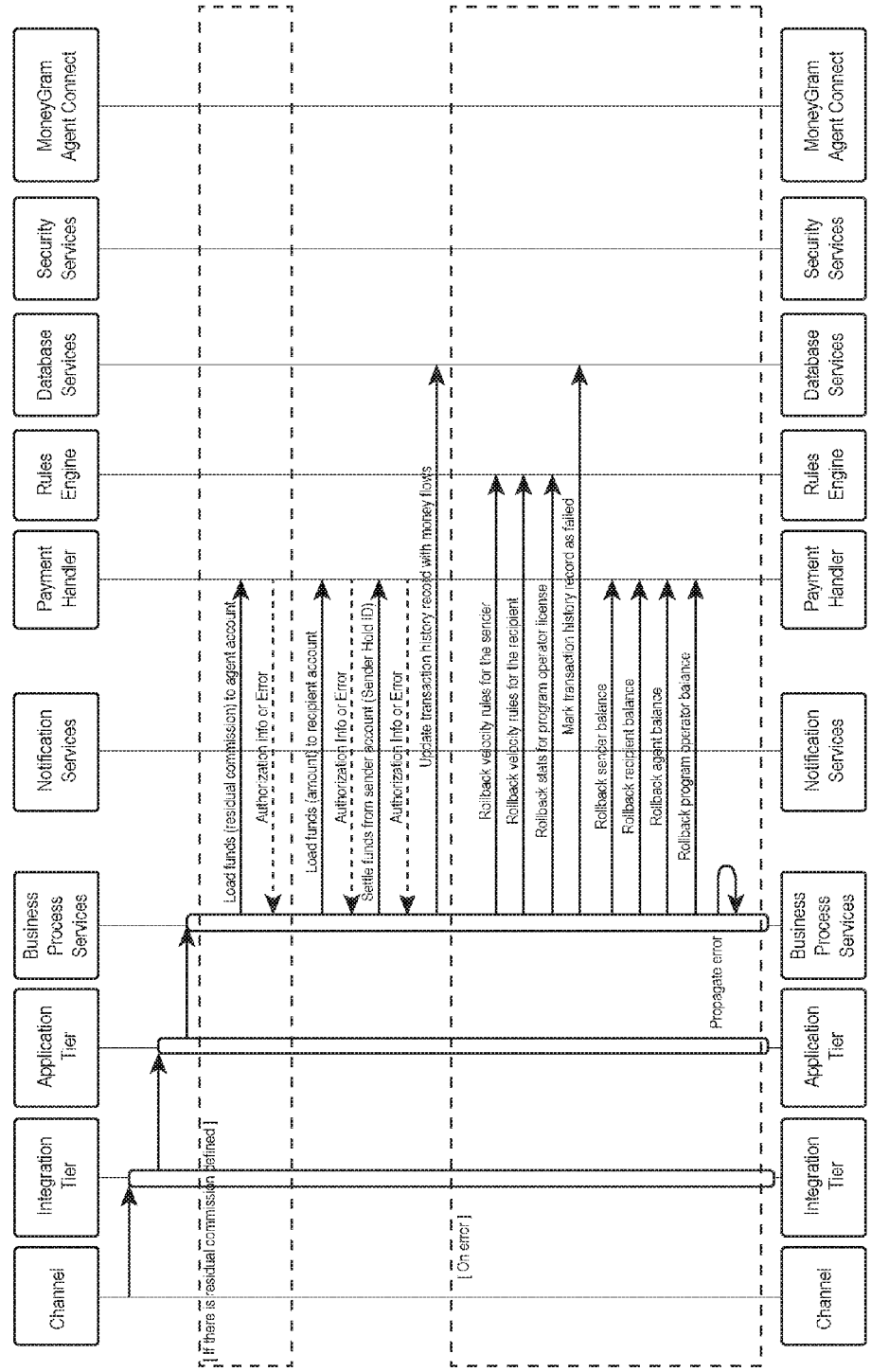
Figure 22G:
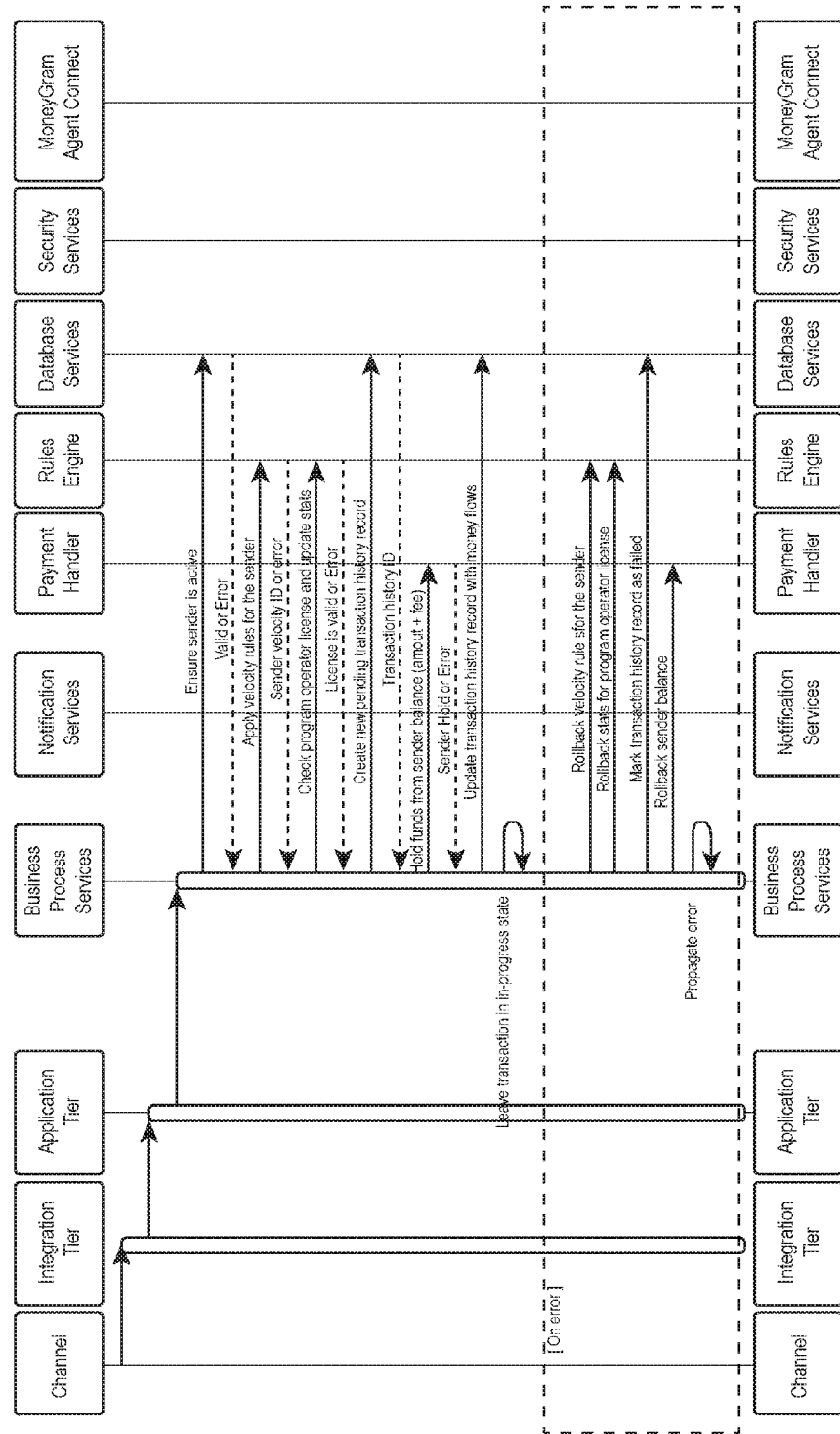
Figure 22J:
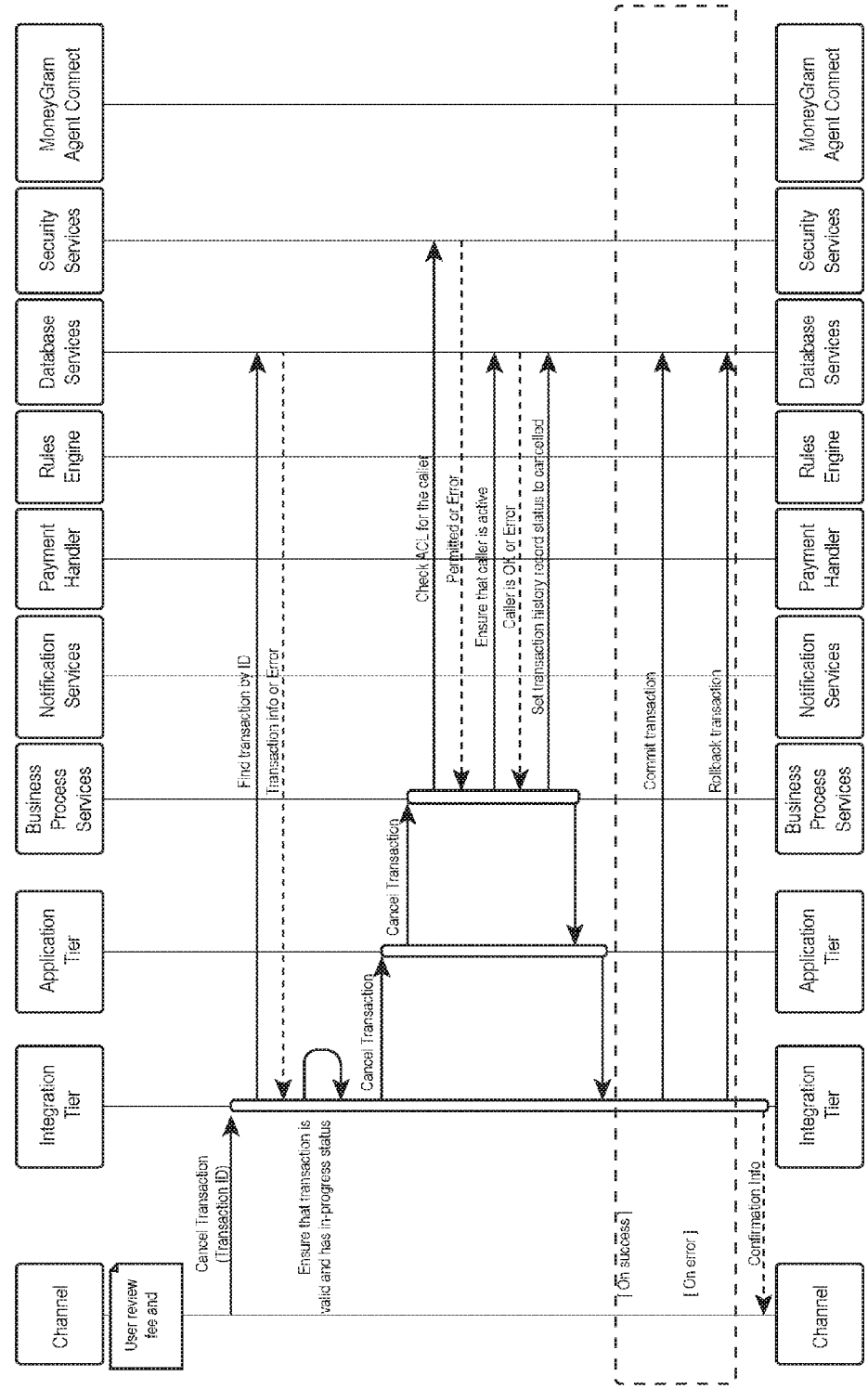

FIG. 19B illustrates a non-subscriber-to-subscriber international money transfer. This scenario is very similar to that described in FIG. 19A from the mFS subscriber's perspective, except that their eMoney account is credited here, and their debit card account was credited in 19A. The initiator, subscriber B (1905), does not have an mFS account and, as a result, takes their cash to an international money transfer organization (e.g. MoneyGram®) or other remittance company's agent (1906) to send it to subscriber A's mobile wallet eMoney account. The international money transfer organization (1907) then transfers the specified amount to subscriber A (1908) and subscriber A's mobile wallet eMoney account is credited with the amount of the transfer. Subscriber A may receive a transaction ID number, along with an indication that the transfer has occurred. The mFS bank may receive settlement reports from the card processor and settle funds from the international money transfer organization's bank to subscriber A's mobile wallet account. The monetary transaction system processes the money transfer request, updates subscriber A's mobile wallet balance within the card processor and logs the transaction. An external card processor increments subscriber A's mobile wallet balance and sends periodic transaction reports to the mFS bank for settlement.

Other functionality described above in relation to using an eMoney mobile wallet account may also apply to banked subscribers using a debit card associated with their mobile wallet. Such subscribers may buy airtime for their mobile device, pay bills, make retail purchases, receive direct deposits, and perform other functionality.

In one embodiment, the monetary transaction system 210 is implemented to add a mobile wallet platform stored value account to a mobile wallet. The stored value account may include eMoney or other monetary credits. In the embodiment, communication module 215 of monetary transaction system 210 may receive subscriber data for an unbanked subscriber 205 over a communication channel. The transaction processor may perform validation checks on the unbanked subscriber to validate that the unbanked subscriber is not exceeding a specified allowable number of accounts per subscriber. The monetary transaction system 210 may then send subscriber data to another entity (such as a third party verification system) for identification of the unbanked subscriber. The monetary transaction system 210 receives results from the third party verification system indicating that the subscriber data appropriately identifies the unbanked subscriber, creates a stored value account for the unbanked subscriber that maintains a recorded balance for the created stored value account, adds the stored value account to the unbanked subscriber's mobile wallet and notifies the unbanked subscriber of the addition of the stored value account over at least one communication channel connected to the mobile wallet platform.

In another embodiment, the monetary transaction system 210 is implemented to add a third party stored value account to a mobile wallet. The monetary transaction system 210 receives unbanked subscriber data, including account details, over a communication channel. The transaction processor 216 performs a validation check on the unbanked subscriber to validate that the unbanked subscriber is not exceeding a specified allowable number of accounts per subscriber. If the validation check is ok, the monetary transaction system 210 sends subscriber data to a third party verification system for identification of the unbanked subscriber. In some cases, validating the status of the sender or the recipient includes performing a check on the specified sender or recipient to comply with the office of foreign assets control. The monetary transaction system 210 then receives results from the third party verification system indicating that the subscriber data appropriately identifies the unbanked subscriber, and submits the unbanked subscriber's account details to a third party account processor. The monetary transaction system 210 receives an indication from the third party account processor that third party account processor created a third party stored value account for the subscriber. The transaction processor maintains a link between the subscriber data and the third party stored value account and adds the third party stored value account to the unbanked subscriber's mobile wallet. The monetary transaction system 210 then notifies the unbanked subscriber of the addition of the third party stored value account over a communication channels connected to the monetary transaction system.

In another embodiment, the monetary transaction system 210 is implemented to add a bank or credit union account to a mobile wallet. The communication module 215 receives subscriber data, including bank or credit union account details, over a communication channel 111. The transaction processor 216 performs validation checks on the subscriber to validate that the subscriber is not exceeding a specified allowable number of accounts per subscriber and sends subscriber data to a third party verification system for identification of the subscriber. The communication module then receives results from the third party verification system indicating that the subscriber data appropriately identifies the subscriber. Upon receiving these results, the monetary transaction system 210 submits bank or credit union account details for validation by the transaction processor, receives an indication that the bank or credit union account details correspond to a valid bank or credit union account, maintains a link between the subscriber data and the bank or credit union account and notifies the subscriber of the bank or credit union account validation over a communication channel.

In still another embodiment, the monetary transaction system is implemented to add a debit or credit card account to a mobile wallet. The communication module 215 receives subscriber data, including a debit or credit card account number, over a communication channel 111 connected to the monetary transaction system. The transaction processor performs validation checks on the subscriber to validate that the subscriber is not exceeding a specified allowable number of accounts per subscriber. The communication module sends subscriber data to a third party verification system for identification of the subscriber and receives results from the third party system indicating that the subscriber data appropriately identifies the subscriber. The monetary transaction system 210 securely stores the debit or credit card account number for access by the mobile wallet (e.g. in memory 217 or transaction database 225), adds the debit or credit card account number to the subscriber's mobile wallet, and notifies the subscriber of the addition of the debit or credit card account number. It should be noted that many other transactions can take place over the monetary transaction system, and that the embodiments described herein should not be read as limiting.

Embodiments of the invention can adhere to Know Your Customer (KYC) rules in the US by performing Customer Identification Program (CIP) checks as required by the Bank Secrecy Act and US PATRIOT Act. A minimum amount of information can be gathered about a customer, such as, for example, first name, last name, date of birth, government ID Type, government ID number and address. The CIP processes are designed to validate customer identity against government blacklists and assists in the prevention of money laundering and terrorist financing. A combination of non-documentary and documentary verification can be used to ensure beyond a reasonable doubt the identity of the customer.

Non-documentary verification can occur through the presentment of the information that was collected from the user to an external third party, such as, for example, Lexis Nexis®. Documentary verification can occur if non-documentary verification fails, then the user is asked to present an unexpired government ID. Various differ forms of identification including driver's license, passport, alien identification (e.g., green card or work visa), and Mexican Consular identification card, can be accepted.

Embodiments of the invention can perform Anti-Money Laundering (AML) and Combating the Financing of Terrorism (CFT) checks. AML and CFT checks can be performed using transaction monitoring methods to flag names and suspicious transactions for further investigation. The mobile wallet platform can perform AML and CFT checks on all electronic financial transactions to ensure that electronic funds are not being used for money laundering or terrorism. Transaction limits can be placed on user accounts. The transaction limits are fully configurable for each particular use case, channel and payment method that allows maximum flexibility to restrict higher risk use cases. Velocity checks can also be performed. Velocity Checks ensure that subscribers are not abusing the mobile wallet platform within the allowable limits.

FIGS. 20A through 20F depicts relationships between embodiments of various components within the monetary transaction system depicted in FIG. 1. In particular, FIGS. 20A through 20F depict communications between the specific components within the monetary transaction system during an operation to deposit of funds within a financial account. The depicted interactions are representative of computer executed functions that enable the deposit of money through a mobile transaction system that is capable of functioning without an associated bank account.

FIGS. 21A through 21I depicts relationships between embodiments of various components within the monetary transaction system depicted in FIG. 1. In particular, FIGS. 21A through 21I depict communications between the specific components within the monetary transaction system during an operation to withdraw of funds from a financial account. The depicted interactions are representative of computer executed functions that enable the withdrawal of money through a mobile transaction system that is capable of functioning without an associated bank account.

FIGS. 22A through 22J depicts relationships between embodiments of various components within the monetary transaction system depicted in FIG. 1. In particular, FIGS. 22A through 22J depict communications between the specific components within the monetary transaction system during an operation to transfer funds between financial accounts. The depicted interactions are representative of computer executed functions that enable the transfer of money through a mobile transaction system that is capable of functioning without an associated bank account.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A monetary transaction system for conducting monetary transactions between subscribers and other entities, the system comprising one or more of:
    an integration tier operable to manage mobile wallet sessions, the integration tier also including a communication application programming interface (API) and other communication mechanisms to accept messages from channels;
    notification services operable to send notifications through different notification channels including one or more of short message peer-to-peer, short-message services and simple mail transfer protocol emails;
    business process services operable to implement business workflows, including at least one of executing financial transactions, auditing financial transactions, invoking third-party services, handling errors, and logging platform objects;

database services operable to store financial transaction details, store customer profiles, and manage money containers;

a payment handler service operable to use APIs of different payment processors including one or more APIs of banks, credit and debit cards processors, bill payment processors;

a rules engine operable to gather financial transaction statistics and use the gathered financial transaction statistics to enforce constraints including transaction constraints;

a security service operable to perform subscriber authentication;

at least one entity that is to be involved in the specified transaction, the at least one entity having a profile with the monetary transaction system: wherein the at least one entity is the agent;

wherein the monetary transaction system is implemented to deposit funds at an agent branch, the funds being deposited by a subscriber at the agent branch using a mobile device configured to run a monetary transaction system application, the monetary transaction system performing the following steps:

receiving a communication message from the mobile device over one of a plurality of channels connected to the monetary transaction system, the communication message being received by an API associated with the integration tier of the monetary transaction system, the communication message indicating that the subscriber desires to deposit a specified amount of funds into the subscriber's account;

validating the status of the subscriber's account, wherein validating the status of the subscriber's account comprises communicating from the integration tier to the database services to query attributes of the subscriber's account;

committing a pending transaction through the business process services, wherein the integration tier communicates a transaction commitment request to the business process services;

receiving a confirmation from the business process services that the pending transaction has been committed;

sending, through the notification services, a receipt notification to the mobile device; and upon receiving a confirmation of commitment from the business process services, committing the pending transaction to the database services; and wherein committing the pending transaction further comprises the following steps as orchestrated by the business process services:

ensuring, via the database services, that the subscriber has an active account;

validating, through communication with the security services, one or more of a PIN number and an access control list;

applying with the rules engine, velocity rules;

creating with the database services a new pending transaction history record;

holding funds from the agent account balance using the payment handler, loading the funds to the subscriber account using the payment handler; and updating, using the database services, a pending transaction history record to reflect the funds.

2. A monetary transaction system for conducting monetary transactions between subscribers and other entities, the system comprising one or more of:

an integration tier operable to manage mobile wallet sessions and maintain the integrity of financial transactions, the integration tier also including a communication application programming interface (API) and other communication mechanisms to accept messages from channels;

notification services operable to send notifications through different notification channels including one or more of short message peer-to-peer, short-message services and simple mail transfer protocol emails;

business process services operable to implement business workflows, including at least one of executing financial transactions, auditing financial transactions, invoking third-party services, handling errors, and logging platform objects;

a security service operable to perform subscriber authentication;

database services operable to store financial transaction details, store customer profiles, and manage money containers;

a mobile device configured to run a monetary transaction system application;

a payment handler service operable to use APIs of different payment processors including one or more APIs of banks, credit and debit cards processors, bill payment processors;

a rules engine operable to gather financial transaction statistics and use the gathered financial transaction statistics to enforce business constraints including transaction constraints;

a security service operable to perform subscriber authentication;

at least one entity that is to be involved in the specified transaction, the at least one entity having a profile with the monetary transaction system, wherein the at least one entity is the agent;

a monetary transaction system subscriber that has a profile with the monetary transaction system the subscriber profile stored in the database of the monetary transaction system, wherein the subscriber indicates, via the monetary transaction system application, one or more specified transactions that are to be performed using the monetary transaction system;

wherein the monetary transaction system is implemented to withdraw funds at an agent branch using the mobile device configured to run a monetary transaction system application, including performing the following steps:

receiving a communication message from the mobile device over one of a plurality of channels connected to the monetary transaction system, the communication message being received by an API associated with the integration tier of the monetary transaction system, the communication message indicating that the subscriber desires to withdraw a specified amount of funds from an account associated with the subscriber, the communication comprising a secure, perishable code;

determining that the transaction is valid and in progress, wherein determining that the transaction is valid comprises validating the secure, perishable code and communicating from the integration tier to the database services to query attributes of the subscriber's account;

committing a pending transaction through the business process services, wherein the integration tier communicates a transaction commitment request to the business process services;

receiving a confirmation from the business process services that a pending transaction has been committed;

sending, through the notification services, a receipt notification to the mobile device; and upon receiving a confirmation of commitment from the business process services, committing the pending transaction to the database services; and wherein committing the pending transaction further comprises the following steps as orchestrated by the business process services:

ensuring, via the database services, that the subscriber has an active account;

validating, through communication with the security services, one or more of a PIN number and an access control list;

applying with the rules engine, velocity rules;

creating with the database services a new pending transaction history record;

holding funds from the agent account balance using the payment handler;

loading the funds to the subscriber account using the payment handler; and updating using the database services, a pending transaction history record to reflect the funds.

3. A monetary transaction system for conducting monetary transactions between subscribers and other entities, the system comprising one or more of:

an integration tier operable to manage mobile wallet sessions and maintain the integrity of financial transactions, the integration tier also including a communication application programming interface (API) and other communication mechanisms to accept messages from channels;

notification services operable to send notifications through different notification channels including one or more of short message peer-to-peer, short-message services and simple mail transfer protocol emails;

business process services operable to implement business workflows, including at least one of executing financial transactions, auditing financial transactions, invoking third-party services, handling errors, and logging platform objects;

database services operable to store financial transaction details, store customer profiles, and manage money containers;

a monetary transaction system subscriber that has a profile with the monetary transaction system the subscriber profile stored in the database of the monetary transaction system, wherein the subscriber indicates, via the monetary transaction system application, one or more specified transactions that are to be performed using the monetary transaction system;

a payment handler service operable to use APIs of different payment processors including one or more APIs of banks, credit and debit cards processors, bill payment processors;

a rules engine operable to gather financial transaction statistics and use the gathered financial transaction statistics to enforce business constraints including transaction constraints;

a security service operable to perform subscriber authentication;

at least one entity that is to be involved in the specified transaction, the at least one entity having a profile with the monetary transaction system; wherein the at least one entity is the agent;

wherein the monetary transaction system is implemented to transfer funds using the mobile device configured to run a monetary transaction system application, including performing the following steps:

receiving a communication message from the mobile device over one of a plurality of channels connected to the monetary transaction system, the communication message being received by an API associated with the integration tier of the monetary transaction system, the communication message indicating that the subscriber desires to transfer a specified amount of funds from the subscriber's account to a recipient;

validating the status of the subscriber's account, wherein validating the status of the subscriber's account comprises communicating from the integration tier to the database services to query attributes of the subscriber's account;

committing a pending transaction through the business process services, wherein the integration tier communicates a transaction commitment request to the business process services;

receiving a confirmation from the business process services that a pending transaction has been committed;

sending, through the notification services, a receipt notification to the mobile device; and upon receiving a confirmation of commitment from the business process services, committing the pending transaction to the database services; and wherein committing the pending transaction further comprises the following steps as orchestrated by the business process services:

ensuring, via the database services, that the subscriber has an active account;

validating, through communication with the security services, one or more of a PIN number and an access control list;

applying with the rules engine, velocity rules;

creating with the database services a new pending transaction history record;

holding funds from the agent account balance using the payment handler;

loading the funds to the subscriber account using the payment handler; and updating, using the database services, a pending transaction history record to reflect the funds.

* * * * *